United States Patent
Yamamoto et al.

(10) Patent No.: US 7,197,481 B1
(45) Date of Patent: Mar. 27, 2007

(54) FLEXIBLE PRODUCTION AND MATERIAL RESOURCE PLANNING SYSTEM USING SALES INFORMATION DIRECTLY ACQUIRED FROM POS TERMINALS

(75) Inventors: Tsukasa Yamamoto, Tokyo (JP); Masaya Ogawa, Kanagawa (JP); Eichi Yoshida, Chiba (JP); Masataka Hotta, Kanagawa (JP); Toru Morita, Hyogo (JP); Akiko Omori, Osaka (JP)

(73) Assignee: Kanebo Trinity Holdings, Ltd., Tokyo (JP)

( * ) Notice: Subject to any disclaimer, the term of this patent is extended or adjusted under 35 U.S.C. 154(b) by 1262 days.

(21) Appl. No.: 09/221,656

(22) Filed: Dec. 23, 1998

Related U.S. Application Data

(63) Continuation of application No. 08/650,054, filed on May 16, 1996, now Pat. No. 5,854,746, which is a continuation of application No. 08/422,976, filed on Apr. 17, 1995, now abandoned, which is a continuation of application No. 07/692,425, filed on Apr. 29, 1991, now abandoned.

(30) Foreign Application Priority Data

| | | | |
|---|---|---|---|
| Apr. 28, 1990 | (JP) | | 2-112274 |
| Sep. 26, 1990 | (JP) | | 2-257845 |
| Nov. 27, 1990 | (JP) | | 2-326996 |

(51) Int. Cl.
*A01K 5/02* (2006.01)

(52) U.S. Cl. .......................................... 705/28; 705/20

(58) Field of Classification Search .................... 705/7, 705/8, 10, 28–30, 16, 20–22; 364/468.13, 364/468.14
See application file for complete search history.

(56) References Cited

U.S. PATENT DOCUMENTS

4,459,663 A * 7/1984 Dye (Continued)

FOREIGN PATENT DOCUMENTS

EP 0 331 442 A2 9/1989

(Continued)

OTHER PUBLICATIONS

Jim Brown, "Software links POS with multiple nets", Package lets Stratus minis act as gateways that connect POS devices to larger systems, Network World; Oct. 17, 1988; 5, 42; ABI/INFORM Global. p. 33 and 35.*

(Continued)

*Primary Examiner*—Frantzy Poinvil
(74) *Attorney, Agent, or Firm*—Keating & Bennett, LLP

(57) ABSTRACT

This invention relates to a production system for retail goods which is intended for timely collection of accurate sales information from retail outlets and flexible production of goods in accordance with the same information, and includes sales information collecting units for collecting sales information at a plurality of sales outlets, a production size determining unit for determining a production quantity to be produced in the future for a plurality of goods based on the sales information received from the plurality of sales information collecting units, and a production unit for flexibly manufacturing the plurality of goods based on the sales information which is collected at the plurality of sales information collecting units. After the production size determining unit determines the production quantity, output data indicative of the production quantity determined by the production size determining unit is transmitted to the production unit so that the production unit manufactures the production quantity of the plurality of goods.

66 Claims, 49 Drawing Sheets

U.S. PATENT DOCUMENTS

| | | | |
|---|---|---|---|
| 4,803,634 | A | 2/1989 | Ohno et al. |
| 4,827,423 | A * | 5/1989 | Beasley et al. |
| 4,887,208 | A | 12/1989 | Schneider et al. |
| 4,972,504 | A | 11/1990 | Daniel, Jr. et al. ............... 455/2 |
| 5,101,352 | A * | 3/1992 | Rembert |
| 5,128,861 | A | 7/1992 | Kagami et al. ............. 264/403 |
| 5,168,445 | A * | 12/1992 | Kawashima et al. |
| 5,204,821 | A | 4/1993 | Inui et al. |

FOREIGN PATENT DOCUMENTS

| | | |
|---|---|---|
| JP | 4-25359 | 1/1962 |
| JP | 62-10759 | 1/1987 |
| JP | 3-156504 | 6/1991 |

OTHER PUBLICATIONS

Japanese and English versions of Japanese Search Report and Office Action from Japanese Application No. 2-112274 on May 30, 1995 issued by Japanese Patent Office.

Computer Database Report including English Language Abstracts for JP 62-278604 and JP-224864.

Business Software Database, product name: "Demand Modeling & Forecasting System".

DataPro Directory of Software; 1991; McGrarb—Hill, Inc., Delram, NJ, pp. 085-200-00070 085-200-13.

New York Times, Oct. 6, 1981, p. D1, 061, "Experiments using supermarket scanners . . . " (abstract only).

CMI Competitive Solutions, Inc., release date Aug. 1984.

Data Sources Computer Associates International Inc., Copyright 1989, pp. J-448 to J-458, J-463 to J-467, J-493 to J-496/.

Business Software Database, product name: "Down to Earth Sales Analysis 3.1", Disc. release date Apr. 1989.

O'Leary, M.; "Haggar using Hot Technology To Get Into Women's Wear"; PC Week, V5, N26, PC4(1); Jun. 28, 1988.

"Haggar VP Touts Quick Response": Network World; p. 17; Dec. 25, 1989.

Information Processing Technology for FA Production Control Total System, Kazuyasu Okada, Information Processing Society of Japan, vol. 25, No. 4, 1984, pp. 371-377, Japanese Language Article and English Language Translation.

New York Times, Oct. 6, 1981 p. D1,D61, "Experiments using supermarket scanners . . . " (abstract only).

Data Sources, Computer Associates International Inc., Copyright 1989, pp. J-448 to J-458, J-463 to J-467,J-493 to J-496.

O'Leary, M.; "Haggar Using Hot Technology To Get Into Woman's Wear"; PC Week, V5, N26, PC4 (1); Jun. 28, 1998.

Haggar VP Touts Quick Response; Network World; pp. 17; Dec. 25, 1989.

Business Software Database, product name : "Demand Modeling & Forecasting System", CMI Competitive Solutions, Inc. release date Aug. 1984.

DataPro Directory of Software, 1991, McGraw-Hill, Inc., Delram, NJ, pp. D85-200-000 to D85-200-013.

* cited by examiner

FIG.3

Product classification

| Foundation cosmetic | Make up cosmetic | Shampoo & rinse | Perfume & cologne | Cosmetic sundry | Men's cosmetic |
|---|---|---|---|---|---|
| 1 | 2 | 3 | 4 | 5 | 6 |

Price classification

| Low | Medium low | Medium | Medium high | High |
|---|---|---|---|---|
| 1 | 2 | 3 | 4 | 5 |

Consumer age classification

| Low | Intermediate between low and average | Average | Intermediate between average and high | High |
|---|---|---|---|---|
| 1 | 2 | 3 | 4 | 5 |

Merchandising classification

| Display sale | Rather display sale | Equivocal | Rather counseling sale | Counseling sale |
|---|---|---|---|---|
| 1 | 2 | 3 | 4 | 5 |

FIG. 4A

| Sample outlet | Relative sales |
|---|---|
| $S_1$ | $d_1$ |
| $S_2$ | $d_2$ |
| $S_3$ | $d_3$ |
| ... | ... |

Relative sale

FIG. 4B

| Sample outlet | 1 | 2 | --- | 6 |
|---|---|---|---|---|
| $S_1$ | $a_1$ | $b_1$ | --- | $f_1$ |
| $S_2$ | $a_2$ | $b_2$ | --- | $f_2$ |
| $S_3$ | $a_3$ | $b_3$ | --- | $f_3$ |
| ... | ... | ... | ... | ... |

Product characteristic

FIG. 4C

| Sample outlet | 1 | 2 | --- | 5 |
|---|---|---|---|---|
| $S_1$ | $g_1$ | $h_1$ | --- | $k_1$ |
| $S_2$ | $g_2$ | $h_2$ | --- | $k_2$ |
| $S_3$ | $g_3$ | $h_3$ | --- | $k_3$ |
| ... | ... | ... | ... | ... |

Price characteristic

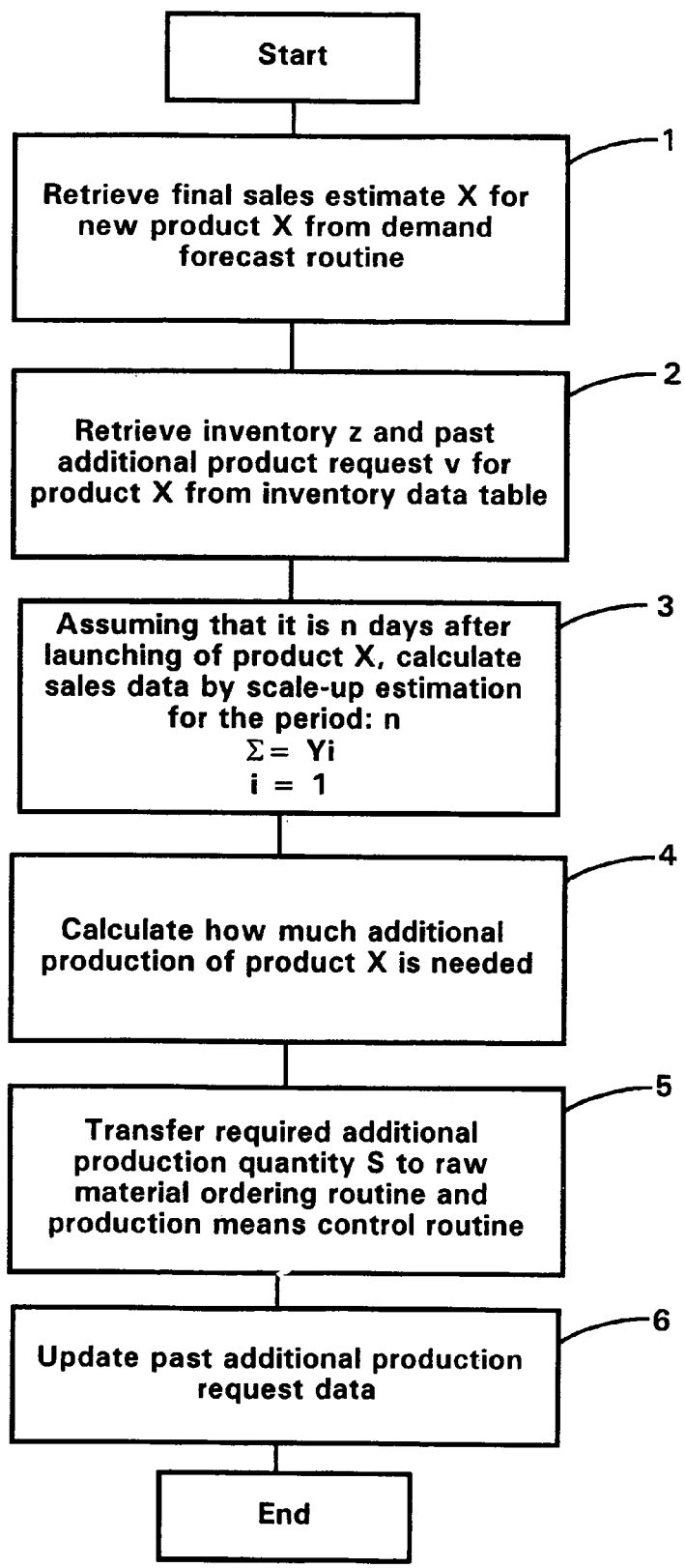

FIG. 10A

| Raw material / Product | α | β | ... |
|---|---|---|---|
| A | | | |
| B | | | |
| ... | | | |
| X | $P^1$ | $P^2$ | ... |

81a — Product-classified raw material constitution data table

FIG. 10B

| Day / Raw material | 1 | 2 | ... | j | ... | n |
|---|---|---|---|---|---|---|
| α | $a_1$ | $a_2$ | ... | $a_j$ | ... | $a_n$ |
| β | $b_1$ | $b_2$ | ... | $b_j$ | ... | $b_n$ |
| ... | ... | ... | | ... | | ... |

81b — Raw material-classified required quantity data table

FIG. 10C

| Raw material | Inventory |
|---|---|
| α | $z_\alpha$ |
| β | $z_\beta$ |
| ... | ... |

81c — Raw material-classified inventory data table

FIG. 10D

| Day / Raw material | 1 | 2 | ... | n |
|---|---|---|---|---|
| α | $a_1^*$ | $a_2^*$ | ... | $a_n^*$ |
| β | $b_1^*$ | $b_2^*$ | ... | $b_n^*$ |
| ... | ... | ... | | ... |

81d — Raw material-classified acceptance schedule data table

Drive output level data table

Required quantity data table

Production plan modification transfer data table

In-process inventory data table

Parts inventory data table

Parts release data table

Parts order data table

Product sales data table

Parts attribute data table

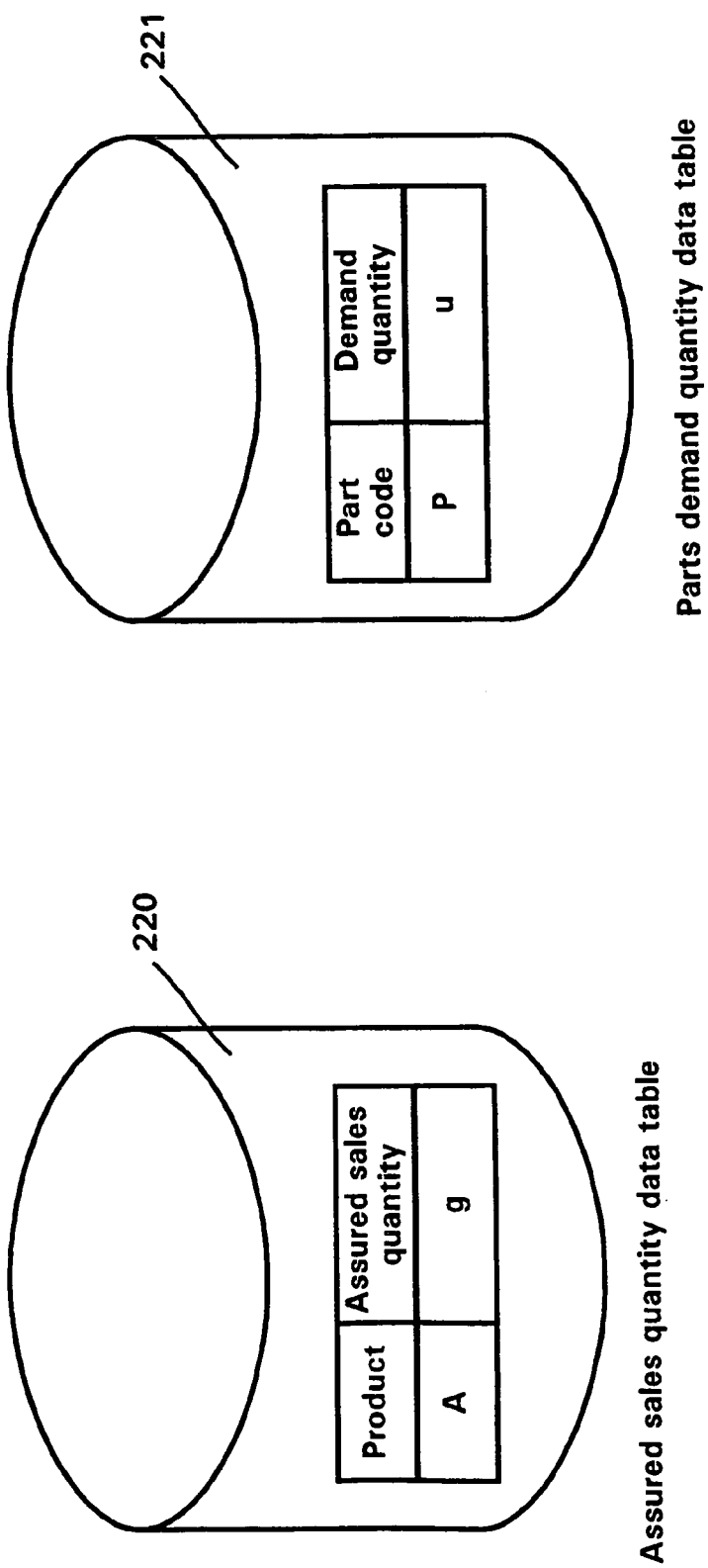

FIG.49A

| Product | Assured sales quantity |
|---|---|
| A | 10 |
| B | 25 |
| C | 5 |

Assured sales quantity data table — 220

FIG.49B

| Product | Part code | |
|---|---|---|
| A | q1 | 2 |
| A | q2 | 3 |
| A | q3 | 1 |
| B | q1 | 1 |
| B | q4 | 3 |
| C | q5 | 1 |
| C | q6 | 2 |

Product constitution data table — 214

| Mother part code | Daughter part code | Number of constituent units |
|---|---|---|
| q1 | q7 | 1 |
| q1 | q8 | 1 |
| q2 | q8 | 2 |
| q2 | q10 | 1 |
| q4 | q7 | 1 |
| q4 | q9 | 2 |
| q6 | q9 | 3 |
| q6 | q10 | 1 |
| q6 | q15 | 2 |
| q10 | q12 | 1 |
| q10 | q13 | 3 |

Parts constitution data table

FIG. 49D

| Before - part code | After - part code |
|---|---|
| q11 | q7 |
| q11 | q12 |
| q14 | q5 |

211

Parts processing data table

| PART CODE | q1 | q2 | q3 | q4 | q5 | q6 | q7 | q8 | q9 | q10 | q11 | q12 | q13 | q14 | q15 |
|---|---|---|---|---|---|---|---|---|---|---|---|---|---|---|---|
| DEMAND QUANTITY | 45 | 30 | 10 | 75 | 5 | 10 | 120 | 105 | 180 | 40 | 160 | 40 | 120 | 5 | 20 |

Parts demand quantity data table

Production plan data table

FLEXIBLE PRODUCTION AND MATERIAL RESOURCE PLANNING SYSTEM USING SALES INFORMATION DIRECTLY ACQUIRED FROM POS TERMINALS

This application is a Continuation of U.S. patent application Ser. No. 08/650,054 filed on May 16, 1996, now U.S. Pat. No. 5,854,746, which is a Continuation of U.S. patent application Ser. No. 08/422,976, filed Apr. 17, 1995 (abandoned), which is a Continuation of U.S. patent application Ser. No. 07/692,425 filed Apr. 29, 1991 (abandoned).

BACKGROUND OF THE INVENTION

The present invention relates to a production system for retail goods such as beauty products and more particularly to a production system which receives sales information from retail outlets in a timely and accurate manner and is flexible in manufacturing the goods.

The invention relates, in another aspect, to a raw material necessary for the production of products can be placed with flexibility and economically, and thus insures timely procurement of raw materials without the disadvantage of carrying excessive raw material inventories. This raw material ordering system may be employed in conjunction with or independently from the production system.

In manufacturing a product for marketing, which is sold over retail counters, the manufacturer generally determines the quantity to be manufactured according to an initial marketing plan and instructs its factory to produce that quantity, and as need arises, they instruct the factory to carry out additional production.

However, such a production system is dangerous to the so-called fashion manufacturer which must launch a new product as often as, say, once a year and is specializing in fashion articles with limited market lives. Assuming that such a manufacturer drafted a merchandizing plan, manufactured an article accordingly and introduced it to the market and the articles was accepted by consumers better than expected and sold out soon. Soon, then deficiencies occur at retail outlets and the manufacturer loses many sales opportunities. Assuming, conversely, that the manufacturer mapped out a grandiose campaign but the market was not ready to accept their product. Soon, then too many articles remain unsold and the manufacturer must carry large stocks to be somehow liquidated.

To solve these problems, many manufacturers have explored better methods for predicting potential demands. Thus, they try to overcome the problems by predicting demands from the past sales performance of similar products and determining apparently appropriate production scales. However, when the article to be manufactured is an entirely new product, it is extremely difficult for the manufacturer to predict consumer acceptance, ascertain the trend in potential competitors, or predict the effect of a marketing campaign. Moreover, since weather may be a major factor affecting the sale of products, demand prediction has its own limits and every one in the industry today is aware of the great risk of relying on such prediction.

Raw Material Ordering System I

While different industries have been using somewhat different systems for the procurement of raw materials, the average approach is that which is known as the fixed point-fixed quantity ordering system.

According to this fixed point-fixed quantity ordering system, a safe stock level is predetermined for each raw material and when the raw material inventory on hand has decreased to this critical stock level, a signal is given for placing a new order. This system is predicated on the principle that the manufacturer should carry a reasonable stockpile of any raw material that is required to be certainly on the safe side. This is an expedient and optimal system for industries where stable production is the rule rather than the exception.

However, the fixed point-fixed quantity ordering system does not work well and entails too large economic losses in industries where many kinds of products are manufactured in small lots and particularly where the dependency of any raw material on the production scale of the product is large. Thus, if a plurality of product items share a plurality of raw materials in common and such product items can be manufactured merely by altering the combination of such raw materials, the fixed point-fixed quantity ordering system can be employed with advantage. However, if, for example, three product items A, B and C have one raw material a in common, the safe stock level of $\underline{a}$, viz. the critical point for this raw material, will then be set at the maximum quantity required for the production of all the three product items, with the result that the safety stock level of that raw material is exaggerated of necessity and, hence, chances are that the manufacturer will have to carry an excessive raw material inventory.

To overcome the above disadvantage, a raw material ordering system called MRP (the acronym of Material Requirements Plan) has for some time been in use. This is a system such that an order for any raw material is placed in the quantity just necessary for the production of a given lot size of each product item and is intended to preclude the disadvantage of carrying an excessive raw material inventory.

As all the raw materials for each product item are assorted as a package, this system is convenient, indeed, but has the problem of rigidity. Thus, since the raw material a is earmarked for the production of item A only and no diversion of raw material a is made for the production of item B even if an instruction to produce B is entered, then the production of B must begin only after procurement of raw material a for B. Since the raw materials, $\underline{a}, \underline{b}, \underline{c}$ . . . have been packaged in necessary amounts for the production of item A, the diversion of raw material $\underline{a}$ from this package will result in a virtual waste of the other raw materials b, c . . . .

Raw Material Ordering System II

Furthermore, the raw material ordering system MRP involves particular difficulties and is disadvantageous when the raw materials call for long lead times between placement of an order and actual receipt of the raw materials. An example of such raw materials is bottles of cosmetics. Each manufacturer of cosmetics employs its own bottles with its own shape, configuration, color, and ornamental design. When a manufacturer of cosmetics places an order for bottles of a particular type, a manufacturer of the bottles then molds the bottles, does surface-finishing, and print brands and other characters and designs if any on the surface thereof. Thus, for placing an order for a raw material with a lead time of 3 months, it is of course necessary that the production scale as of 3 months ahead must have been determined but it is very difficult and even dangerous for manufacturers in the fashion and equivalent industries to predetermine a production size as of many months ahead.

Therefore, there has been proposed a still another system, viz. a preliminary ordering system in which the necessary quantities of parts, that is to say the amounts of consumption of parts are predicted independently of the production of a finished product and these quantities of parts are arranged to be available beforehand. According to this system, the necessary production activity can be started as soon as a manufacturing instruction is received but the manufacturer must maintain constant inventories of parts at all times and, particularly where the variety of production items is large, must maintain a proportionally increased total inventory of raw materials.

Furthermore, raw materials and particularly containers and the like are fed to the production line only after passing through a plurality of processes such as surface and other treatments (factory) and assembling (factory), with the result that various forms of inventories are carried in the respective processes. In such a situation, it is very difficult to keep a constant tab on which process stage is carrying what size of inventory and this was near to impossibility particularly where the container, for one, is procured from a series of container manufacturers and finishers. For this reason, the manufacturer in such cases places orders for raw materials for each production job without a clear picture of the inventory, with the result that they will have to carry a fairly large total inventory of raw materials.

SUMMARY OF THE INVENTION

The present invention has been developed to overcome the aforementioned disadvantages.

It is, therefore, a first object of the present invention to provide an ideal production system, which takes in sales information from retail outlets timely and with accuracy and manufactures products with flexibility in quick response to the sales information, thus making it possible to supply the market with any product when it is needed and in the quantity needed.

To accomplish the above object, the production system for retail goods in accordance with the present invention has the following constitution. a retail sales information collecting means, a production quantity setting means for determining a production quantity according to the sales information collected by the first-mentioned means, a directing means for directing the preparation and production of raw materials according to the production quantity determined as above, and a production means for producing the determined production quantity in accordance with the direction.

In the above arrangement, as sales information from retail outlets are transmitted by the retail sales information collecting means to the production quantity setting means, the production quantity is set immediately.

Then, this production quantity data is fed to the directing means for directing the preparation and production of necessary raw materials and the production means receiving a direction to produce from the directing means performs the production of the determined production quantity.

As mentioned above, the production system according to the present invention sets a production quantity in response to sales information from retail outlets, directs the preparation and production of raw materials necessary for production of the set production quantity and performs the production of the same quantity, thus making it possible to produce any product that sells when it is needed and in the quantity that is certain to be sold.

Therefore, all the problems encountered in the past, such as deficiencies in stock at retail outlets and the consequent loss of sales opportunities or excessive accumulation of inventories can be obviated and an ideal manufacturing system can be established.

Preferably, it is arranged that the retail sales information is collected from a plurality of sample stores or departments and that the production quantity setting means comprises a scale-up estimating routine for scaling-up of the retail sales information and a demand forecast routine for predicting the demand according to the scale-up estimate. Such a construction is conducive to a more accurate setting of production quantity.

Furthermore, the production means is preferably provided with an automatic switching function for automatically changing the powers etc. of the components of production equipment in accordance with directions to produce. As the production means is so constructed, it is possible to establish a production system which is quick to respond to directions to produce without requiring switching of parts, for instance.

For directing or ordering the preparation and production of raw materials required in the production system for retail goods, one may employ Raw materials ordering systems I and II hereinafter explained. Raw materials ordering system I is to be used in connection with those raw materials which do not require special processings after placement of an order, such as material substances to be mixed to produce hair-lotions. Raw materials ordering system II is to be used for those raw materials which require various processings after placement of an order, such as containers of cosmetics.

Raw Material Ordering System I

It is a second object of the present invention to provide a raw material ordering system which is flexible enough to timely respond to production needs without carrying an excessive stock of raw materials and, particularly in industries where many items are produced in small lots, enables an economical and effective control and supply of raw materials which are otherwise complicated and time-consuming. In other words, the present invention provides a "raw material mixing system" wherein a raw material prepared for producing one item is diverted for producing another item when a necessity of producing additional number of products of another item emergently arises.

To accomplish the above object, the raw material ordering system of the present invention determines the order size of each raw material according to a production plan for a product, comprising an order quantity determining means which sequentially sets or modifies the required quantities of raw materials for each day in accordance with the daily production plan or changes in the production plan and determines the order size in accordance with the attributes, inventories, order backlogs and in-process quantities of the raw materials and the required quantities of raw materials data input processing means which modifies the inventory quantities in response to raw material acceptance information and modifies the production plan and raw material inventory quantities in response to production data.

In the above arrangement, the required quantities of respective raw materials are set in accordance with the day-to-day production plan and the aforesaid required quantities are updated every time a change is made in the production plan.

Then, the order size is determined, and an order is placed, with reference to the raw material attributes, such as standard lead time, supply quantity, safe stock level, etc., current inventory, order backlog, in-process quantity and required quantity of the raw material so that the respective raw materials can be made available in amounts just necessary and sufficient for current production needs without the disadvantage of placing an unnecessary order.

Furthermore, as the production plan and raw material inventory values are updated automatically in accordance with raw material acceptance data and production data, a flexible raw material ordering system which is self-adapting to the flow of raw materials can be established.

Thus, the raw material ordering system of the present invention permits placing orders for raw materials which are commensurate with the daily production plan. The required quantities of raw materials are set in response to every change in the production plan for a given day, and based on the required quantities so set, as well as on the attributes, inventory levels, order backlogs and in-process quantities of respective raw materials, the optimum order sizes are determined so that necessary raw materials can be procured when needed and in appropriate quantities.

Since the raw material inventory data and the daily production plans are Automatically updated upon receipt of raw material acceptance data and production data, the correct order sizes can be determined for meeting production needs-without the risk of carrying excessive raw material inventories and, particularly for manufacturers who produce a large variety of products in small lots and, as such, should otherwise go through complicated ordering procedures, can now easily place orders for the necessary raw materials at the right time in just the quantities needed.

Furthermore, it is preferable to arrange the data input processing means so that the order backlog data is updated in response to the input of raw material order acknowledgement and acceptance data and that the in-process data be also updated in response to the input of the order acknowledgement data.

Raw Material Ordering System II

It is a third object of the present invention to provide a raw material ordering system which controls raw material inventories in all forms according to processes and permits placing orders for necessary raw materials when needed and in the quantities needed, or at optimum times, without the disadvantage of carrying excessive inventories in the respective processes. This system is for those raw materials which require processing after placement of an order.

To accomplish the above object, the raw material ordering system of the present invention places orders for the necessary raw materials comprises a raw material history memory means which, for any raw material undergoing various processes before it attains its final form, memorizes the relationship of the condition at feeding to each process with the condition at completion of the process, a raw material inventory register means which determines and registers the inventory quantity of each raw material, a product constitution memory means which memorizes the raw materials constituting each product and the required quantities thereof, a raw material demand setting means which, for the necessary raw materials, determines the raw material demand quantities for respective processes retroactively from release to feeding in each process by reference to the raw material history memory means, and a raw material order processing means which issues an order for any raw material to each process in accordance with the raw material demand quantity set by the raw material demand setting means and the raw material inventory quantity registered in the raw material inventory register means.

In the above arrangement, the relationship between feeding and release of each raw material undergoing various processes such as working, assembling, etc. are memorized as raw material history information. Therefore, once a scheduled marketing quantity is set for a given product, the required quantities of raw materials at each process level can be determined by tracing the flow back from the finished product to each necessary raw material and thence to the form of the same raw material at feeding to the process for conversion to the form suited for release.

Since, in this manner, an order can be issued to each of the processes for any raw material in the corresponding form or condition, the required raw materials can be procured when needed and in the quantities needed without the risk of carrying unnecessary raw material inventories.

Thus, in accordance with the raw material ordering system of the present invention, since ordering can be made on a process-by-process basis or in accordance with the form of each raw material at each process level by reference to the history of the raw material, viz. finishing, assembling, etc. (factory) up to the final raw material, the risk of carrying an excessive inventory can be avoided and the required raw materials can be made available when needed and in the quantities needed.

BRIEF DESCRIPTION OF THE DRAWINGS

FIG. 3 is a schematic view illustrating an example of product characteristics classification in the table of FIG. 2;

FIG. 4A through 4E each is a diagram showing the data structure of a sampled outlet characteristics data table;

FIG. 9 is a flow chart showing the action of a production quantity determining routine;

FIG. 10A through 10D each is a diagram showing the data structure of a raw material data table;

FIGS. 42 through 46 and 48 are views showing data tables in the same embodiment;

FIGS. 49(a)–(d) are explanatory diagrams showing the same data tables substituted by factual values;

DETAILED DESCRIPTION OF THE PREFERRED EMBODIMENTS

Figure 1:
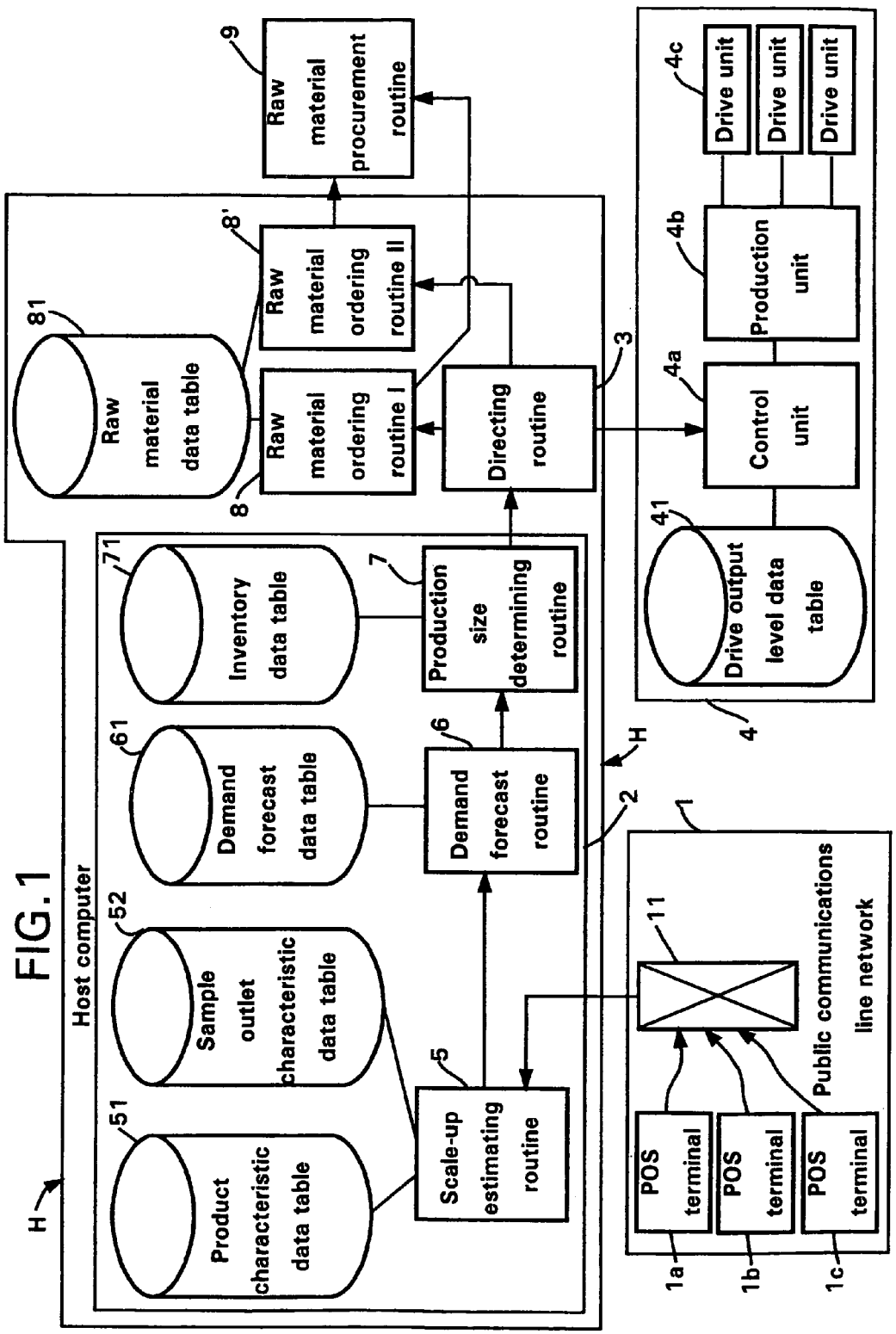
FIG. 1 is an overall block diagram showing an embodiment of the production system for retail goods in accordance with the present invention.

FIGS. 1 through 14 are views illustrating an embodiment of the production system linked to retail sales in accordance with the present invention. As shown, this system comprises a retail sales information collecting means 1, a production size setting means 2, a directing means 3 for directing the preparation and production of raw materials, and a production means 4.

The retail sales information collecting means 1 comprises a plurality of point-of-sale (POS) terminal units 1a, 1b, 1c . . . installed at different retail outlets and a public communications line network 11 connecting the POS terminal units 1a, 1b, 1c . . . with a host computer H. These POS terminals 1a, 1b, 1c . . . each stores in memory the product names and the quantity of each product sold and transmits the stored information to the host computer H daily at a fixed hour of the day.

These POS terminals 1a, 1b, 1c . . . are not installed at all the retail outlets for any given product but are installed at sample outlets representing a given percentage of the total of such retail outlets. These sample outlets are selected from among the volume-selling outlets so that the system may receive sales information more efficiently.

The production size setting means 2 includes a scale-up estimating routine 5, a demand forecast routine 6 and a production size determining routine 7.

The scale-up estimating routine 5 receives sales information from the plurality of POS terminals 1a, 1b, 1c . . . through the public communications line network 11 from time to time as input data. In this scale-up estimating routine 5, a scale-up estimate is obtained by means of the following equation (1). Scale-up estimate=

$$\begin{bmatrix} \text{Number of units of} \\ \text{product } X \text{ sold} \\ \text{at sample outlets} \end{bmatrix} \times \frac{\begin{bmatrix} \text{Total number of} \\ \text{units purchased by} \\ \text{all outlets during} \\ \text{past year.} \end{bmatrix}}{\begin{bmatrix} \text{Total number of} \\ \text{units purchased} \\ \text{by sample outlets} \\ \text{during past year} \end{bmatrix}} \times \begin{bmatrix} \text{Estimated deviation} \\ \text{for product } X \text{ when} \\ \text{all outlets are substituted for sample} \\ \text{outlets} \end{bmatrix} \quad (1)$$

The manner of the above estimation is now described using an example.

Figure 2:
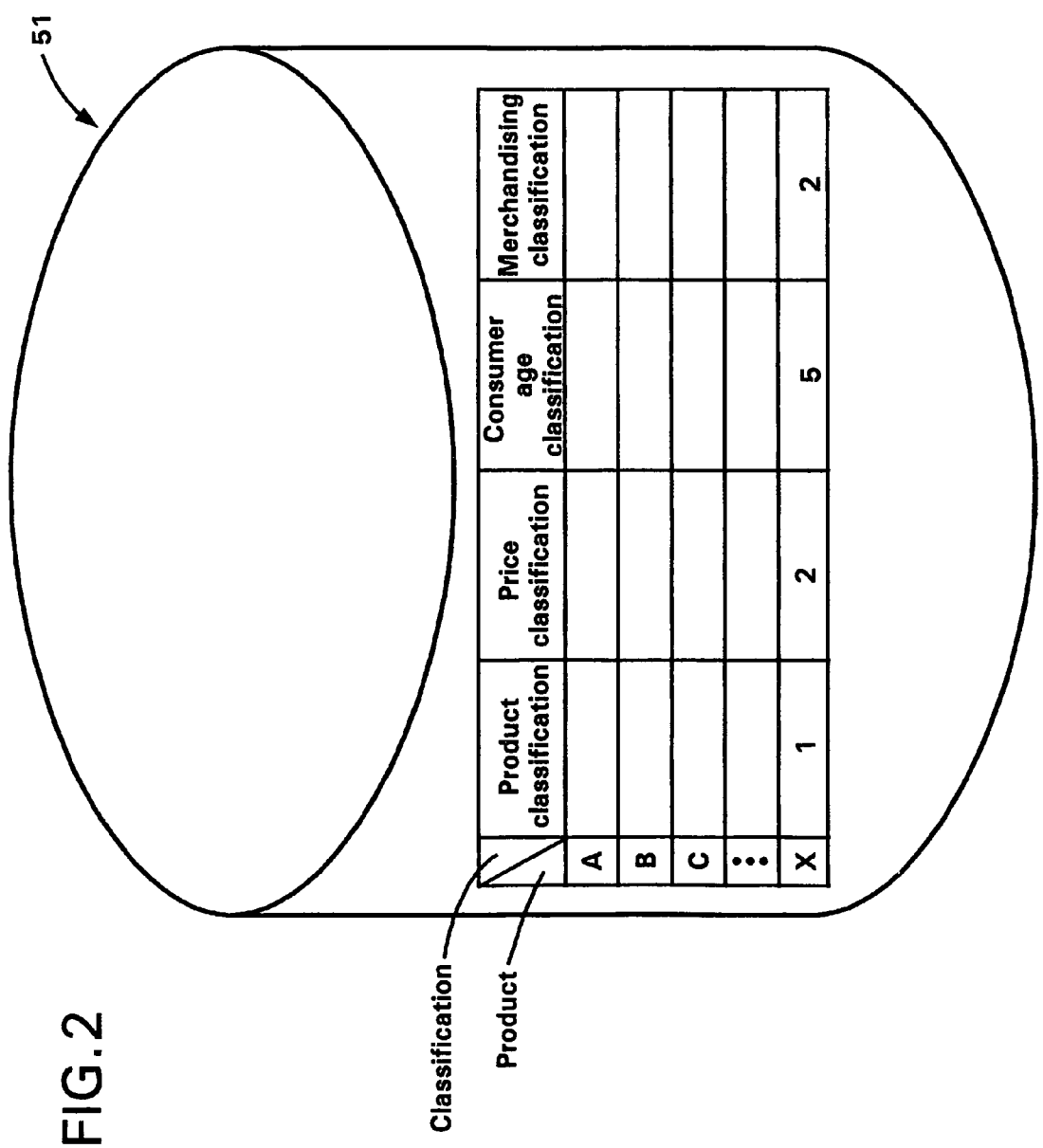
FIG. 2 is a diagram illustrating the data structure of a product characteristics data table.

FIG. 2 shows an example of the product characteristics data table 51 connected to the scale-up estimating routine 5. Here, for each of products A, B, C . . . X, the product classification, price classification, consumer age classification and merchandising classification data are stored.

FIG. 3 shows the particulars of each of the above four classifications. The product classification comprises six classes, namely foundation cosmetic, make-up cosmetic, shampoo & rinse, perfume & cologne, cosmetic sundries, and men's cosmetics as represented by the numerals of 1 through 6, respectively. The price classification comprises five classes of low, medium-low, medium, medium-high, and high. The consumer age distribution comprises five classes, namely low, intermediate between low and average, average, intermediate between average and high, and high as represented by numerals 1 through 5, respectively. The merchandising classification comprises five classes, namely display sale, rather display sale, equivocal, rather counseling sale, and counseling sale as represented by numerals 1 through 5, respectively.

The above product characteristics data are determined at the stage of product planning and as shown by entries in the column of product X in FIG. 2, the above-mentioned numerals are entered and stored for respective classes of each classification. Thus, product X corresponds to Product Classification: 1 foundation cosmetic, Price Classification: 2 medium-low, Consumer Age Classification: 5 high, and Merchandising Classification: 2 rather display sale. Stated differently, product X is "a foundation cosmetic for consumers of advanced (high) age who spend in medium-to low-price goods, which is merchandised by a method of sale which is rather close to display sale."

Figure 4E:
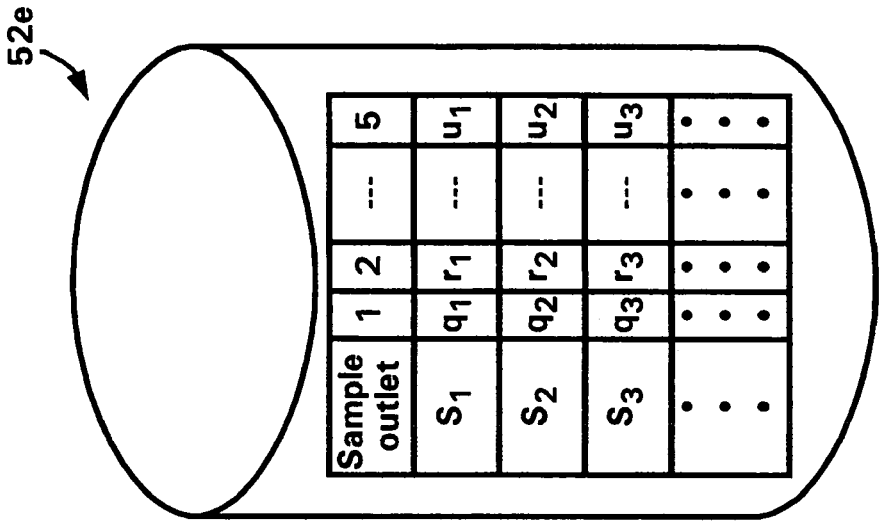
Figure 4D:
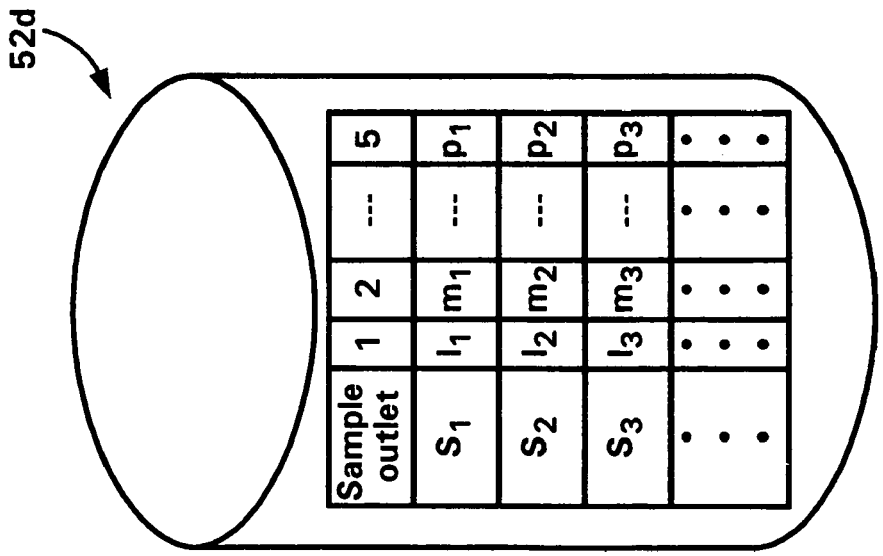

FIGS. 4A through 4E are views showing examples of sample retail outlet characteristics data table 52. Here, for each of sample outlets $S_1$, $S_2$ and $S_3$, data on the constitution and quantities of purchases during the past year relative to those of all retail outlets are entered and stored. Thus, FIG. 4A is a data table 52$a$ showing the relative sale for each of sample outlets $S_1$, $S_2$, $S_3$, . . . . FIGS. 4B through 4E are data tables 52$b$, 52$c$, 52$d$ and 52$e$ showing the product characteristic, price characteristic, consumer age characteristic and merchandising characteristic, respectively, for each of sample outlets $S_1$, $S_2$, $S_3$ . . . . The aforesaid four characteristics in these data tables 52$b$, 52$c$, 52$d$ and 52$e$ are represented in index numerals (1 if each is the same as the national average) in correspondence with the four classifications described hereinbefore with reference to FIG. 3. Thus, for example, the index for Product Classification: 1 foundation cosmetic is $a_1$ and the index for Price Classification: 1 low is $g_1$, for sample outlet $S_1$.

Assuming that the quantities of product X sold at sample outlets $S_1$, $S_2$ and $S_3$ are $Y_1$, $Y_2$ and $Y_3$, respectively, the scale-up estimate for product X can be calculated by the following equation using the data from the aforementioned product characteristics data table 51 and the sample outlet data table 52. Scale-up estimate for product X=

$$(y_1 + y_2 + y_3) \times \frac{1}{\alpha_1 + \alpha_2 + \alpha_3} \times \\ \frac{\alpha_1 + \alpha_2 + \alpha_3}{(\alpha_1 a_1 + \alpha_2 a_2 + \alpha_3 a_3)} \times \frac{\alpha_1 + \alpha_2 + \alpha_3}{(\alpha_1 h_1 + \alpha_2 h_2 + \alpha_3 h_3)} \times \\ \frac{\alpha_1 + \alpha_2 + \alpha_3}{(\alpha_1 p_1 + \alpha_2 p_2 + \alpha_3 p_3)} \times \frac{\alpha_1 + \alpha_2 + \alpha_3}{(\alpha_1 r_1 + \alpha_2 r_2 + \alpha_3 r_3)} \tag{2}$$

Thus, as the set characteristics of product X are Product Classification 1, Price Classification 2, Consumer Age Classification 5 and Merchandising Classification 2 as shown in FIG. 2, the indexes for respective characteristics shown in FIGS. 4B through 4E correspond to the above classifications, namely $a_1$, $a_2$ and $a_3$ for Product Characteristic 52$b$, $h_1$, $h_2$ and $h_3$ for Price characteristic 52$c$, $P_1$, $P_2$ and $P_3$ for Consumer Age Characteristic 52$d$, and $r_1$, $r_2$ and $r_3$ for Merchandising Characteristic 52$e$.

The scale-up estimating routine 5 for calculating scale-up estimates is connected to a demand forecast routine 6 which predicts demands according to the scale-up estimates for respective products which are available from the scale-up estimating routine.

Figure 5B:
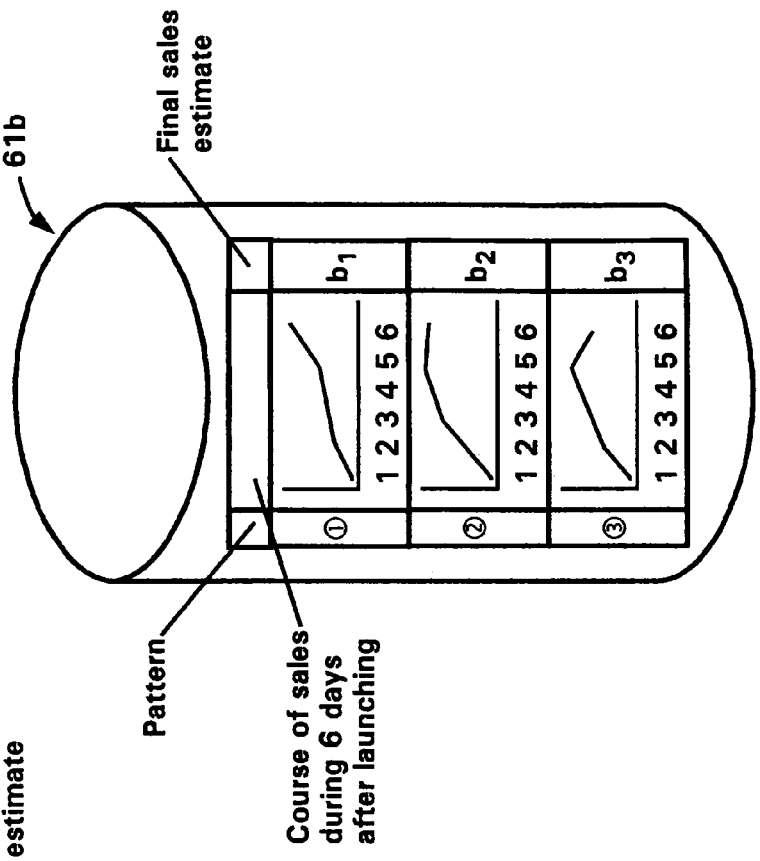
FIG. 5A and 5B each is a diagram showing the data structure of a demand forecast data table.
Figure 5A:
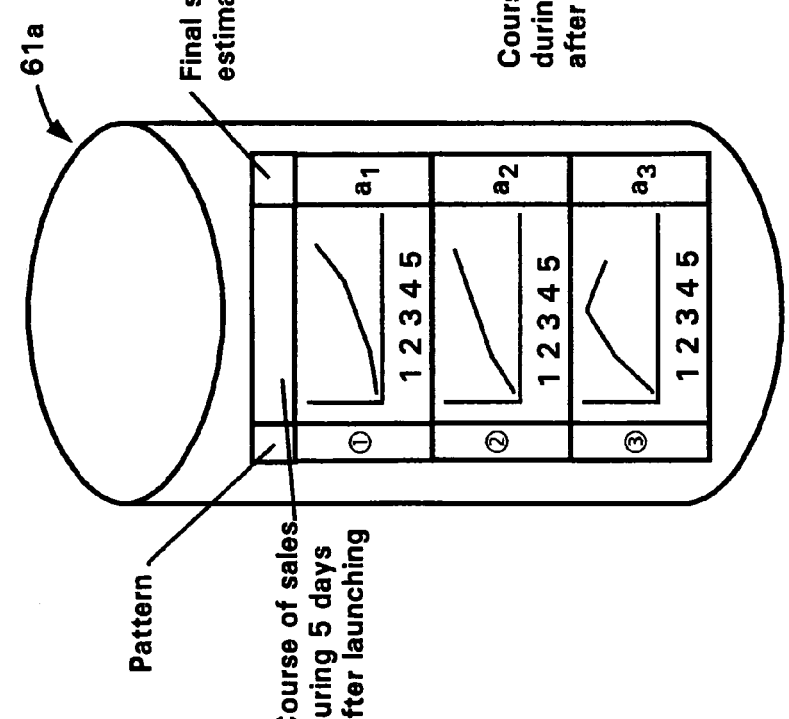
Figure 6:
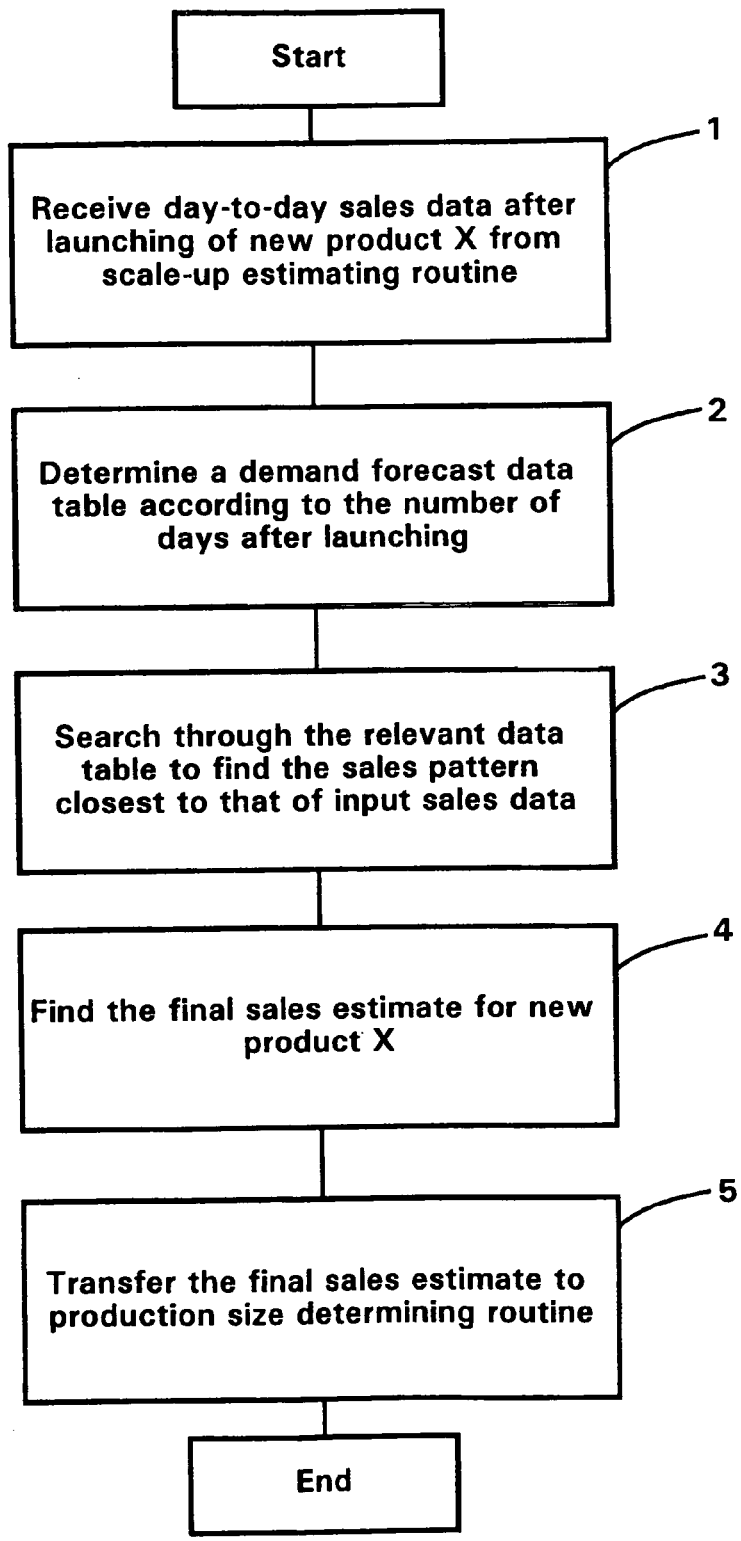
FIG. 6 is a flow chart showing the action of a demand forecast routine.

This demand forecast routine 6 performs a demand forecast in the steps shown in the flow chart of FIG. 6 using the data stored in demand forecast data tables 61$a$, 61$b$ shown in FIGS. 5A and 5B. Thus, stored in the demand forecast data table 61$a$ of FIG. 5A are many sales course patterns (3 patterns ① through ③ in the views) during 5 days following the launching of the product and the final sales estimates applicable to the respective patterns ① through ③. Similarly stored in the demand forecast data table 61$b$ shown in FIG. 5B are the sales course patterns after the 5 days, namely during 6 days after launching, as well as final sales estimates, for the product for which the pattern ② was found in the table 61$a$.

Then,

Step ①: Receiving of daily sales course data after launching of new product X from the scale-up estimating routine 5;

Step ②: Selecting the relevant demand forecast data table 61 according to the number of days after launching. Thus, if it is 5 days after launching, the above table 61$a$ for 5 days is selected and if it is 6 days, table 61$b$ is selected.

Step ③: Searching through the data table 61 selected in step ② to find a sales course pattern nearest to the pattern of sales course data received.

Step ④: Finding the final sales estimate for the product.

Step ⑤: Transferring the above estimate to a production size determining routine 7 which is described hereinafter.

Figure 7:
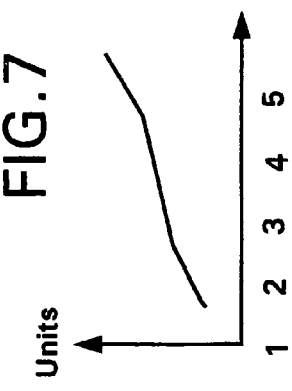
FIG. 7 is a diagram showing the sales course pattern of a product.

Thus, let it be assumed that the sales course pattern during 5 days following the launching of new product X is as shown in FIG. 7. Then, the demand forecast data table 61$a$ shown in FIG. 5A is chosen as the relevant table and this table 61$a$ is searched through for pattern matching. As a result, the sales course pattern of new product X is found to approximate the pattern ② stored in the table 61$a$ and a forecast is made that at least $a_2$ units of this product X will be ultimately sold. Then, the production size determining routine 7 is approached accordingly. Since this final sales estimate is the lowest value selected by reference to the past sales performance, the very selection of pattern ② in the table 61$a$ guarantees the sale of $a_2$ units.

Figure 8:
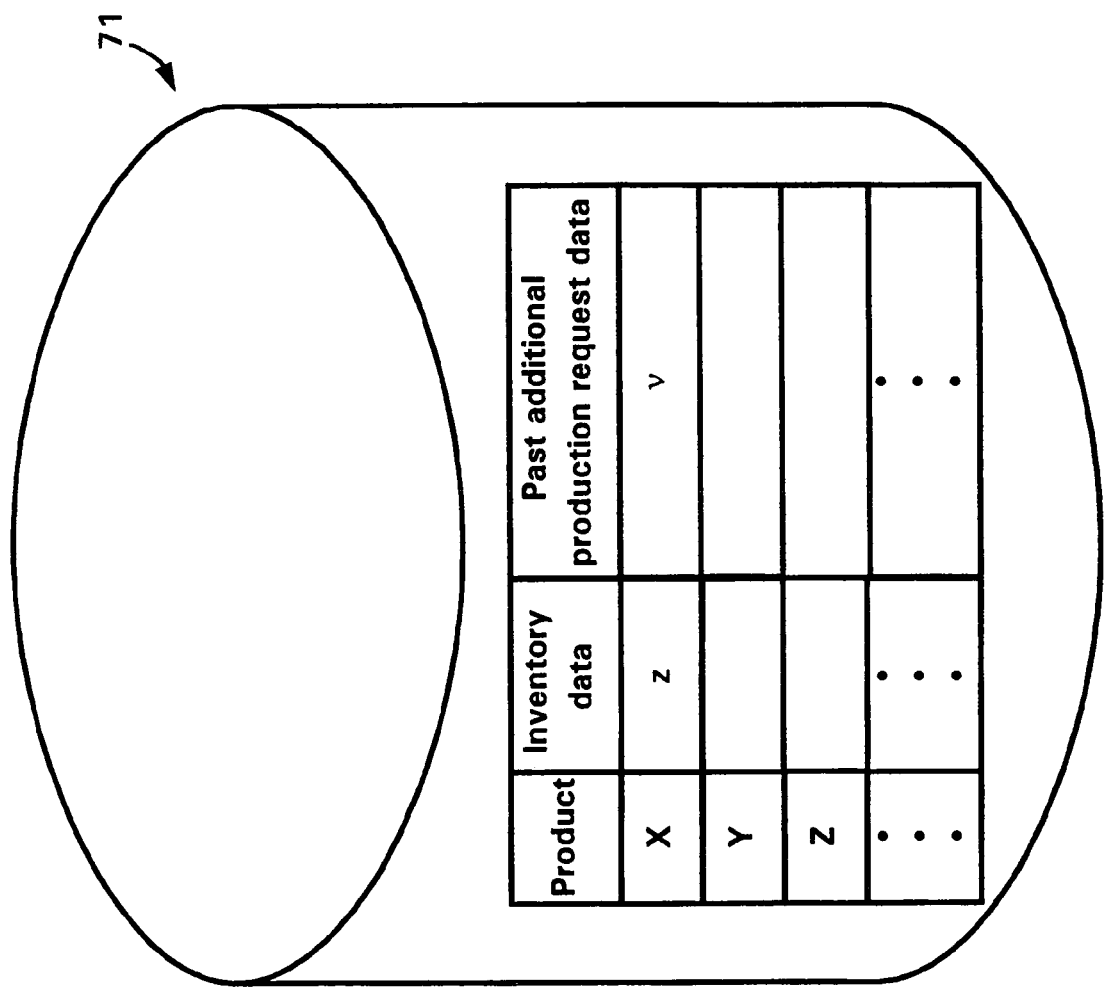
FIG. 8 is a diagram showing the data structure of an inventory data table.

The final sales estimate thus obtained in the demand forecast routine 6 is fed to the production size determining routine 7 connected to the demand forecast routine, where the production size is determined in the steps shown in the flow chart of FIG. 9 using an inventory data table 71 shown in FIG. 8. Thus, stored in the inventory data table 71 of FIG. 8 are the inventory quantities and past additional production request quantities for new products X, Y, Z . . . .

Thus,

Step ①: Retrieving the final sales estimate X for new product X from said demand forecast routine Step ②: Retrieving the inventory quantity z and past additional production request quantity v for product X from said inventory data table 71

Step ③: Assuming that the number of days after launching of new product X is n days, calculating the sales volume by scale-up estimation for this period, $$\sum_{i=1}^{n} yi$$

(yi is the sales volume by scale-up estimation on day i after launching)

Step ④: Calculating the required size of additional production of new product X by means of the following equation (3):

$$X - \sum_{i=1}^{n} yi - z - v = \text{required size of additional production } S \tag{3}$$

required size of additional production $S$ \hspace{2em} (3)

Step ⑤: Transferring this required size of additional production S to the raw material ordering routine 8 and the control routine 4$a$ for the production means 4, which are described hereinafter.

Step ⑥: Updating the additional production request quantity data in the inventory data table 71 with the result of the above calculation to provide new data.

The required size of additional production thus determined in the production size determining routine 7 is fed to the raw material ordering routine 8 and the control routine 4a for the production means 4 simultaneously through the directing means (directing routine) 3 connected to the determining routine 7 for timely production.

As the production is completed in the production means 4, the inventory data and past additional production request quantity data in the inventory data table 71 are updated to provide new data. Thus, the current inventory of new product X is Z units but upon receipt, from the control routine 4a of the production means 4, of the information that the production of additional production request quantity S of product X has just been completed, the inventory data for product X is updated to Z+S.

Meanwhile, the past additional production request quantity for this product X is U units as of the present time but upon receipt of the information that the production of the required quantity S has been completed, the additional request quantity data is updated to U−S units.

Figure 11:
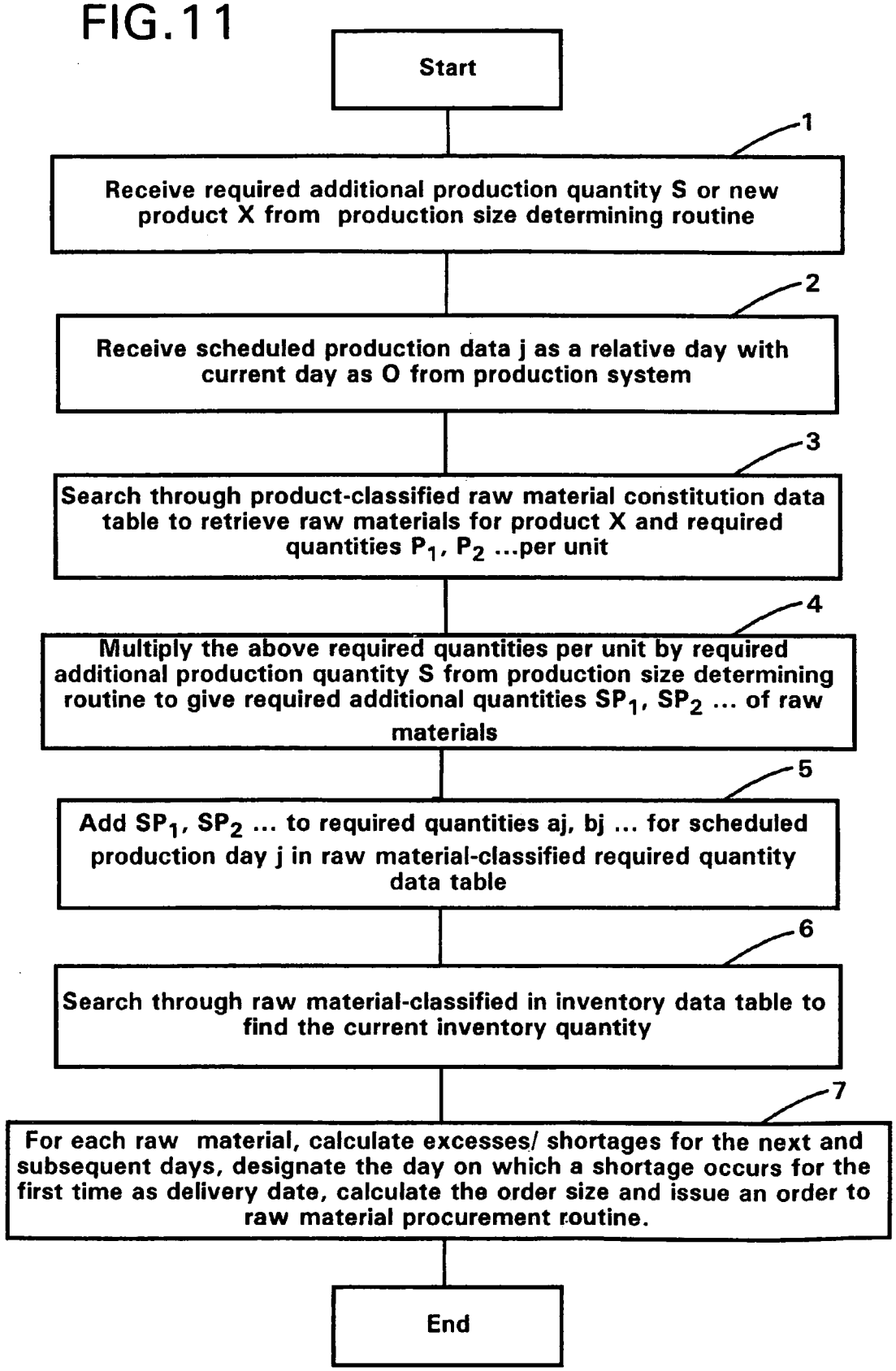
FIG. 11 is a flow chart showing the action of a raw material ordering routine.
Figure 12:
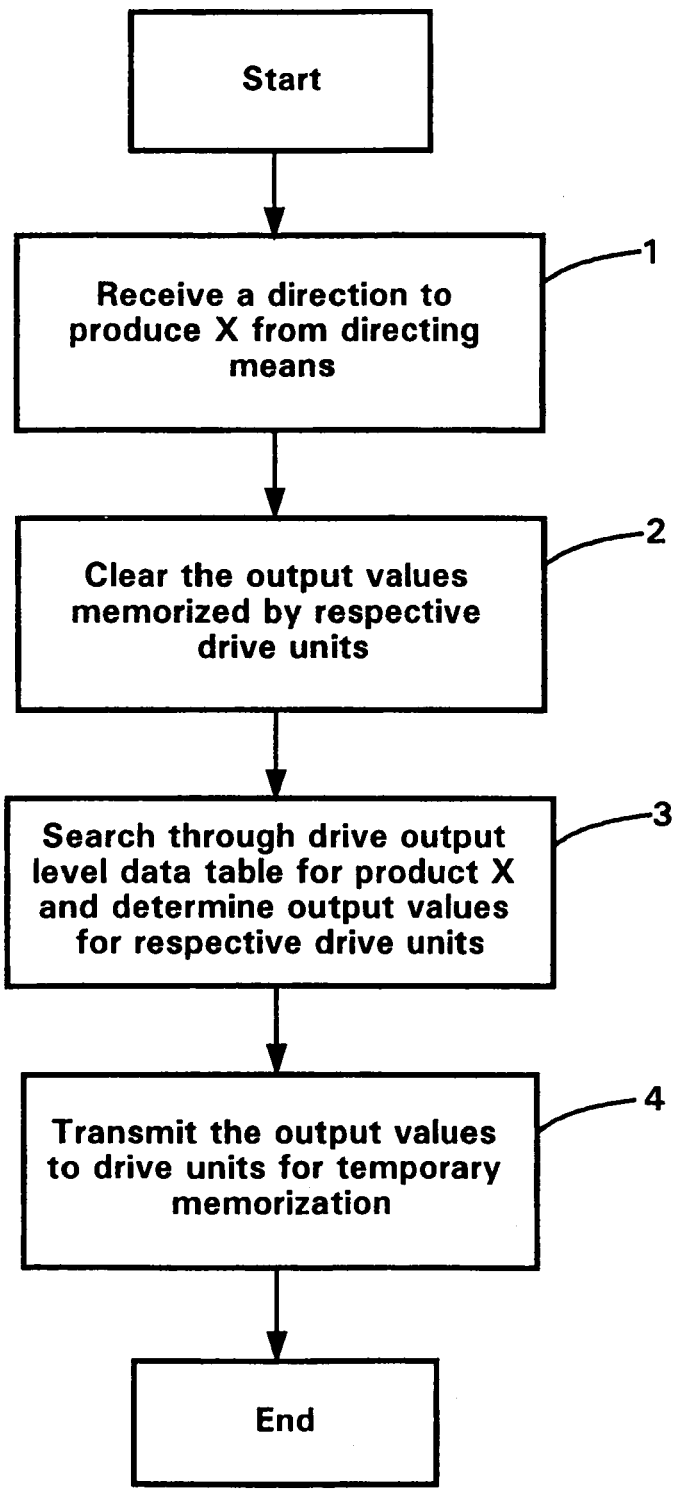
FIG. 12 is a flow chart showing the action of a production means control routine.

A raw material ordering system will now be briefly explained making reference to FIGS. 10 and 11. This system is substantially the same as described in details in the section of Raw material ordering system I below. In this case, a raw material ordering routine 1 I 18 in FIG. 1 is employed. Instead of this raw material ordering routine, one may utilize the system described in the section of Raw material ordering system II below. In this latter case, a raw material ordering routine II 8' in FIG. 1 is used.

Thus, the raw material ordering routine I 8 using the raw material data table 81 shown in FIGS. 10A through 10D calculates the quantities of raw materials to be ordered in the steps shown in FIG. 11 and places orders to a raw material procurement routine 9. This raw material data table 81 comprises a product-classified raw material constitution data table 81a shown in FIG. 10A, a raw material-classified required quantity data table 81b shown in FIG. 10B, a raw material-classified inventory data table 81c shown in FIG. 10C, and a raw material-classified acceptance schedule data table 81d shown in FIG. 10D. Entered and stored in the product-classified raw material constitution data table 81a are the required quantities, per unit, of constituent raw materials α, β . . . for each of product A, B . . . X. For example, these data indicate that $p_1$ units of raw material a are required for the production of 1 unit of product X. Similarly entered and stored in the raw material-classified required quantity data table 81b are the quantities $\alpha_1$, $\alpha_2$, . . . $\alpha_n$ an of each raw material required (to be used) on a day-to-day basis (1~n days). Stored in the raw material-classified inventory data table 81c are the inventory data Zα, Zβ . . . for raw materials α, β . . . , while the acceptance schedule quantity data for raw materials α, β . . . on a day-to-day basis (1~n days) are stored in the raw material-classified acceptance schedule data table 81d.

Thus,

Step ①: Receiving required additional production quantity S for new product X from the production size determining routine 7

Step ②: Receiving scheduled production day information j, with the current day being taken as 0, from the production means 4

Step ③: Searching through the product-classified raw material constitution data table 81a to find the constituent raw materials for this product X and the required quantities $p_1$, $p_2$ . . . thereof per unit of product X Step ④: Multiplying the above required quantities $p_1$, $p_2$ . . . of raw materials per unit by the required additional production size data S from the production size determining routine 7 to determine the required additional quantities of raw materials $sp_1$, $sp_2$ . . . .

Step ⑤: Adding the required additional quantities of raw materials $sp_1$, $sp_2$ . . . to the respective required quantities aj, bj . . . for scheduled production day j in the raw material-classified required quantity data table 81b.

Step ⑥: Searching through the raw material-classified inventory data table 81c to find the current raw material-classified inventory volume data as of the current day.

Step ⑦: Calculating the excess or shortage on each of the following and subsequent days for each raw material by means of the following equation (4) and designating the day on which a shortage occurs for the first time, that is to say when the aforesaid excess/shortage becomes negative, as the delivery date. The order size at this time is determined by the following equation (5) and this order size data is fed to the raw material procurement routine 9. Excess or shortage of raw material a on day k=

$$Z\alpha + \sum_{i=1}^{k}(ai^* - ai) \quad (4)$$

$$\text{Order size} = \sum_{i=1}^{n}(ai - ai^*) - Z\alpha \quad (5)$$

Thus, it is found from the product-classified raw material constitution data table 81a that 3 $p_1$ units of raw material α is required for the production of 3 units of new product X, and in the raw material-classified required quantity data table 81b, this required quantity $3p_1$, is added to the initially required (scheduled to use) quantity aj of raw material α for scheduled production day j. In other words, aj+$3p_1$, units of raw material α is required on day j. This is set as the new aj. Then, assuming that the current inventory of raw material α is Zα units, it is calculated that $$Z\alpha + \sum_{i=1}^{k}(ai^* - ai)$$

units of raw material α will remain on day k. Assuming that this value becomes negative for the first time on day k, this day k is regarded as the delivery date for raw material α.

The production means 4, which receives a direction to produce from the directing routine 3 and performs the directed production, comprises a production unit 4b, which is a hardware component and a control routine 4a which controls the production unit 4b according to the direction.

Figure 13:
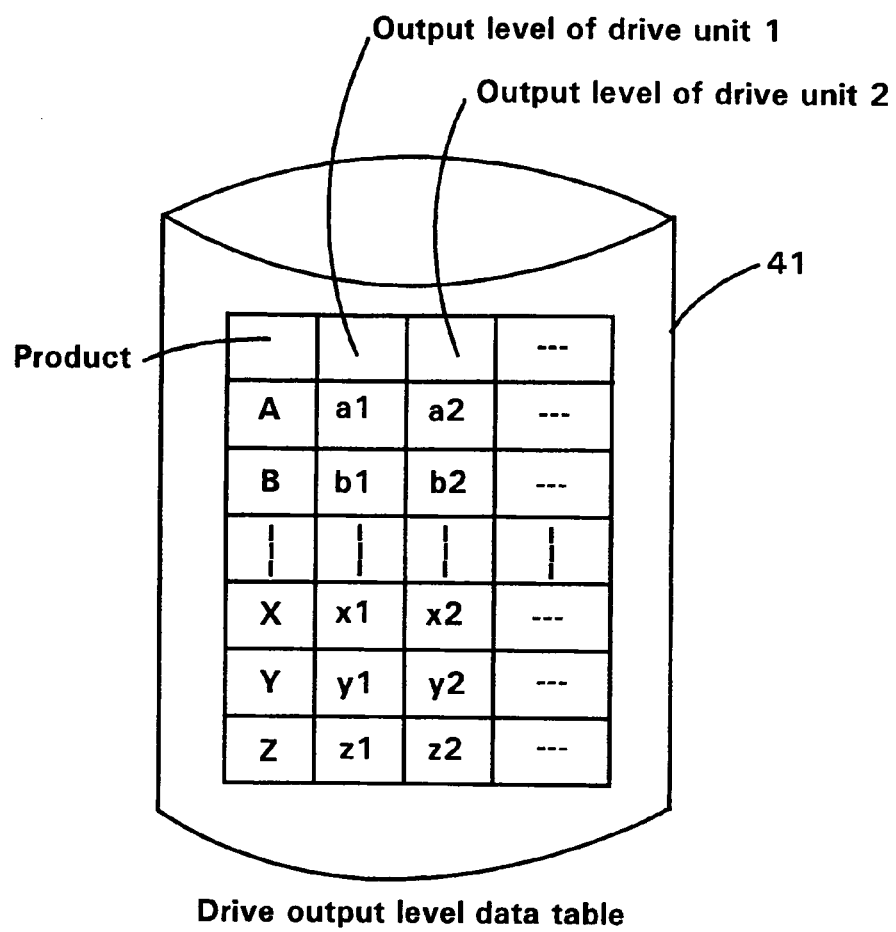
FIG. 13 is a diagram showing the data structure of a drive output data table.

The production unit 4b has drive units 4c for setting and outputting action ranges, speeds and powers for respective machine units and these drive units 4c are controlled by the control routine 4a. And as shown by the flow chart of FIG. 12, a drive unit output data table 41 shown in FIG. 13 is searched through on receipt of a direction to produce for automatic switching of respective drive units 4c. Entered and stored in this drive unit output data table 41 are the output values of drive units 1, 2 . . . for each of products A, B . . . Z.

Thus,

Step ①: Receiving a direction to produce product X from the directing means 3

Step ②: Clearing the output values memorized by respective drive units 4c

Step ③: Searching through the drive unit output data table 41 for this product X to determine output values for the respective drive units 4c Step ④: Transmitting the output values to the respective drive units for temporary memorization and start of the production of product X.

Figure 14:
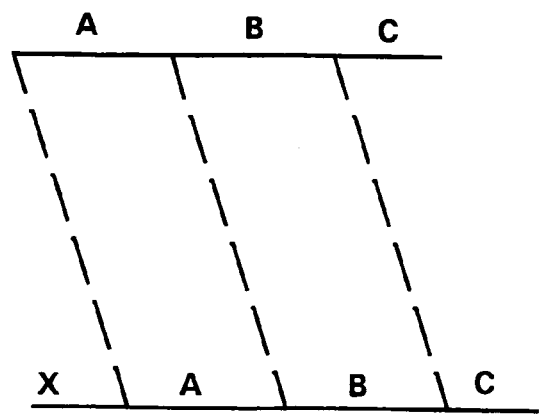
FIG. 14 is a diagram explaining the production system in a production routine.

Furthermore, this production means 4 is constituted so as to immediately respond to a direction to produce from said directing means 3. Thus, it is so arranged, as shown in FIG. 14, that the production line (production unit) 4b to which a direction for additional production of new product X will be issued is normally used for the production of staple products A, B and C (products such that if produced in anticipation, there is no risk of carrying large inventories) which are comparatively long in delivery term and that when a direction for additional production of new product X arrives from said directing means 3, the production of staple-products A, B and C is deferred in the order mentioned to give priority to the production of this product X. Thus, for product X, the action from step ② explained with reference to FIG. 12 can be immediately commenced.

Figure 57:
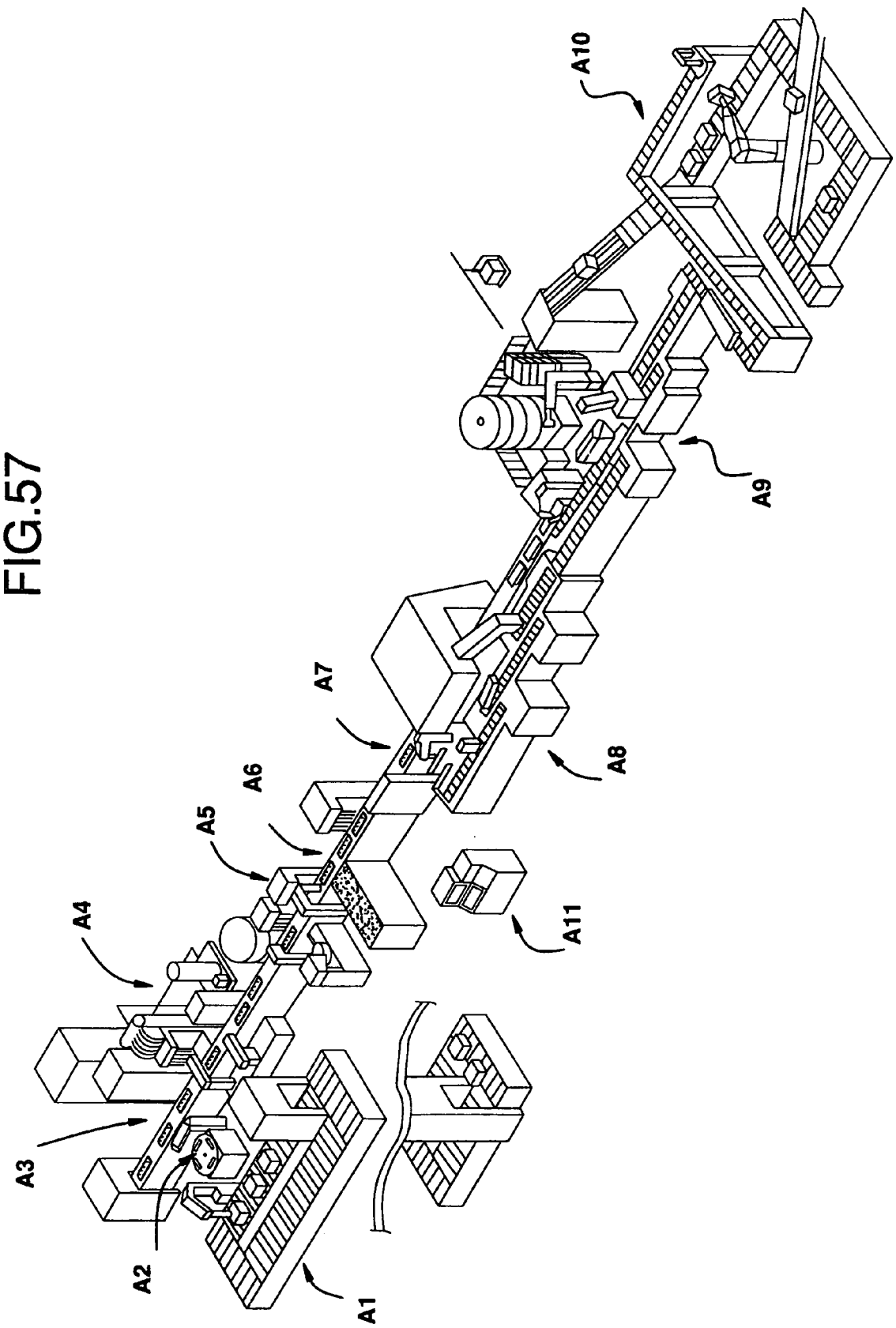
FIGS. 57 and 58 respectively show examples of production means having drive units and control routines.

An example of the production means 4 is shown in FIG. 57, which is used for producing, for example, bottled lotions. The reference characters $A_1$ to $A_{10}$ and $A_{11}$ denote drive units and a control routine respectively.

Bottles are taken out from a box at the unit $A_1$, examined at the unit $A_2$, and conveyed by the unit $A_3$. Cosmetic materials (lotions) are bottled by the unit $A_4$. And inner caps and outer caps are fastened by the units $A_4$ and $A_5$ respectively. The outer appearance of the bottles are then examined by the unit $A_7$. A few bottles are packed in a box at the unit $A_{81}$ a certain number of such boxes are packed in a larger box at the unit $A_9$, and furthermore a certain number of the larger boxes are packed in a still larger box at the unit $A_{10}$. These drive units are controlled by a control routine $A_{11}$.

Figure 58:
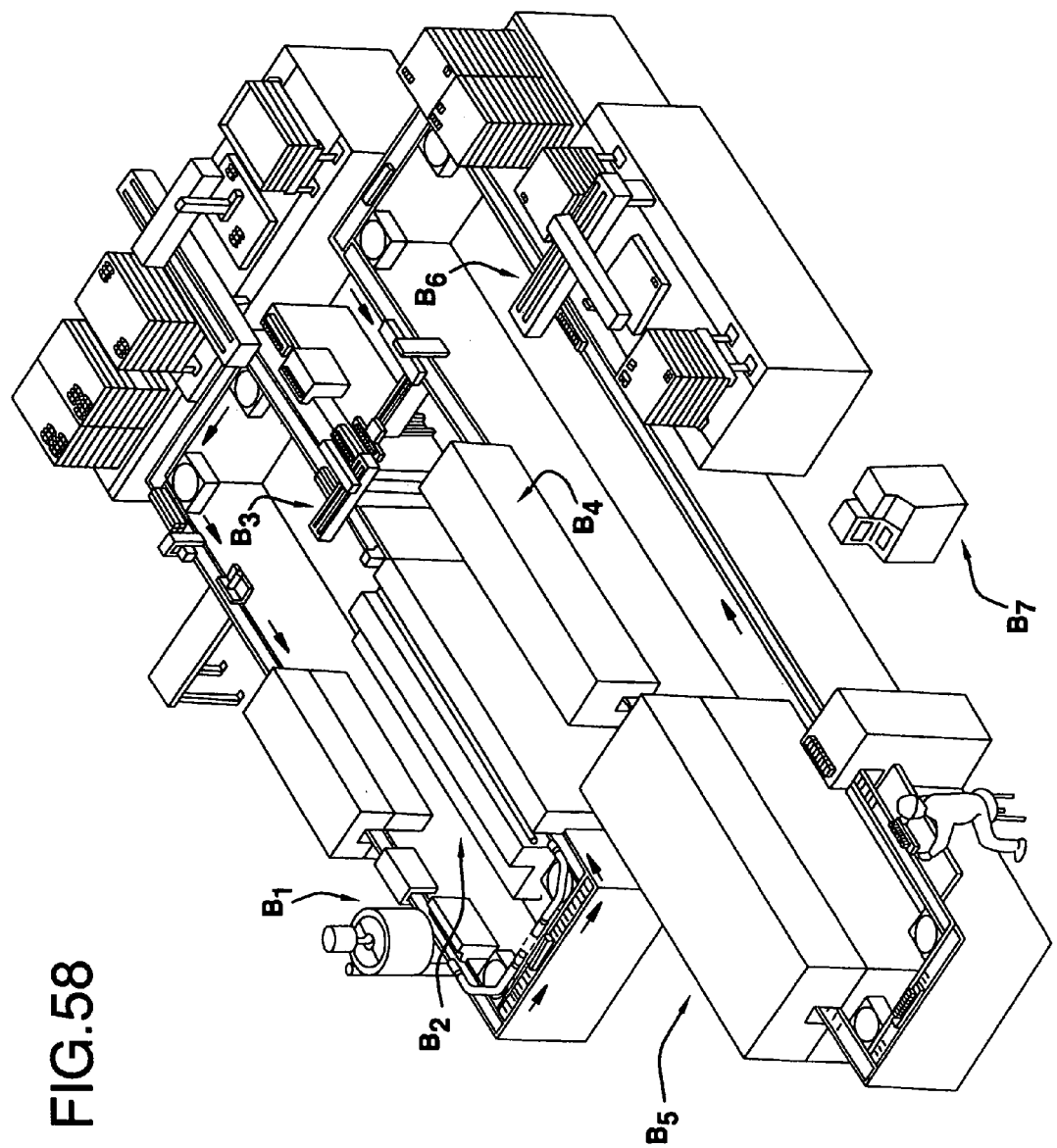

FIG. 58 shows another example of the production means 4 which is used for producing other products. The reference characters $B_1$, to $B_6$ denote drive units and $B_7$ denotes a control routine. Containers are filled at $B_1$ and are processed at $B_2$ and further packaged at $B_3$. An exterior of the packaged product is treated at $B_4$ and $B_5$ and then put into a final larger package at $B_6$. Products are processed in drive units $B_1$, to $B_6$ and the drive units $B_1$ to $B_6$ are controlled by the control routine $B_7$ as in FIG. 57.

Raw Material Ordering System I

FIGS. 15 through 32 show a raw material ordering system embodying the present invention. In this system, a raw material ordering routine I 8 in FIG. 1 is used.

Figure 15:
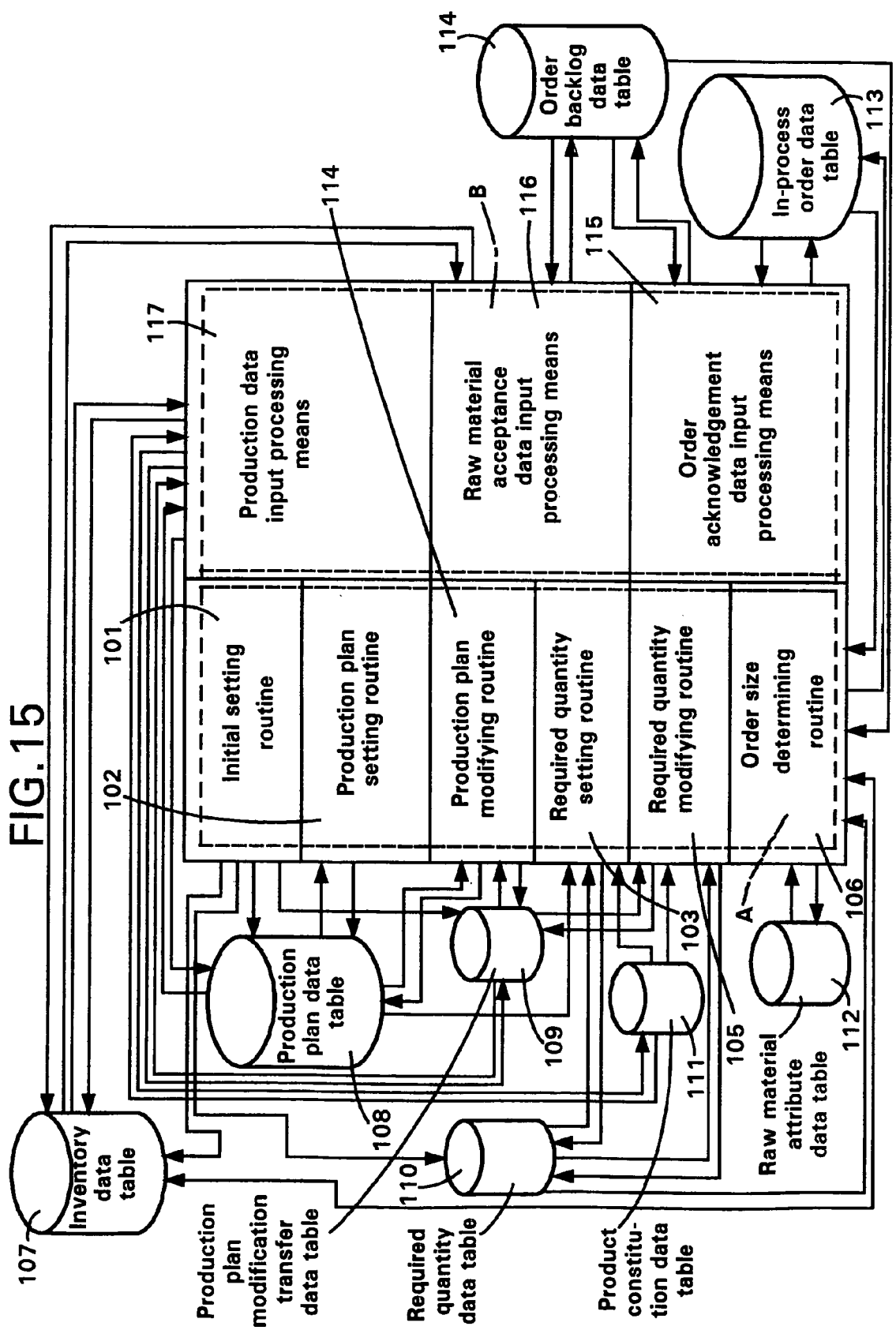
FIG. 15 is a view-showing the overall construction of a raw material ordering system as an embodiment of the invention.

FIG. 15 is a view showing the overall construction of the raw material ordering system of the embodiment. As shown, this system comprises an order size determining means A and a data input processing means B.

The order size determining means A comprises an initial setting routine 101, a production plan setting routine 102, a required quantity setting routine 103, a production plan modifying routine 104, a required quantity modifying routine 105 and a order size determining routine 106.

Figure 17:
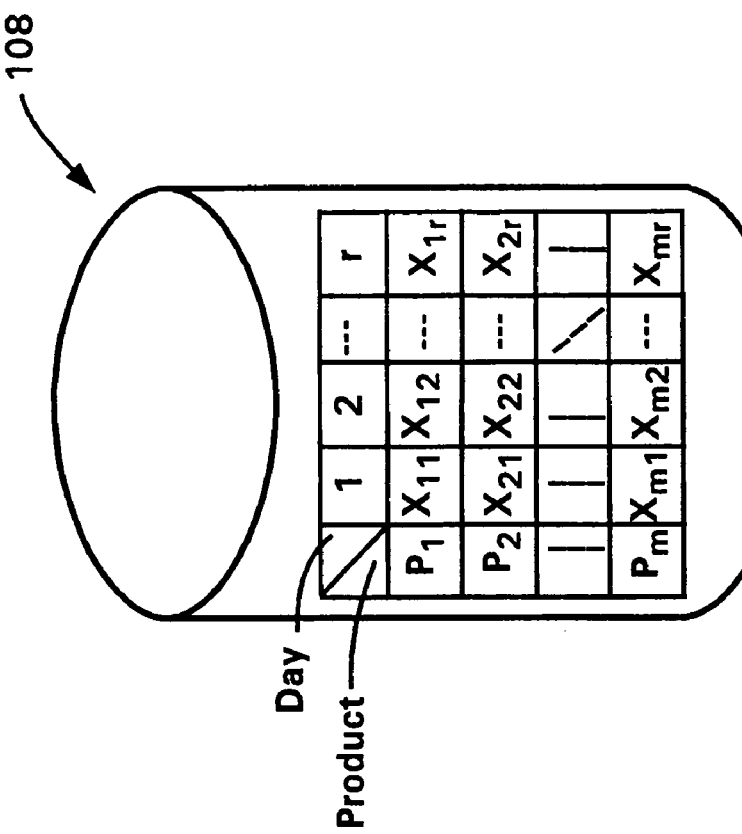
FIGS. 16 through 19 are diagrams showing an inventory data table, a production plan data table, a production plan modification transfer data table and a required quantity data table, respectively.
Figure 16:
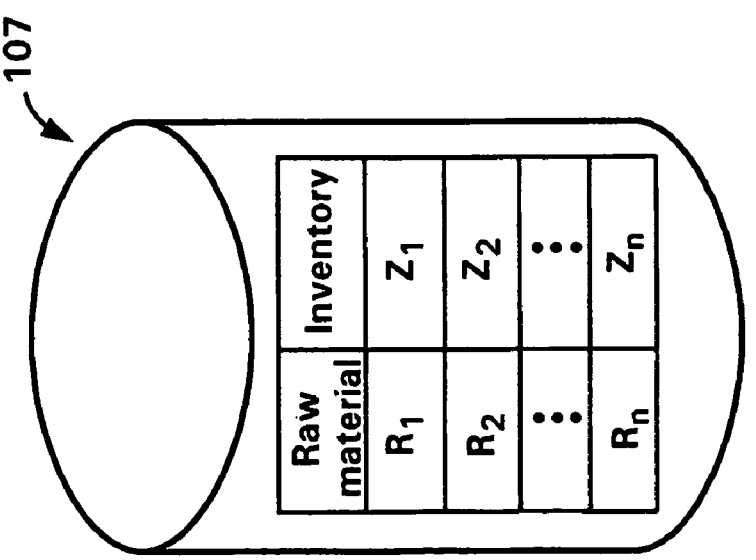
Figure 19:
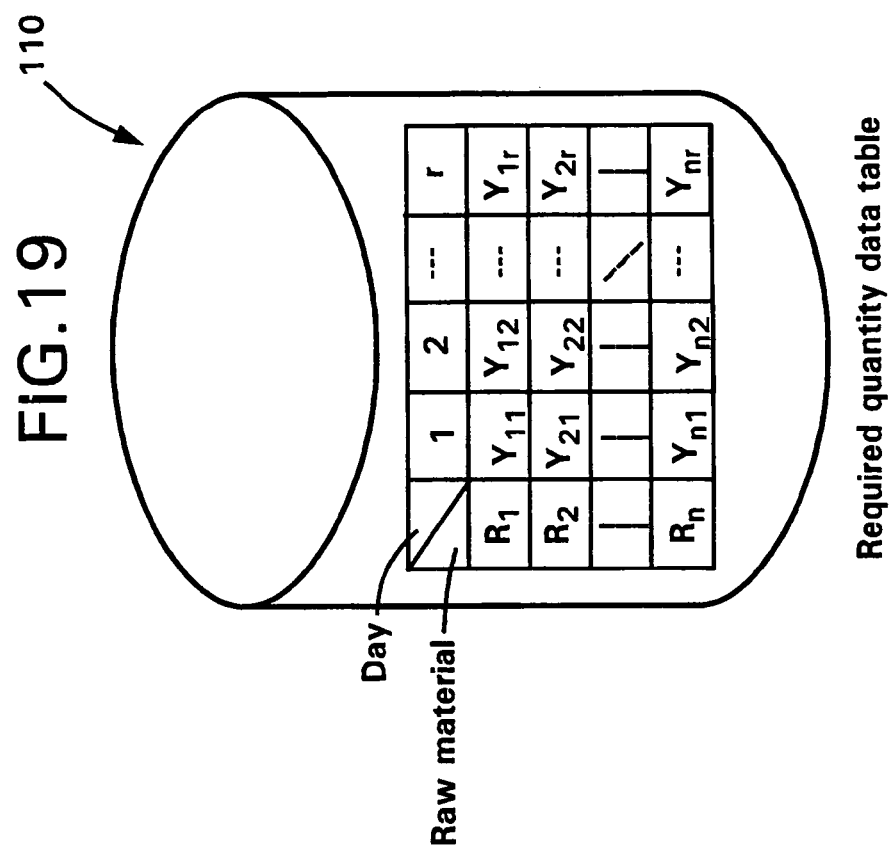
Figure 18:
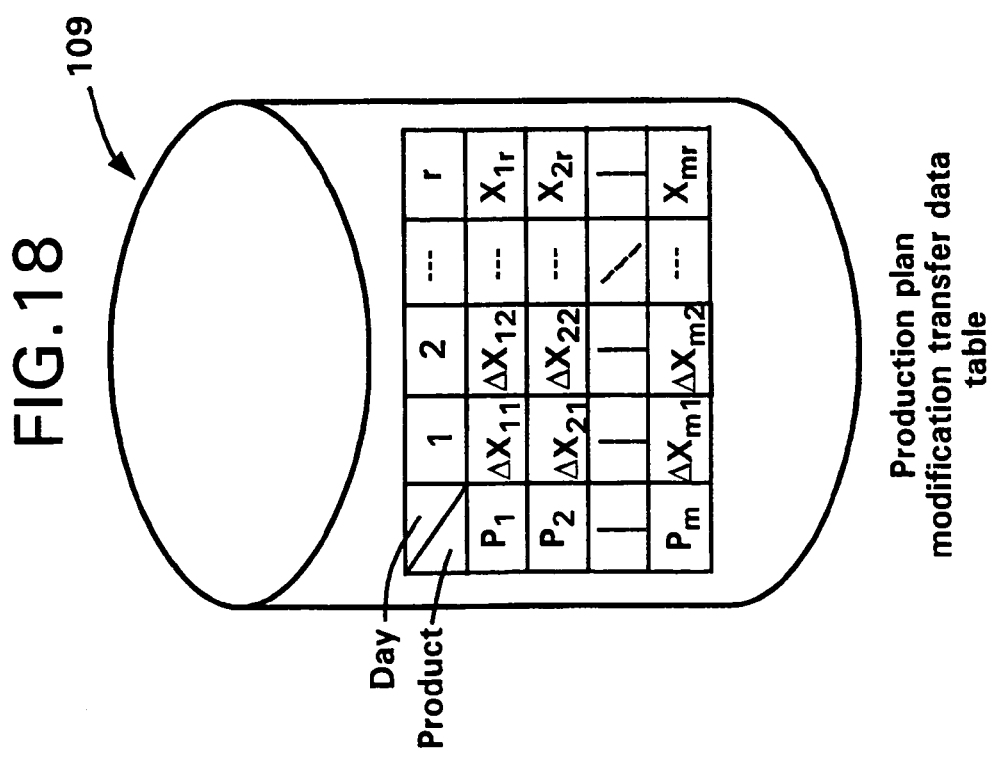
Figure 20:
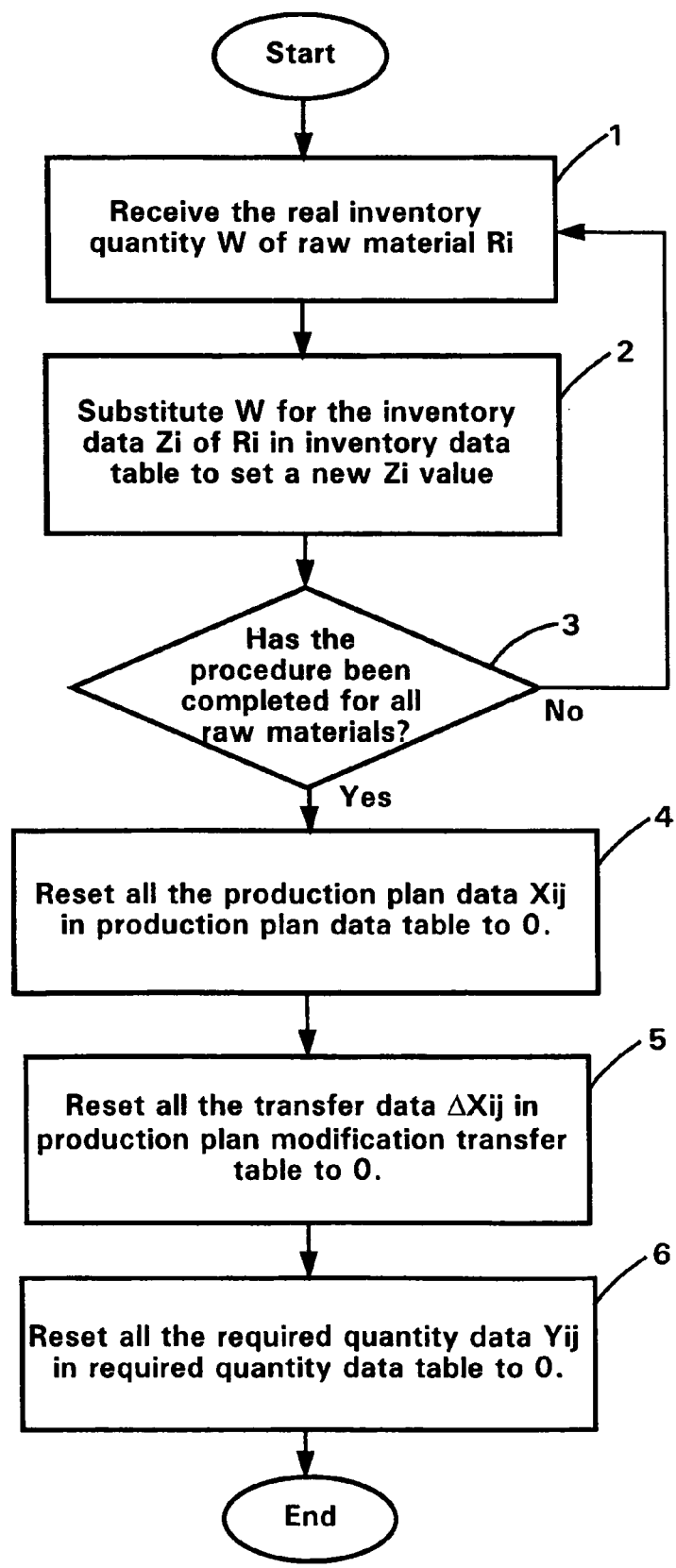
FIG. 20 is a flow chart showing steps in an initial setting routine.
Figure 21:
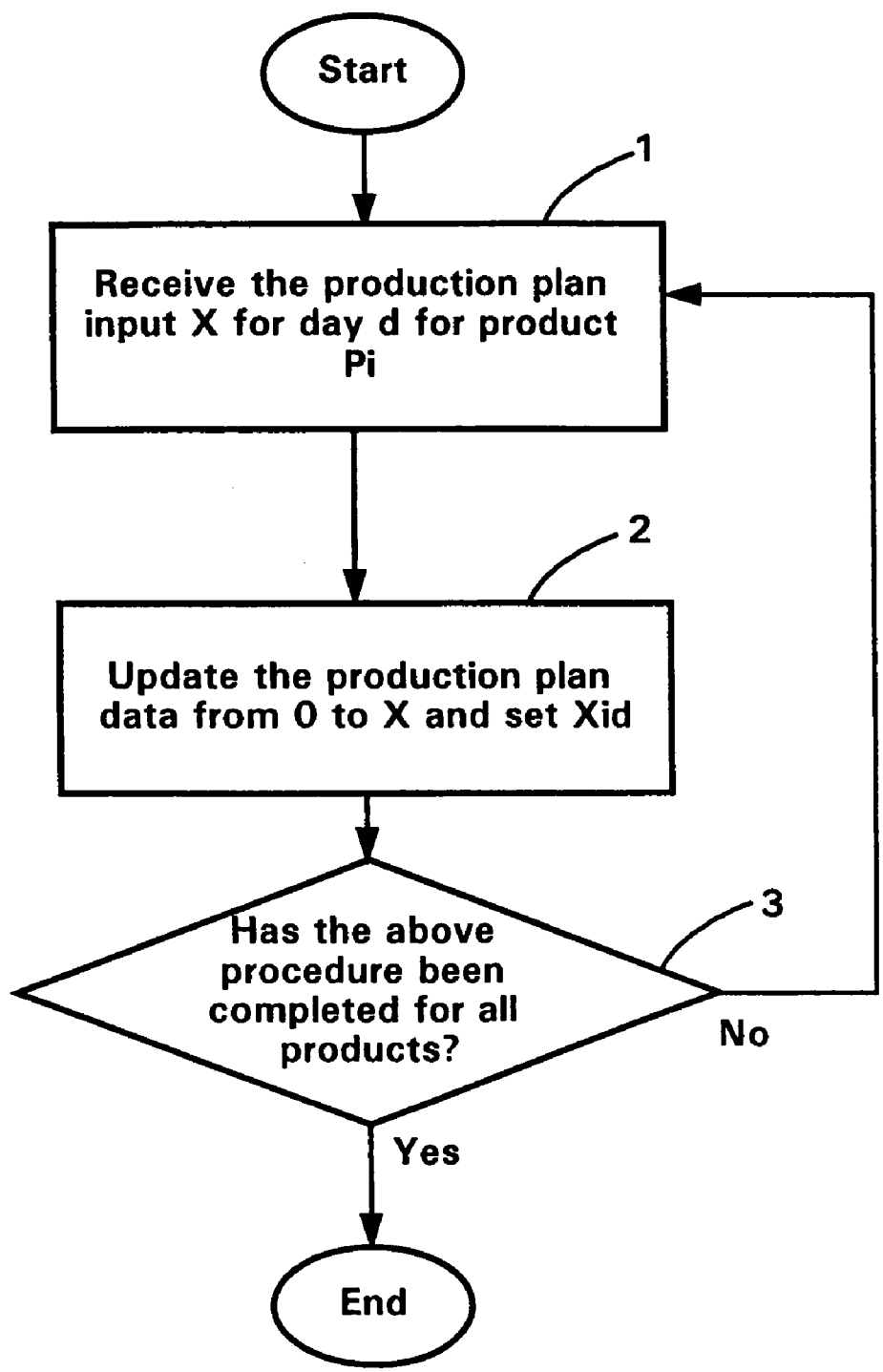
FIG. 21 is a flow chart showing steps in a production plan setting routine.
Figure 22:
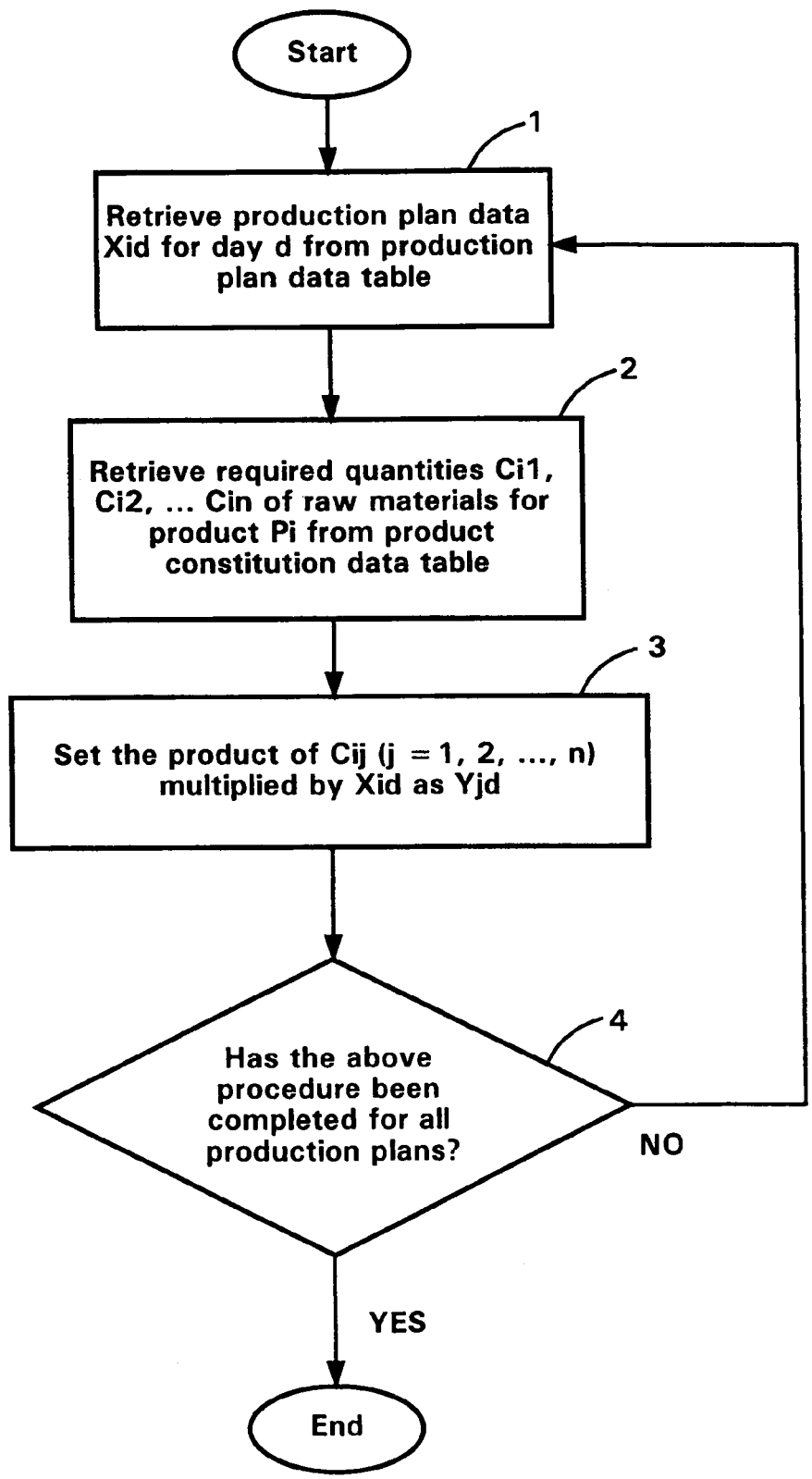
FIG. 22 is a flow chart showing a required quantity setting routine.
Figure 23:
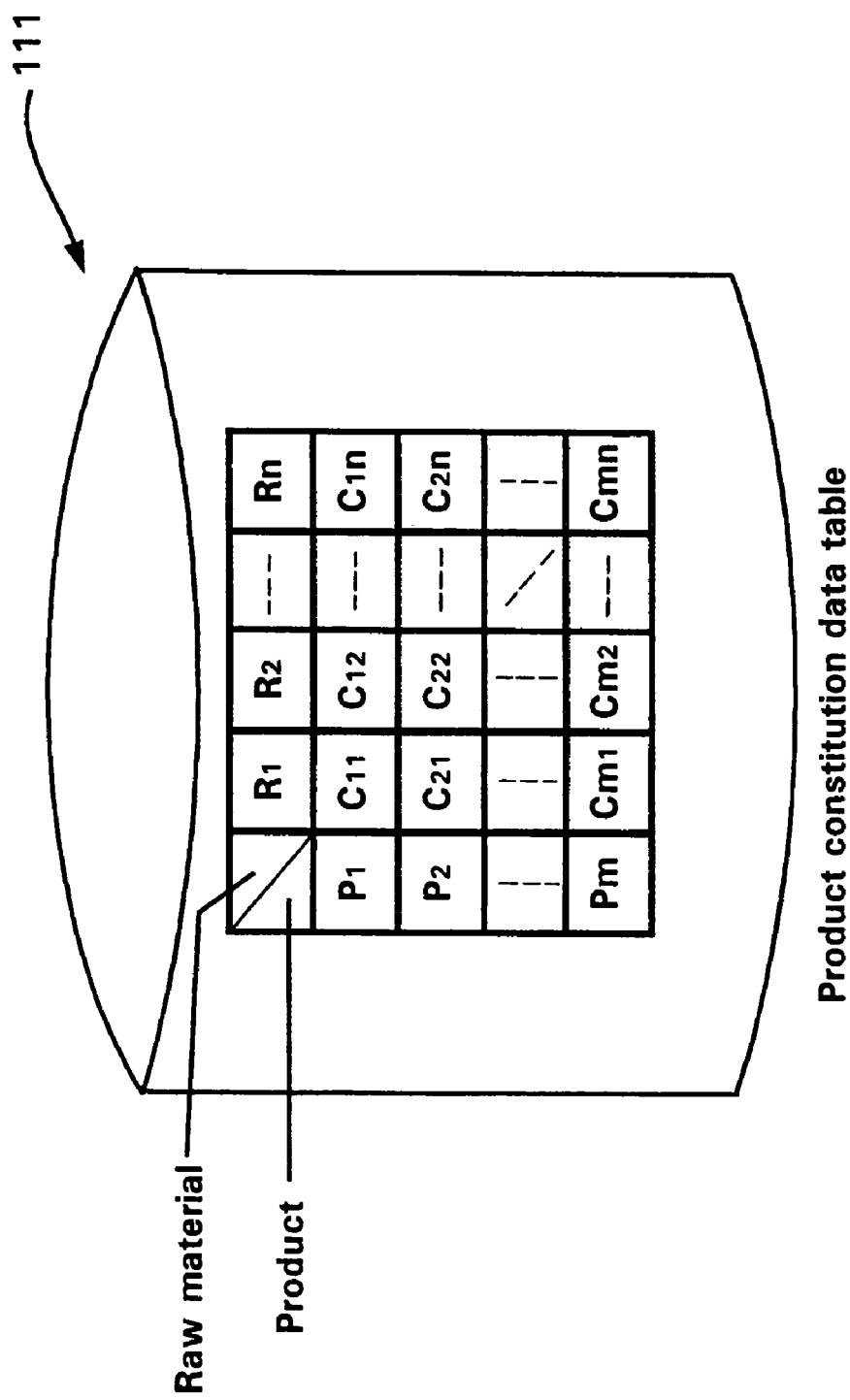
FIG. 23 is a diagram showing a product constitution data table.

Connected to the initial setting routine 101 are an inventory data table 107 shown in FIG. 16, a production plan data table 108 shown in FIG. 17, a production plan modification transfer data table 109 shown in FIG. 18 and a required quantity data table 110 shown in FIG. 19, so that for the data stored in these respective tables 107, 108, 109 and 110, initial setting may be performed in the steps shown in a flow chart of FIG. 20. Thus, in the inventory data table 107 shown in FIG. 16, inventory quantity data for respective raw materials are stored, while daily production plan data for respective raw materials are stored in the production plan data table 108. The production plan modification transfer data table 109 is designed for effecting the transfer of data when a modification of data in the required quantity data table 110 shown in FIG. 19 is made in response to modification of data in said production data table 108 and its details are described hereinafter.

Stored in the required quantity data table 110 are the data representing the required quantities of respective raw materials respective days.

Step ①: Receiving an input of the current actual inventory quantity W of raw material Ri Step ②: Replacing the inventory quantity Zi for Ri in said inventory data table 107 with W to provide a new value of Zi Step ③: Confirming that all of the above procedures have been completed for all raw materials. If the answer is affirmative: the sequence proceeds:

Step ④: Resetting all the production plan data Xij in the production plan data 108 to zero.

Step ⑤: Resetting all the transfer data ΔXij in the production plan modification transfer data table 109 to zero.

Step ⑥: Resetting all the required quantity data Yig in the required quantity data table 110 (made zero) to complete the initial setting.

Thus, the actual current inventory may not necessarily be in agreement with the difference found by subtracting the used quantity from the initial inventory data but some error due to breakage or the like is more or less inevitable. Therefore, it is necessary to first correct all the inventory data at the beginning processing. For the production plan data, production plan modification transfer data and required quantity data, too, all the initial values are reset starting from zero.

After such initial setting, production plan setting is carried out in the production plan setting routine 102. This production plan setting routine 102 is connected to the production plan data table 108 so that production plan setting can be made in accordance with the flow chart of FIG. 21. Thus, Step ①: Receiving a production plan input X for day d for product Pi Step ②: Substituting X for the production plan data which has been initialized to zero by initial setting to provide a new Xid value Step ③: Confirming that production plan setting has been completed for all products to complete the processing.

Then, the required quantities of respective raw materials in an initial stage are calculated in a required quantity setting routine 103. Connected to this required quantity setting routine 103 are the production plan data table 108, required quantity data table 110 and product constitution data table 111 and the initial required quantities are calculated in the steps shown in the flow chart of FIG. 22. Stored in the product constitution data table 111 are the quantities of respective raw materials necessary for the production of one unit of each product.

Step ①: Retrieving the production plan size Xid for day d for product Pi from the production plan data table 108

Step ②: Retrieving the required quantities $Ci_1$, $Ci_2$ ... and Cin of raw materials for the production of one unit of product Pi from the product constitution data table 111

Step ③: Multiplying Cij (j=1, 2 ..., n) by the Xid to prepare Yid (j=1, 2 ..., n) in the required quantity data table 110

Step ④: Confirming that the above procedure has been completed. The required quantity setting is thus completed.

The flow from initial setting from required quantity setting has been described so far. Now, the flow for modifying the required quantity data in response to modification of production plan data is explained below.

Figure 24:
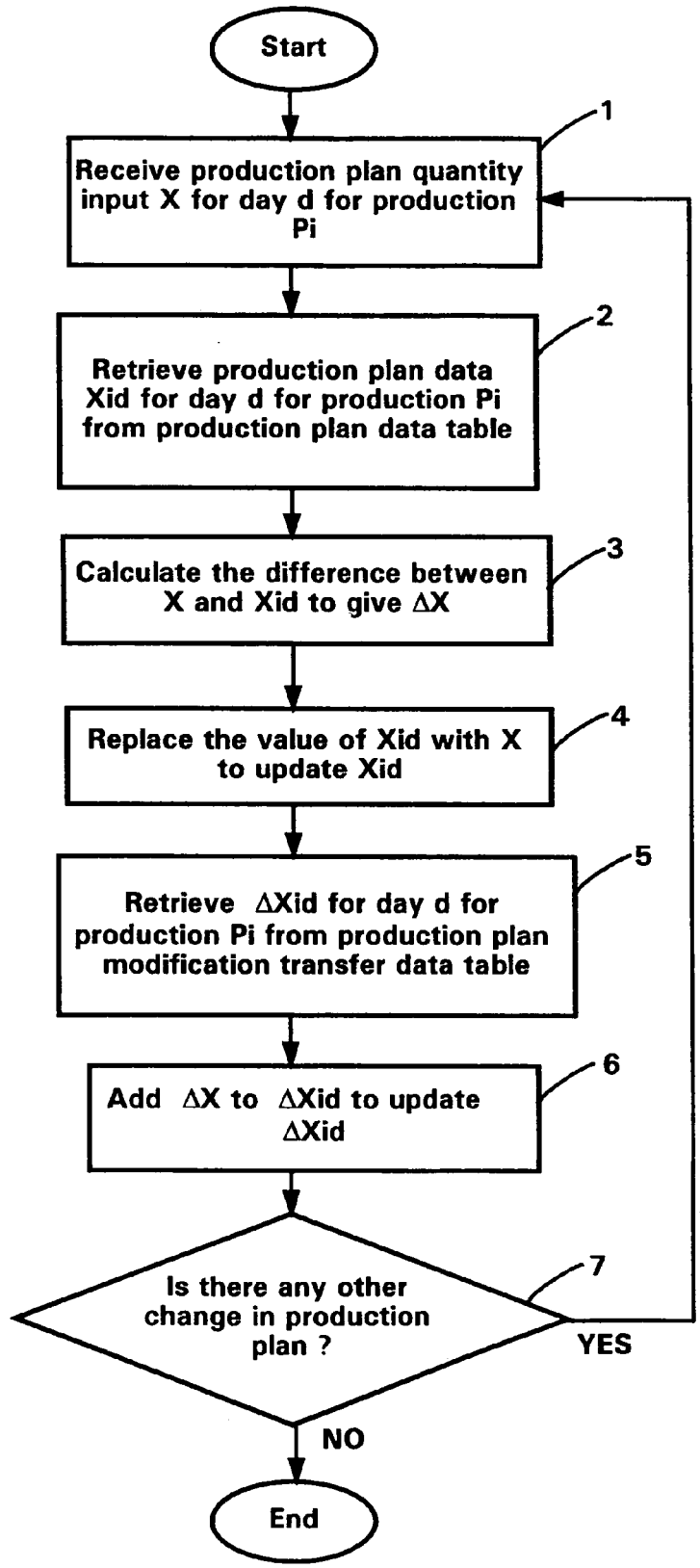
FIG. 24 is a flow chart showing steps in a production plan modifying routine.
Figure 25:
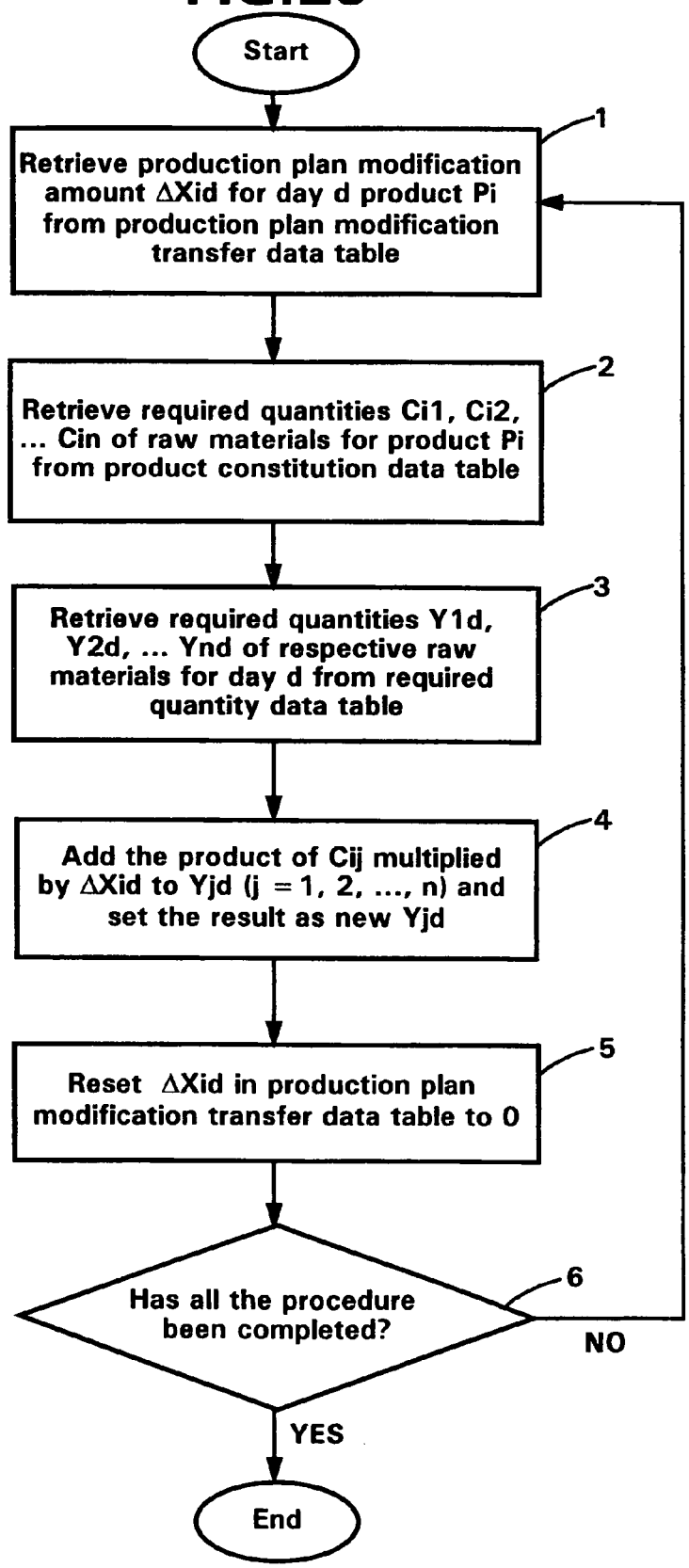
FIG. 25 is a flow chart showing steps in a required quantity modifying routine.

Modification of production plan data is carried out in the production plan modifying routine 104 in the steps shown in the flow chart of FIG. 24. Connected to this production plan modifying routine 104 is not only the production plan data table 108 but also the production plan modification transfer data table 109 shown in FIG. 18. Thus, Step ①: Receiving a production plan input X for day d for product Pi Step ②: Retrieving the production plan data Xid for day d for product Pi from the production plan data table 108

Step ③: Calculating the difference ΔX between X and Xid

Step ④: Replacing the Xid value with X to provide a new Xid value

Step ⑤: Retrieving the production plan modification amount ΔXid for day d for product Pi from the production plan modification transfer data table 109

Step ⑥: Adding the ΔX to this ΔXid to provide a new ΔXid value

Step ⑦: Confirming that there is no change in the other production plan data. The modification of production plan data is thus completed.

As the production plan data are thus modified, modification of required quantity data is automatically carried out in the required quantity modifying routine 105. Connected to this required quantity modifying routine 105 are the production plan modification transfer data table 109, product constitution data table 111 and required quantity data table 110 and the modification of required quantity data is performed in the steps shown in the flow chart of FIG. 25. Thus, Step ①: Retrieving the production plan modification amount ΔXid for day d for product Pi from the production plan modification transfer data table.

Step ②: Retrieving the required quantities $C_{i1}$, $C_{i2}$ ... Cin of raw materials for the production of one unit of product Pi from the product constitution data table 111

Step ③: Retrieving the required quantities $Y_1d$, $Y_2d$ ... and Ynd of respective raw materials for day d from the required quantity data table 110

Step ④: Adding the product of Cij (j=1, 2 ..., n) multiplied by ΔXid to the Yjd (j=1, 2 ... and n) to provide a new Yid value Step ⑤: Resetting ΔXid to zero in the production plan modification transfer data table 109

Step ⑥: Confirming that all the above procedure has been completed. The modification of required quantities is thus completed.

Thus, if a change is made in the production plan, modification of the required quantity data table 110 is made through the production plan modification transfer data table 109 from the production plan data table 108. For this reason, even if changes in the production plan take place in close sequence for one given product, the modification of required quantities can be easily carried out.

After the above setting or modification of required quantities of raw materials for each day, calculation of quantities to be ordered is carried out in the order size determining routine 106.

Figure 26A:
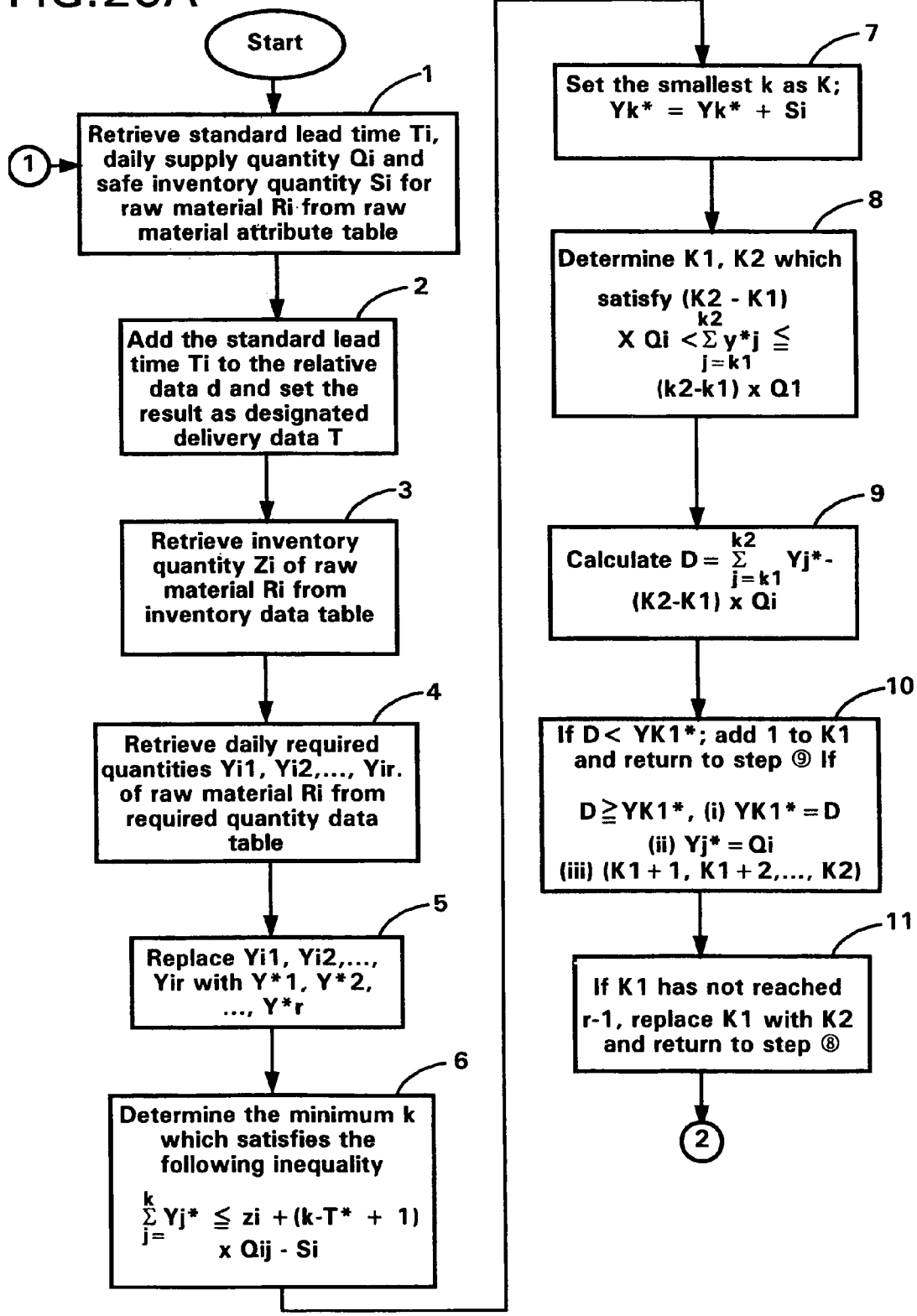
FIGS. 26(a) and (b) are flow charts showing steps in an order quantity determining routine.
Figure 26B:
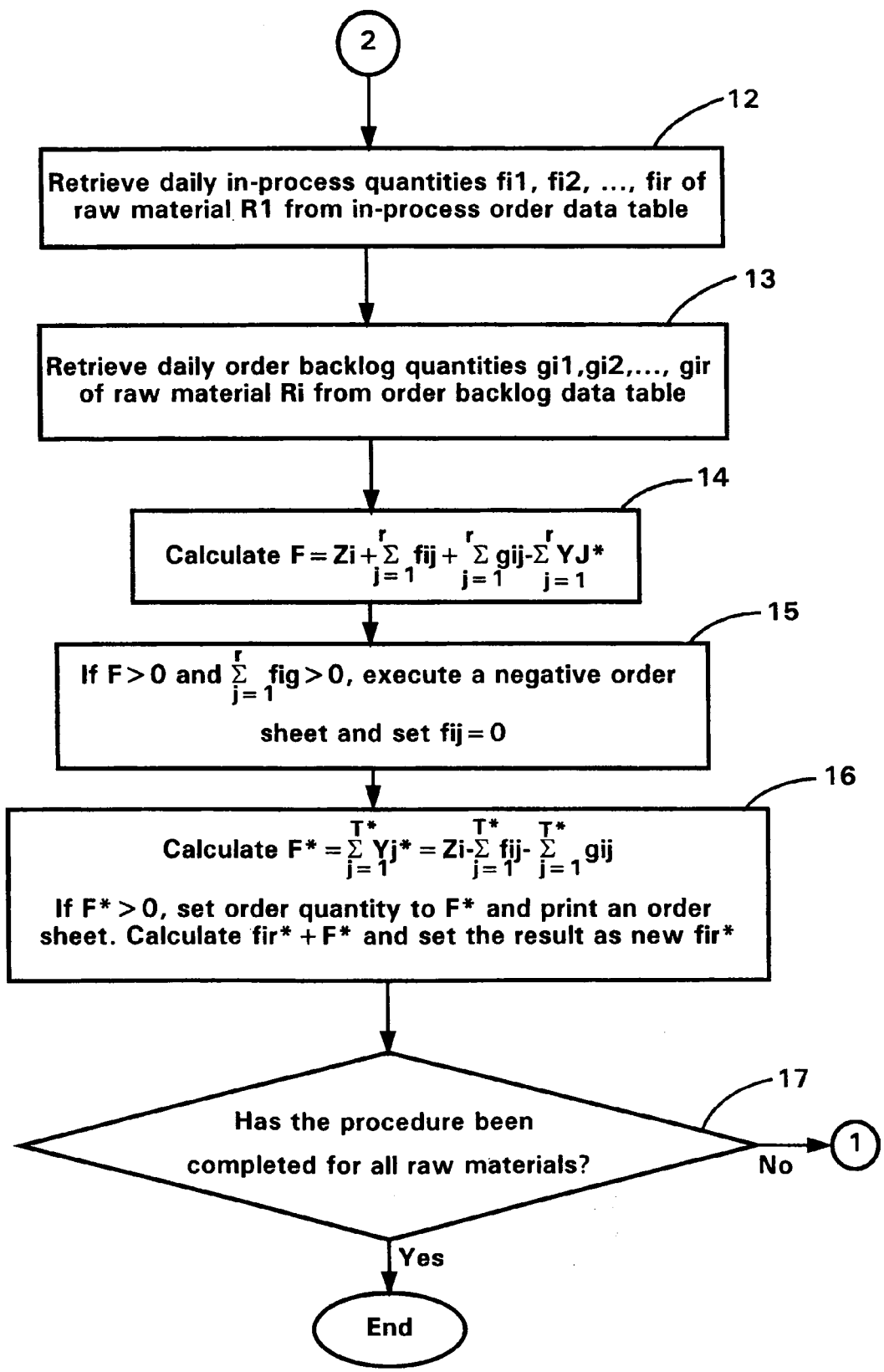

Connected to this order size determining routine 106 are not only the inventory data table 107 and required quantity data table 110 but also the raw material attribute data table 112, the in-process order data table 113 and the order backlog data table 114, and the calculation of the order size is performed in the steps shown in the flow chart of FIG. 26.

Figure 27:
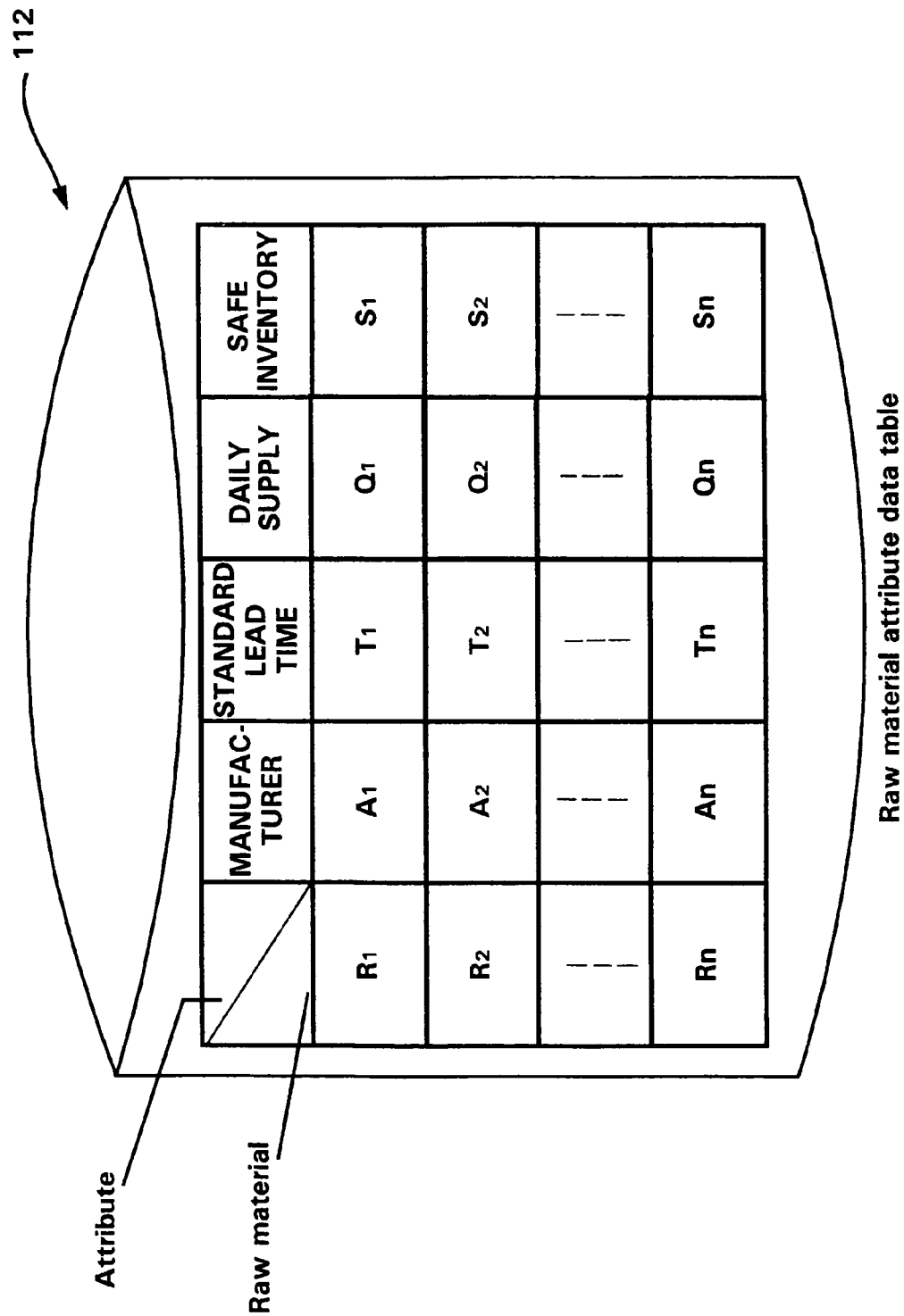
FIGS. 27 through 29 are diagrams showing a raw material attribute data table, an order course data table and an order backlog data table, respectively.
Figure 28:
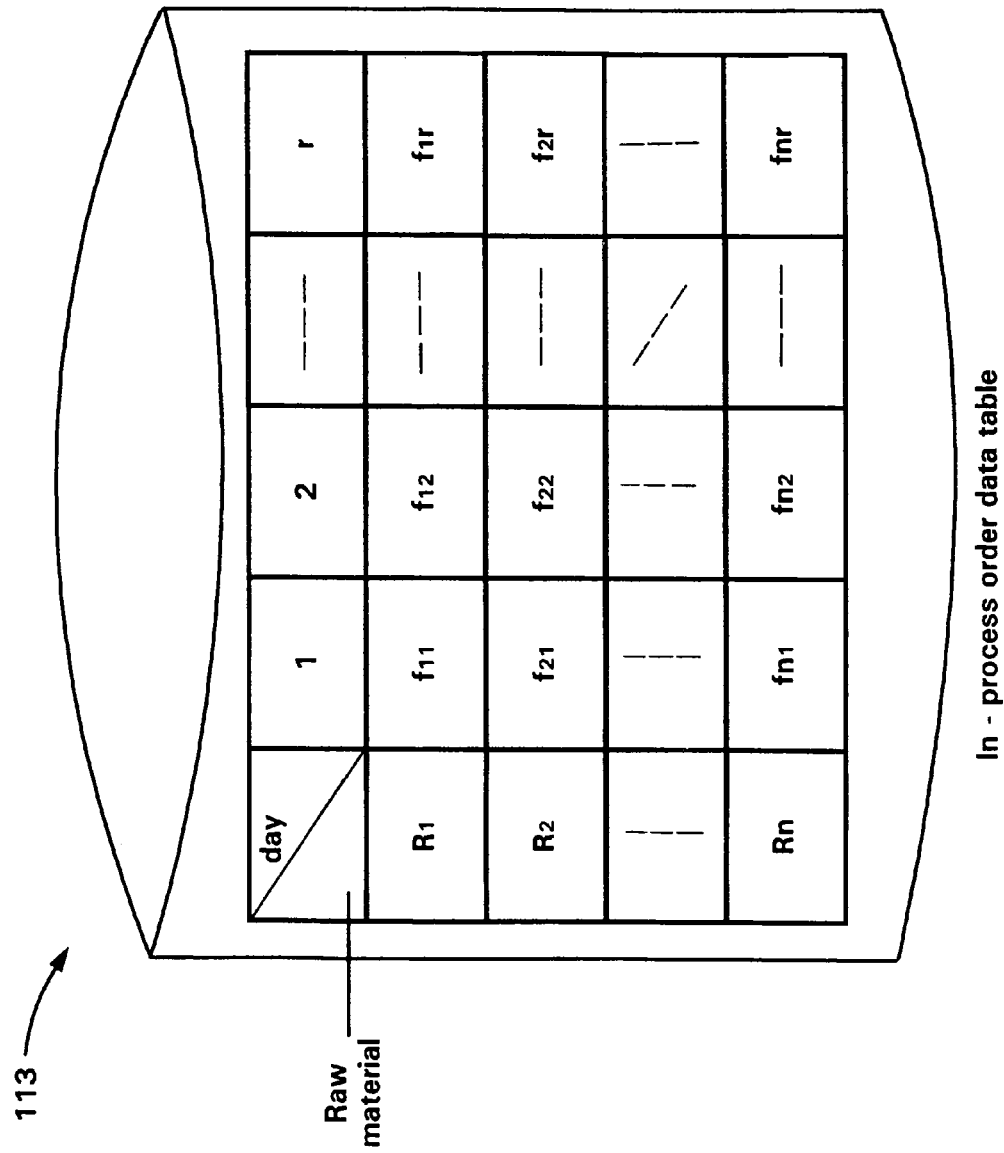
Figure 29:
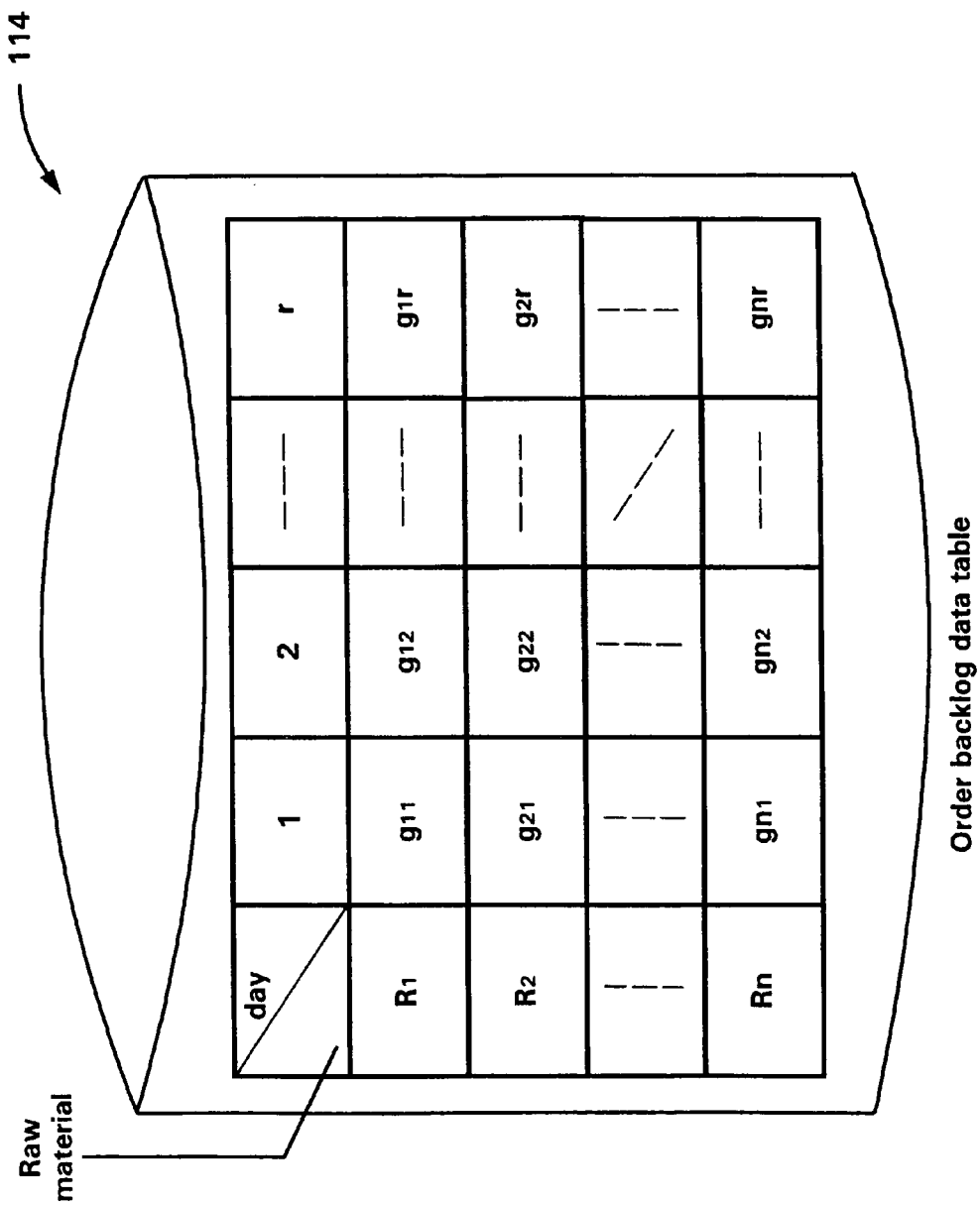

FIG. 27 shows an example of the raw material attribute data table 112. As shown, stored in this raw material attribute data table 112 are the names of suppliers of respective raw materials, standard lead times, daily supply quantities and safe inventory levels as data representing attributes of the respective raw materials. Furthermore, the in-process order data table 113 shown in FIG. 28 and the order backlog data table 114 shown in FIG. 29 contains daily in-process order data and order backlog data, respectively, for respective raw materials.

Step ①: Retrieving the standard lead time Ti, daily supply quantity Qi and safe inventory level Si for raw material Ri from the raw material attribute data table 112

Step ②: Adding the standard lead time Ti to the current relative date d and setting the result as the designated delivery date T*. Thus, in initial setting, the standard lead time as such becomes the designated delivery date.

Step ③: Retrieving the inventory data Zi of raw material Ri from the inventory data table 107

Step ④: Retrieving the daily required quantities $Yi_1$, $Yi_2$ ... and Yir of raw material Ri from the required quantity data table 110

Step ⑤: Copying said $Yi_1$, $Yi_2$ ... and Yir to provide $Y_1^*$, $Y_2^*$ ... and Yr*

Step ⑥: Calculating the minimum k (k=T*, T*+1, ..., r) that satisfies the following inequality (1) ... using the above values $$\sum_{j=1}^{k} Yj^* \leq Zi + (k - T^* + 1) \times Qij - Si \quad (1)$$

Step ⑦: Designating the smallest of the calculated k values as K and altering the Yk* value using the following equation (3)

$$Yk^* = Yk^* + Si$$

Step ⑧: Determining $k_1$ and $k_2$ ($k_1$=1, 2 ... and r−1; $k_2$=r, ..., $k_1$+2, $k_1$+1) which satisfy the following inequality (4)

$$(k_2 - k_1) \times Qi < \sum_{j=k_1}^{k_2} Yi^* \leq (k_2 - k_1 + 1) \times Qi \quad (4)$$

Step ⑨: Calculating D by the following equation (5) using the $k_1$ and $k_2$ values determined as above $$D = \sum_{j=k_1}^{k_2} Yi^* - (k_2 - k_1) \times Qi \quad (5)$$

Step ⑩: Provided that $D<Yk_1^*$, adding 1 to $k_1$. The sequence then returns to step ⑨. Provided that $D \geq Yk_1^*$, effecting the following changes $$Yk_1^* = D \quad \text{(i)}$$

$$Yj^* = Qi \quad \text{(ii)}$$

$$(j = k_1+1, k_2+2, \ldots, k_2)$$

Step ⑪: Checking to see whether the $k_1$ has reached r. If not, substituting $k_2$ for $k_1$ and repeating the sequence from step ⑧.

The modification of required quantity data is complete when $k_1$ has reached r and this means a completion of the required quantity data table 110.

Prior to proceeding to the next step, the above flow is explained using specific values for ease of understanding.

Step ①: Let it be assumed that the data on raw material $R_1$ in the raw material attribute data table 112 are as follows.
Standard lead time $T_1 = 4$ days
Daily supply quantity $Q_1 = 8$ units
Safe inventory level $S_1 = 2$ units
Step ②: Designated delivery day $T^* = T_1 = 4$
Step ③: In the inventory data table 107, the inventory quantity $Z_1$ of raw material $R_1 = 23$ units.
Step ④: From the required quantity data table 110, the current daily requirements of raw material $R_1$ are retrieved as shown in the following table.

|  | Day | | | | | | | | | |
|---|---|---|---|---|---|---|---|---|---|---|
| Raw material | 1 | 2 | 3 | 4 | 5 | 6 | 7 | 8 | 9 | 10 |
| R1 | 5 | 8 | 6 | 10 | 4 | 7 | 9 | 4 | 2 | 6 | step ⑤: $Y_1^* = 5, Y_2^* = 8, Y_3^* = 6, \ldots, Y_{10}^* = 6$.
Step ⑥: Among $k = T^*, T^*+1, \ldots, 10$, i.e. $k = 4, 5, \ldots, 10$, $k=4$ does not satisfy the inequalities because $$\sum_{j=1}^{4} Yj^* = 29$$

$$Z_1 + (k-T^*+1) \times Q - S_1 = 25$$

However, $k=5$ satisfies the inequalities, thus $$\sum_{j=1}^{5} Yj^* = 33$$

$$Z_1 + (k-T^*+1) \times Q - S_1 = 33$$

Step ⑦: $k=5$, and $Y_5^* = Y_5^* + S_1 = 4 + 2 = 6$. Therefore, the current setting $Y_5^* = 4$ is altered to $Y_5^* = 6$.
Step ⑧: Search to find that $k_1$ and $k_2$ which satisfy the following equality $$(k_2 - k_1) \times Qi < \sum_{j=k_1}^{k_2} Yi^* \leq (k_2 - k_1 + 1) \times Qi$$

are $k_1 = 3$ and $k_2 = 4$.

$$(4-3) \times 8 = 8 < \sum_{j=3}^{4} Yj^* = 16 \leq (4-3+1) \times = 16$$

Step ⑨:

$$D = \sum_{j=3}^{4} Yj^* - (4-3) \times 8 = 8$$

Step ⑩: Since $D = 8 \geq Yk_1^* = 6$, set $$Y_3^* = 8 \quad \text{(i)}$$

$$Y_4^* = 8 \quad \text{(ii)}$$

Thus, the settings $Y_3^* = 6$ and $Y_4^* = 10$ are respectively changed to 8.
Step ⑪: Since $k_1 = 3$ and has not reached $r = 10$, select $k_1 = 4$ and repeat the sequence from step ⑧.

Then, $k_1 = 6$ and $k_2 = 7$ are found and, as a result, the following changes are made in step ⑩.

$$Y_6^* = 8 \quad \text{(i)}$$

$$Y_7^* = 8. \quad \text{(ii)}$$

After the above modification, the required quantity data table 110 is as follows.

|  | Day | | | | | | | | | |
|---|---|---|---|---|---|---|---|---|---|---|
| Raw material | 1 | 2 | 3 | 4 | 5 | 6 | 7 | 8 | 9 | 10 |
| $R_1$ | 5 | 8 | 8 | 8 | 6 | 8 | 8 | 4 | 2 | 6 |

Comparison of the above table with the pre-modification table shows that the quantity of 4 units on day 5 has been changed to the quantity of 6 units, and the required quantity of 10 units on day 4 and that of 9 units on day 7 have been advanced to day 3 and day 6, respectively, indicating that the data have been made compatible with the daily supply quantity of raw material $R_1$, which data supplements the safe inventory level at a suitable timing.

Now, referring back to the flow chart of FIG. 26, the sequence from step ⑫ is explained.

Step ⑫: From the in-process order data table 113, the daily in-process quantities $fi_1, fi_2, \ldots$ and fir of raw material $R_1$ are retrieved.

Stored in this in-process order data table 113 are the quantities of raw materials for which orders have already been placed but are yet to be included in the inventory quantities Zi.

Step ⑬: From the order backlog data table 114, the daily order backlog quantities $gi_1, gi_2, \ldots$ and gir of raw material $R_1$ are retrieved.

Step ⑭: The following equation (6) is calculated.

$$F = zi + \sum_{j=i}^{r} fij + \sum_{j=1}^{r} gij - \sum_{j=1}^{r} Yj^* \quad (6)$$

Step ⑮: Provided that F>0 and $$\sum_{j=1}^{r} fij > 0,$$

a negative order sheet is executed for fij>0 and the particular fij is reset to 0. Here, the order of fij data to be thus processed begins with the one in which j is closest to r, that is to say the last one.

Step ⑯: The following equation is calculated.

$$F^* = \sum_{j=1}^{T^*} Yj^* - Zi - \sum_{j=1}^{T^*} fij - \sum_{j=1}^{T^*} gij \quad (7)$$

Provided that F*>0, the order size is set to F* and an order sheet is printed. Then, fiT*+F* is calculated to set fiT*.

Step ⑰: Finally, it is confirmed that all the above processing has been completed for all the raw materials.

Now, the sequence beginning with step ② following the aforesaid step ⑪ is described in further detail.

Steps ②, ③: From the in-process order data table 113 and order backlog data table 114, the daily in-process quantity and daily order backlog quantity data for raw material $R_1$ are retrieved as shown in the following table. It should be noticed that the figures in the top row represent the daily requirements of raw material $R_1$ as determined up to step ⑪.

| Day | 1 | 2 | 3 | 4 | 5 |
|---|---|---|---|---|---|
| Yj* | 5 | 8 | 8 | 8 | 6 |
| $f_{1j}$ | 7 | 0 | 3 | Omitted | |
| $g_1i$ | 5 | 4 | 0 | Omitted | |
| Day | 6 | 7 | 8 | 9 | 10 |
| Yi* | 8 | 8 | 4 | 2 | 6 |
| $f_{1j}$ | — | — | — | — | — |
| $f_{1j}$ | — | — | — | — | — |

Step ⑭: The following equation is calculated $$F = Z_1 + \sum_{j=1}^{10} f_1 i + \sum_{j=1}^{10} gij - \sum_{j=1}^{10} Yj^*$$

Step ⑮: Provided that F>0 and $$\sum_{j=1}^{10} f_1 j > 0,$$

it means that the order size is excessive. Therefore, the $f_{1j}$ settings are changed to zero from the back, i.e. starting with day 10.

The result is assumed to be as follows.

| | Day | | | | | | | | | |
|---|---|---|---|---|---|---|---|---|---|---|
| | 1 | 2 | 3 | 4 | 5 | 6 | 7 | 8 | 9 | 10 |
| Yj* | 5 | 8 | 8 | 8 | 6 | 8 | 8 | 4 | 2 | 6 |
| $f_{1j}$ | 0 | 0 | 0 | 0 | 0 | 0 | 0 | 0 | 0 | 0 |
| $g_{1j}$ | 5 | 0 | 0 | 0 | 0 | 0 | 0 | 0 | 0 | 0 |

Step 16: Since $$F^* = \sum_{j=1}^{4} Y_1^* - 23 - \sum_{j=1}^{4} f_1 j - \sum_{j=1}^{4} g_1 i = 1$$

and F*>0, the order size is set to 1, an order sheet is printed, And $f_{14}$ is set to 1.

After the order size has thus been determined in the order size determining routine A, the order sheet is issued and the data processing is carried out in the data input processing means B. This data input processing means B comprises an order acceptance data input processing routine 115, a raw material acceptance data input processing routine 116 and a production data input processing routine 117.

Figure 30:
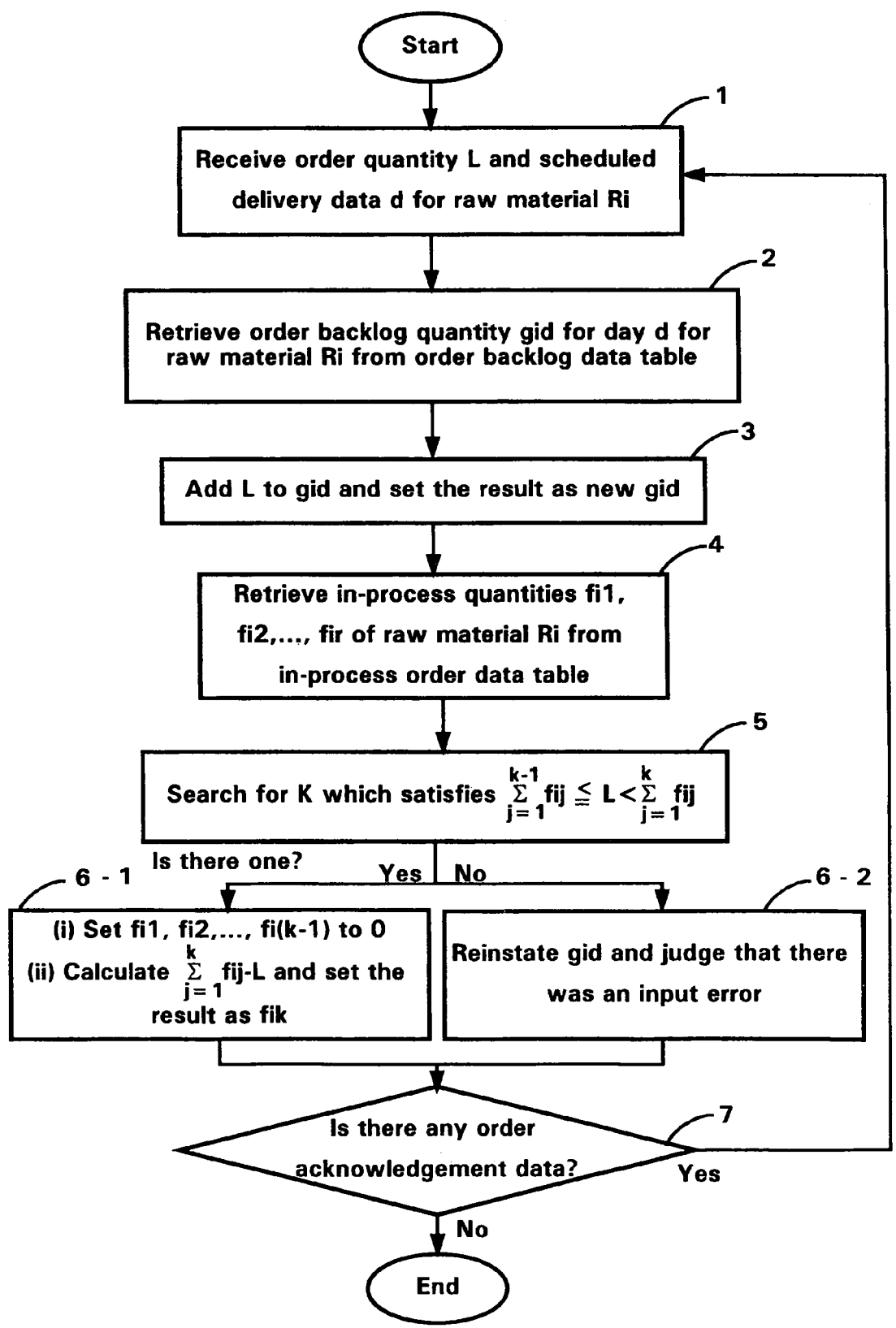
FIG. 30 is a flow chart showing steps in an order acknowledgement data input processing routine.

Connected to the order acceptance data input processing routine 115 are the order backlog data table 114 and in-process order data table 113 and the data processing is performed in the steps shown in the flow chart of FIG. 30.

Thus,

Step ①: Retrieving the data on the order quantity L and scheduled delivery day d for raw material Ri from the order acknowledgement from the supplier of the raw material Step ②: Retrieving the order backlog quantity gid for day d for raw material Ri from the order backlog data table 114

Step ③: Adding the order quantity L to the order backlog quantity gid to set a new gid value Step ④: Retrieving the in-process order quantities $fi_1$, $fi_2$, ... and fir for raw material Ri from the in-process order data table 113.

Step ⑤: Searching for k which satisfies the following inequality (8) (provided, however, that $fi_0$=0)

$$\sum_{j=1}^{k-1} fig \leq L < \sum_{j=1}^{k} fij \quad (8)$$

Step ⑥-1: If there exists one,
(i) The $fi_1$, $fi_2$, ... and fir values retrieved in step ④ are made 0, and (ii) $\sum_{j=i}^{k} fij - L$ L is calculated and the result is set as a new fik value.

Step ⑥: If there is none, the initial order backlog quantity gid is reinstated and it is judged that there was an error in the input data.

Step ⑦: Confirming that there is no other order acknowledgement-data. The input processing of order acknowledgement data is now complete.

Figure 31:
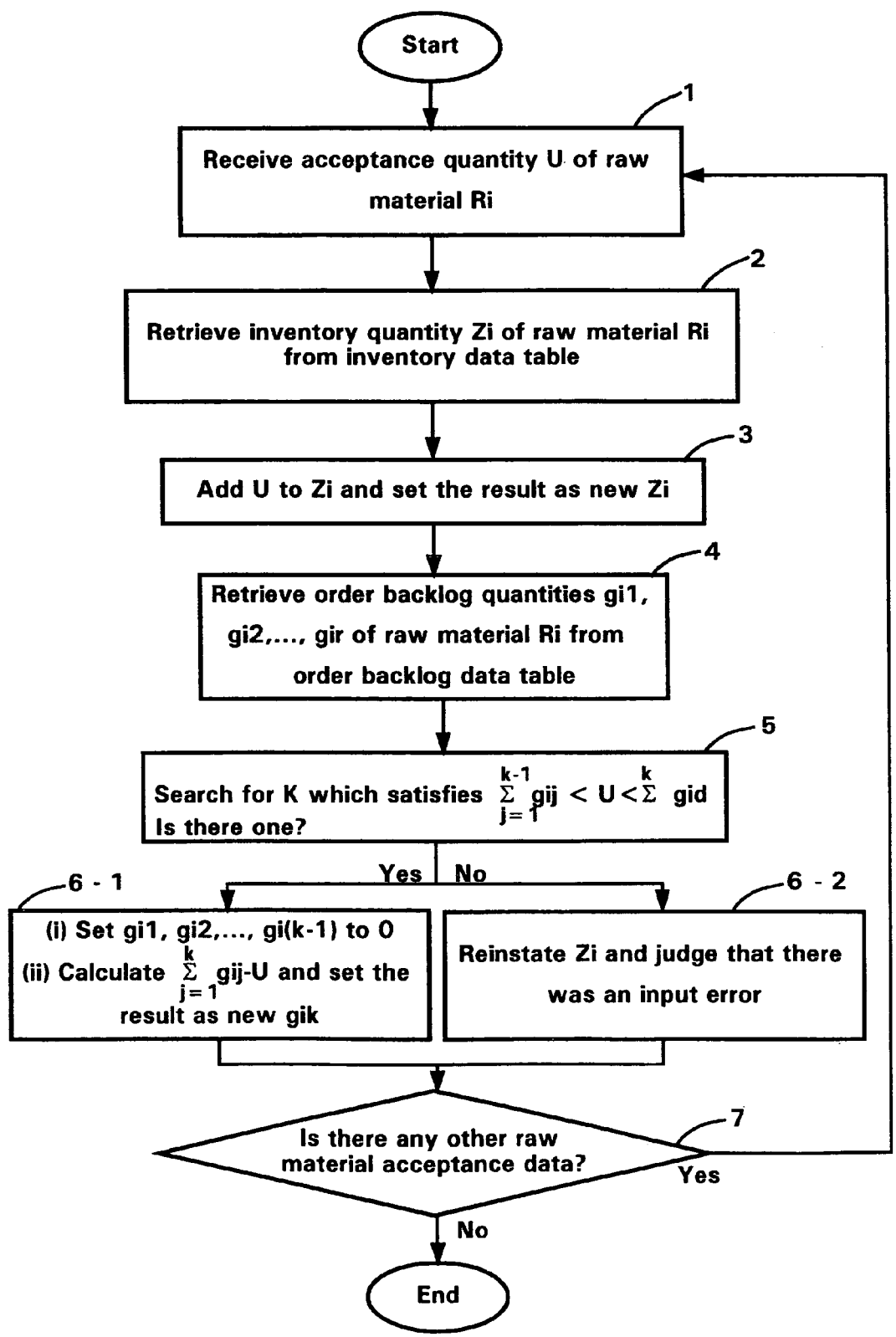
FIG. 31 is a flow chart showing steps in a raw material acceptable data input processing routine.

Connected to the raw material acceptance data input processing routine 116 are the inventory data table 107 and order backlog data table 114 and the data processing is performed in the steps shown in the flow chart of FIG. 31. Thus, Step ①: Receiving an acceptance quantity input U for raw material Ri Step ②: Retrieving the inventory quantity Zi for raw material Ri from the inventory data table 107

Step ③: Adding the acceptance quantity U to the inventory quantity Zi to provide a new Zi value Step ④: Retrieving the order backlog quantities $gi_1$, $gi_2$, ... and gir of raw material Ri from the order backlog data table 114.

Step ⑤: Searching for k which satisfies the following inequality (9) (provided, however, that $gi_0 = 0$)

$$\sum_{j=i}^{k-1} gij \leq U < \sum_{j=1}^{K} gij \quad (9)$$

Step ⑥-1: If there exists one,
(i) $gi_1$, $gi_2$, ... and gi (k−1) are set to 0, and $$(ii) \sum_{j=1}^{k} gij - U$$

U is calculated
and the result is set as a gik value.

Step ⑥-2: If there is one,
the initial inventory quantity value Zi is reinstated and it is judged that an error occurred in input data.

Step ⑦: Confirming that there are no other raw material acceptance data. The input processing of raw material acceptance data is now complete.

Figure 32:
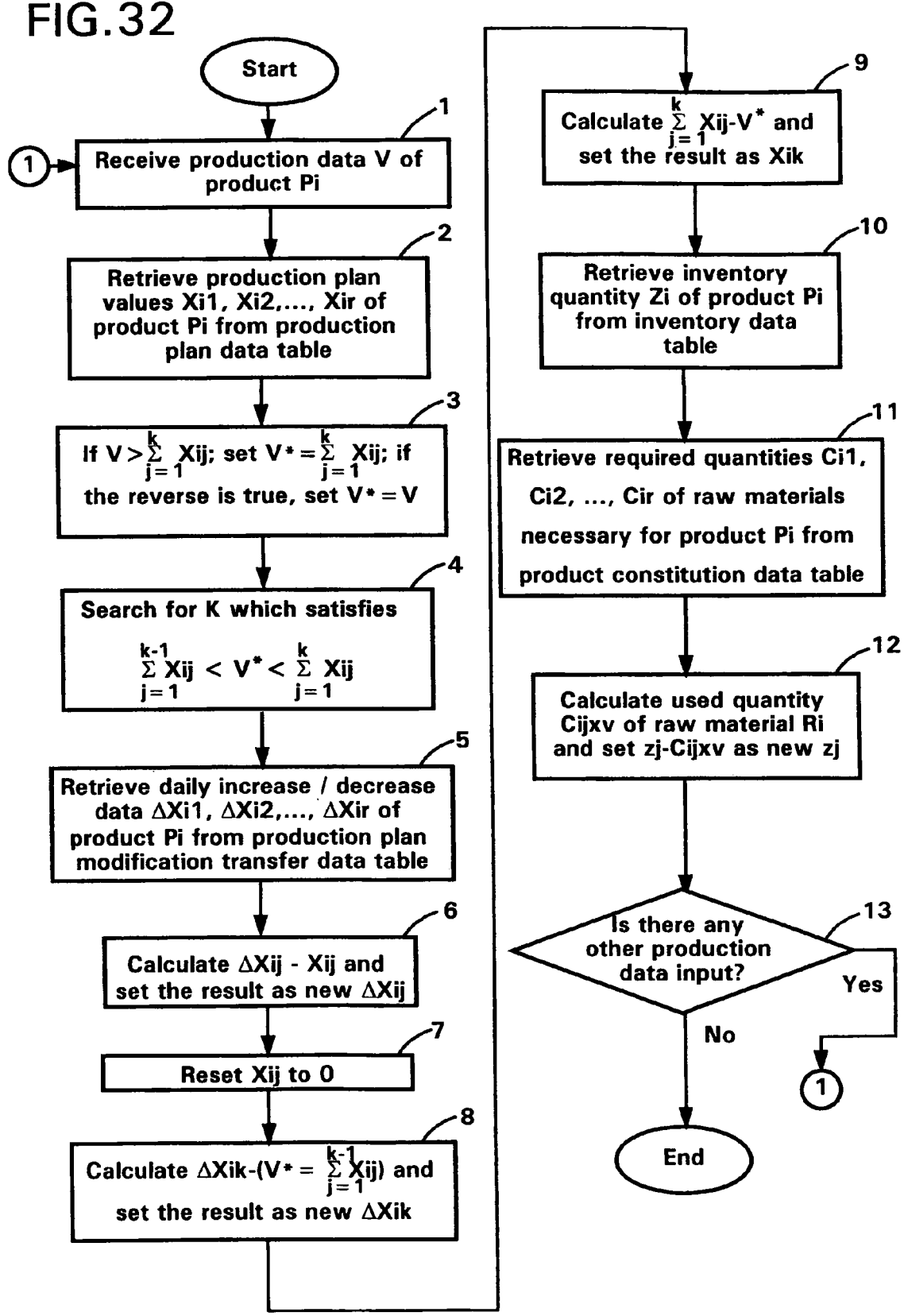
FIG. 32 is a flow chart showing steps in a production data input processing routine.

And in the production data input processing routine 117, using the data stored in the production plan data table 108, production data modification transfer data table 109, inventory data table 107 and product constitution data table 111, which are connected thereto, the input processing of production data is carried out in the steps shown in the flow chart of FIG. 32.

Thus,

Step ①: Receiving a production data input V for product Pi

Step ②: Retrieving the production plan data $Xi_1$, $Xi_2$, ... and Xir for product Pi from the production plan data table 108

Step ③: Comparing the production data V with $$\sum_{j=1}^{r} Xij$$

If V is larger, V* is set to $$\sum_{j=1}^{r} Xij.$$

If V is smaller, V* is set to V.

Step ④: Searching for K which satisfies the following inequality (10) (provided, however, that $$Xi_0 = 0) \quad (10)$$

$$\sum_{j=1}^{k-1} Xij \leq V^* \leq \sum_{j=1}^{k} Xij$$

Step ⑤: Retrieving the daily increase/decrease value $\Delta Xi_1$, $\Delta Xi_2$, ... and $\Delta Xir$ for product Pi from the production plan modification transfer data table (9)

Step ⑥: Calculating ΔXij−Xij to provide a new ΔXij value (j=1, 2, ..., k−1)

Step ⑦: Set Xij to 0

Step ⑧: Calculating $$\Delta Xik - \left[V^* - \sum_{j=1}^{k-1} Xij\right]$$

to provide ΔXik

Step ⑨: Calculating $$\sum_{j=1}^{k} Xij - V^*$$

to provide a new Xik value.

Step ⑩: Retrieving the inventory quantity Zi of product Pi from the inventory data table 107

Step ⑪: Retrieving the required quantities $Ci_1$, $Ci_2$, ... and Cin of raw material Ri for the production of one unit of product Pi from the product constitution data table 111

Step ⑫: Calculating the used quantity Cij×V of raw material Ri (j=1, 2, ... and n) and subtract the result to provide a new Zj value.

Step ⑬: Confirming that there is no other production data to be input. The input processing of production data is now complete.

Thus, in the data input processing means B, updating of data is automatically carried out according to the order acknowledgement data, raw material acceptance data and production data incoming in sequence. Therefore, the data in the tables such as the inventory data table 107, production plan data table 108 and required quantity data table 110 are always reflecting flexibly the changes in the flow of raw materials and so on, thus eliminating the risk of placing orders without true needs.

Furthermore, since the required quantity of each raw material can be ordered with certainty on a day-to-day basis, the risk of delay in production due to delays in receipt of raw materials can also be obviated.

Raw Material Ordering System II

FIGS. 33 through 56 show another embodiment of the raw material ordering system according to the present invention. In this case, a raw material ordering routine II 8' is used.

Figure 33:
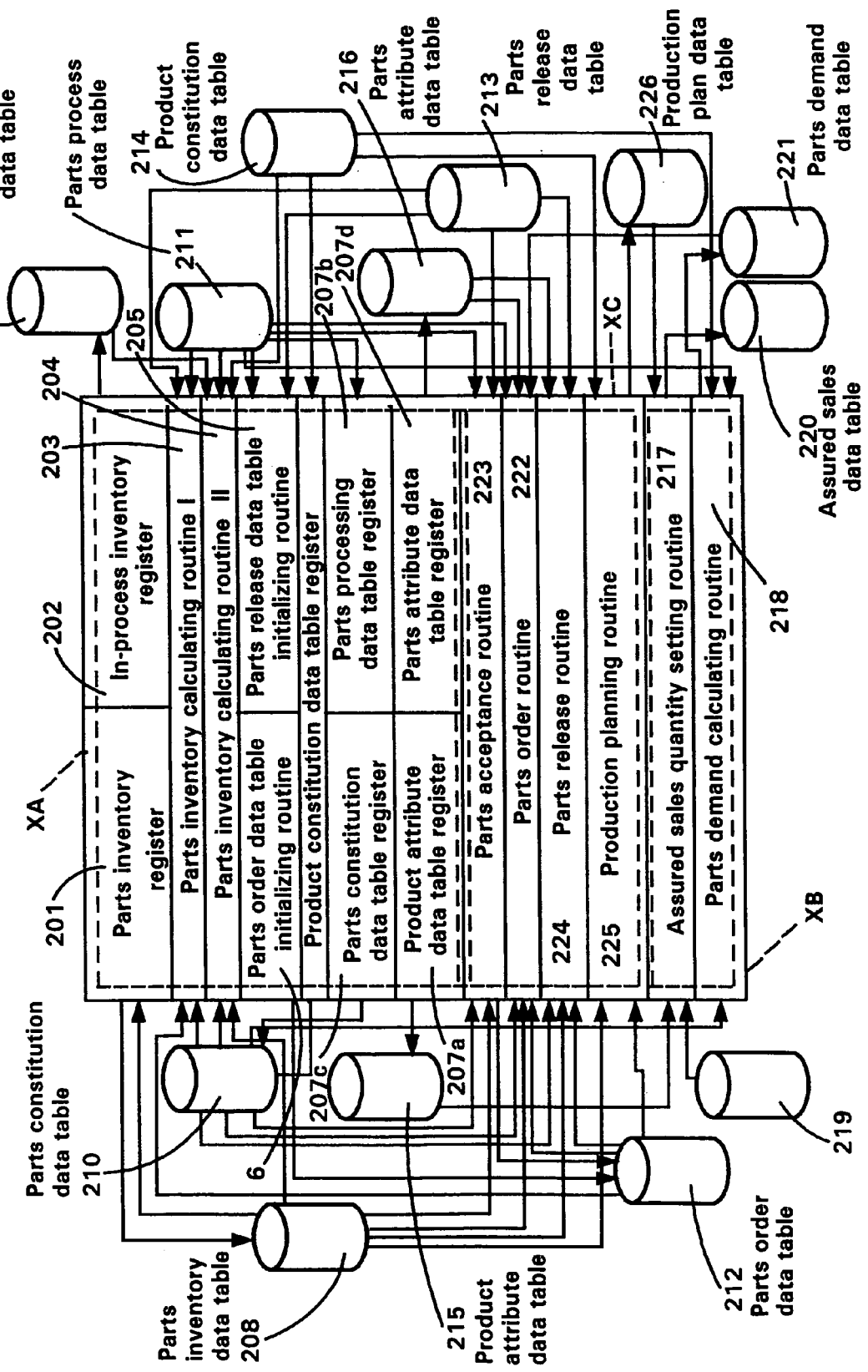
FIG. 33 is a view showing the overall construction of another raw material ordering system embodying the invention.

FIG. 33 shows the overall construction of the raw material ordering system of this embodiment as applied to the ordering of parts.

As shown, this system comprises a data register means XA, a parts demand setting means XB, and a parts control means XC.

The data register means XA comprises a parts inventory register routine 201, an in-process inventory register routine 202, a parts inventory calculating routine I203, a parts inventory calculating routine II 204, a parts release data table initializing routine 205, a parts order data table initializing routine 206 and a data table register routine 207.

Figure 34:
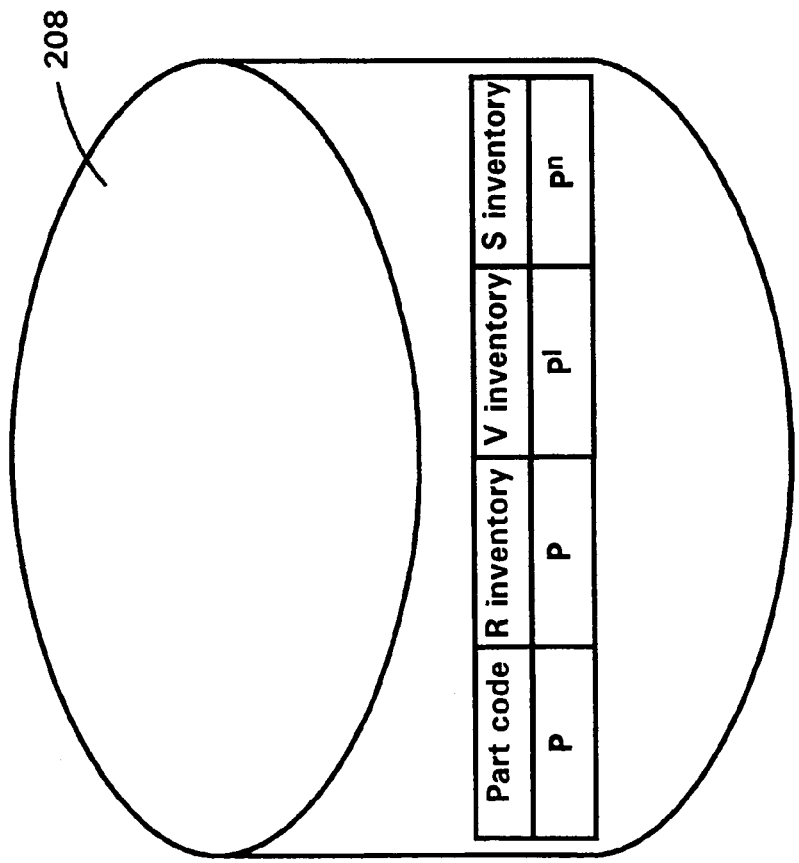

The parts inventory register routine 201 is connected to a parts inventory data table 208 shown in FIG. 34 and the current actual parts inventory quantities are registered in this routine 201. Thus, since, the true inventory quantity does not necessarily agree with the difference determined by subtracting the used quantity from the initial inventory quantity data but contains some error due to breakage etc., it is necessary to correct for the error, for example at the end of each month. And when the current inventory quantity data of, for example, part code P is P units, this number is registered as R (real) inventory of part code P in the parts inventory data table 208.

Figure 35:
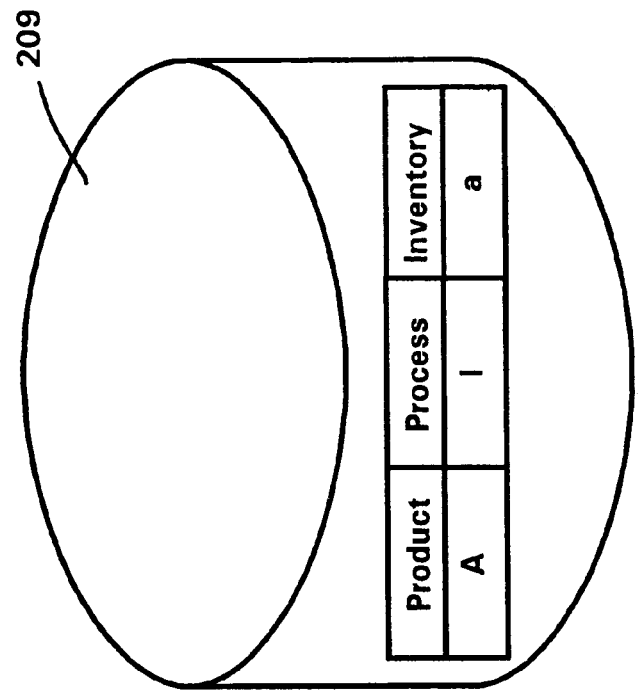
FIGS. 34 through 39 are data tables in the same embodiment.

The in-process inventory register routine 202 is connected to an in-process inventory data table 209 shown in FIG. 35 and the in-process inventory quantity is registered in this routine 202. Thus, when the in-process inventory quantity of product A in process i is a units, the inventory quantity of A in process i in the in-process inventory data table 209 is registered as a units.

After the registration of R inventory (real stock) in the parts inventory data table 208 and the in-process inventory quantity of each product item in each process in the in-process inventory table 209, the V inventory (the stock at a given stage in the manufacturing process, such as surface treatment, assembling, etc.) and S inventory (cumulative stock) quantities are calculated in the parts inventory calculating routine I203 and the parts inventory calculating routine II204, respectively.

Figure 40:
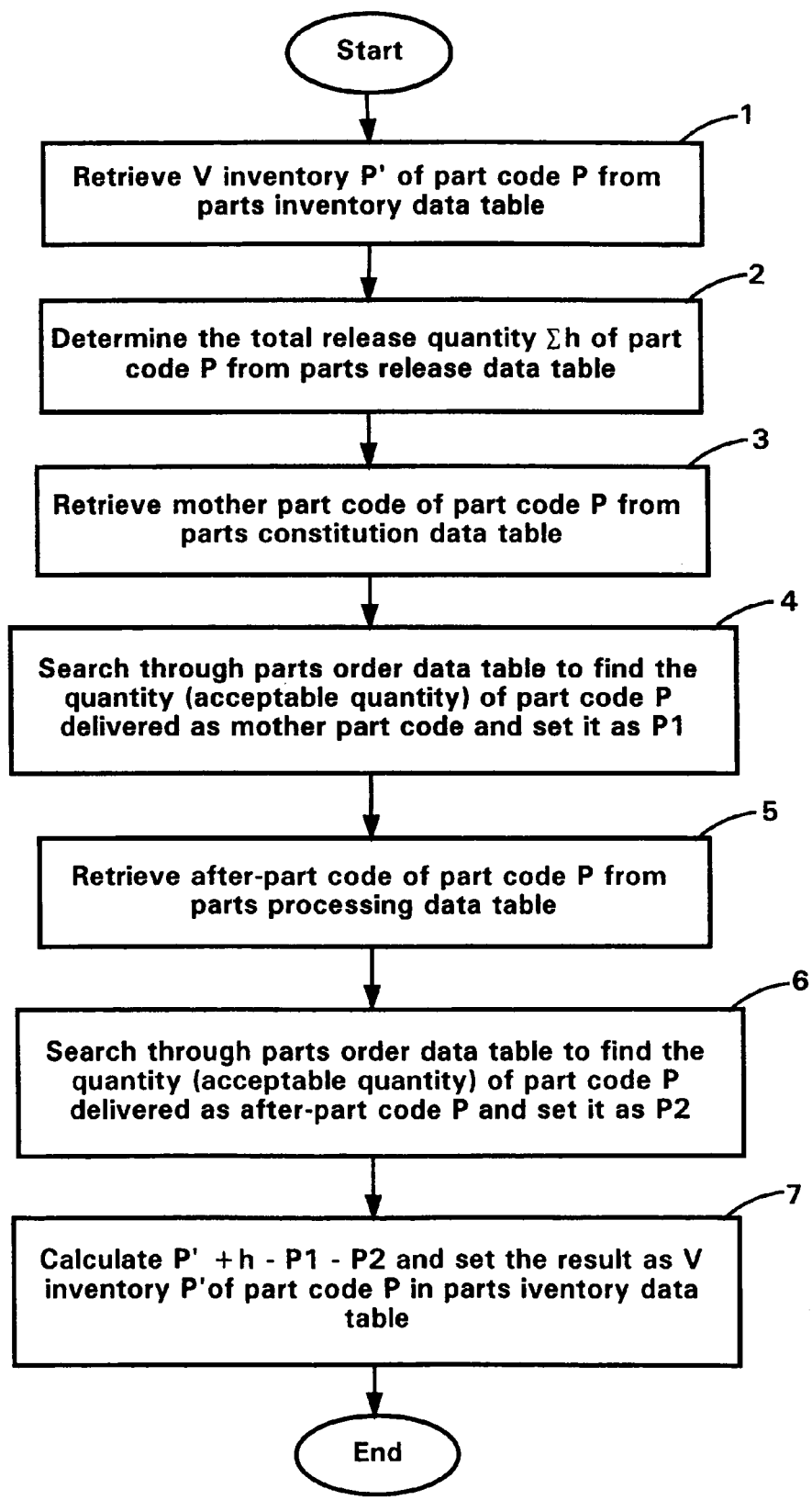
FIG. 40 is a flow chart showing steps in a parts inventory calculating routine I.
Figure 41:
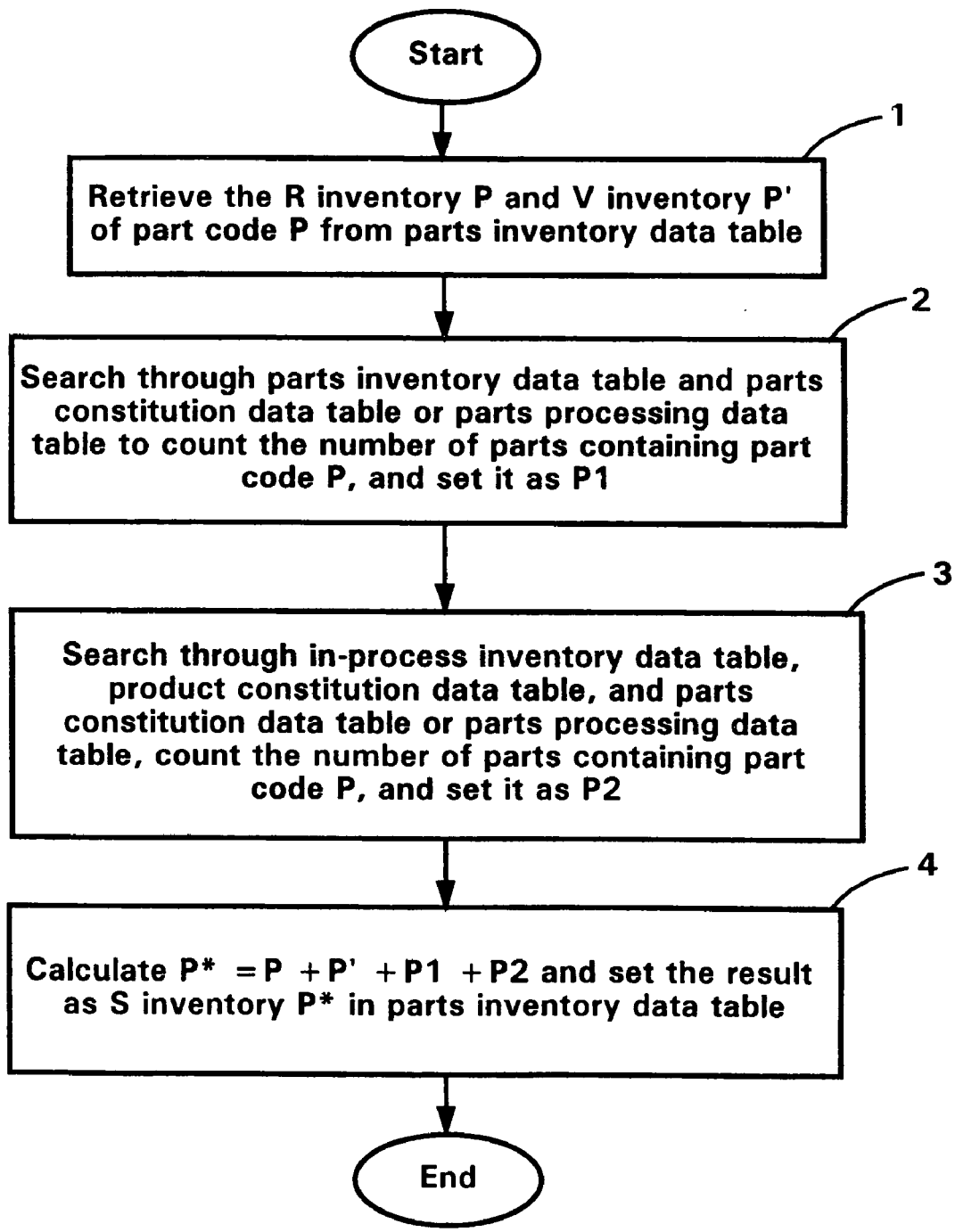
FIG. 41 is a flow chart showing steps in a parts inventory calculating routine II.

The above parts inventory calculating routine I203 is connected to the parts inventory data table 208, a parts constitution data table 210 and a parts processing data table 211, which store parts history information, a parts order data table 212 and a parts release data table 213, and the V inventory of the parts is calculated in the steps shown in FIG. 40.

Figure 37:
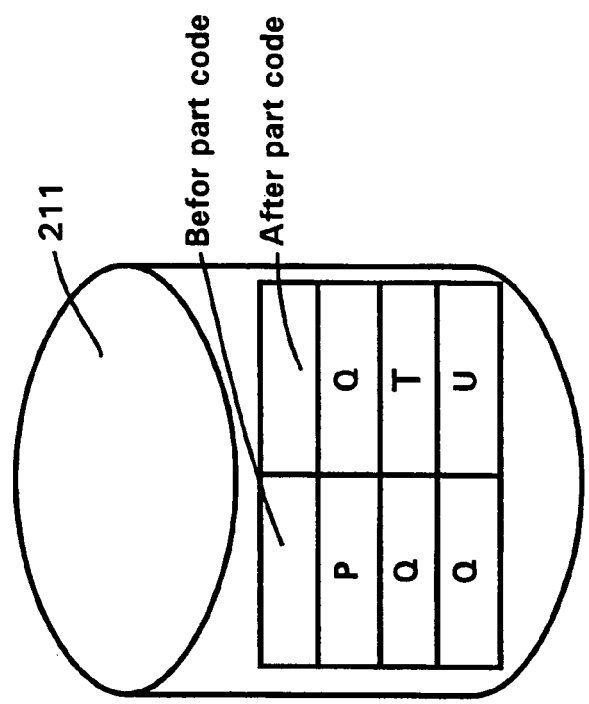
Figure 36:
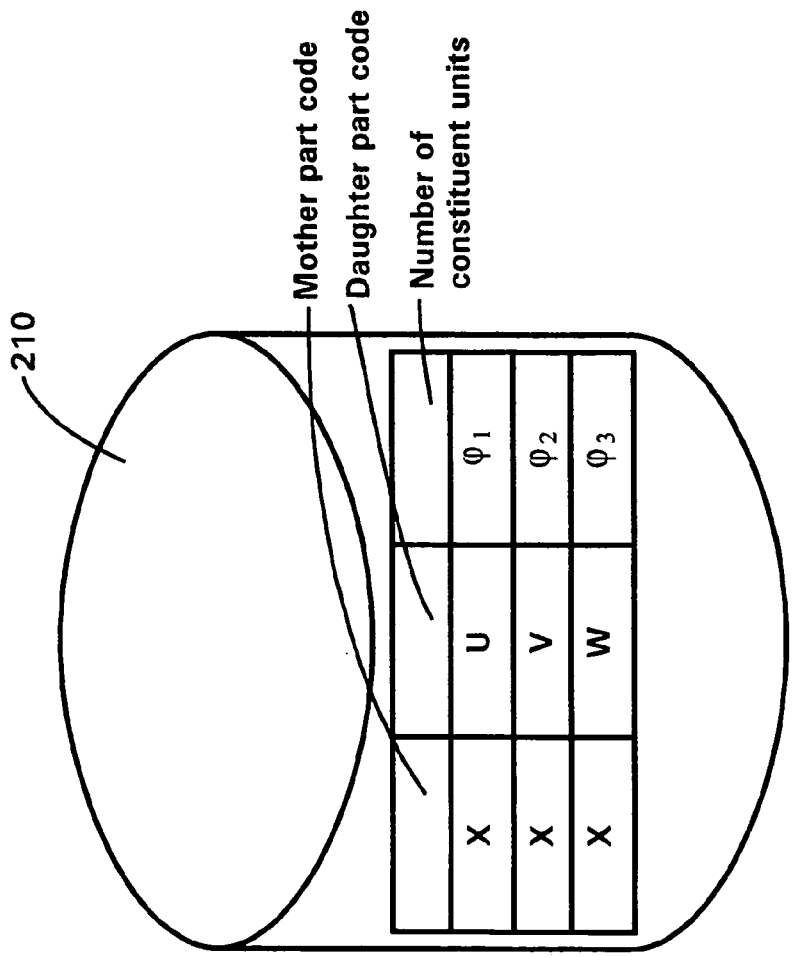

FIG. 36 shows the above parts constitution data table 210. Stored in this table are the constitution data of the parts. The constitution data are the data showing the relationship between the daughter part before assembling and the mother part after assembling as expressed in the number of daughter parts required for the constitution of each mother part after assembling. Thus, referring to FIG. 36, the mother part X consists of $\psi_1$ units of daughter part U, $\psi_2$ units of daughter part V and $\psi_3$ units of daughter part W. Stored in the parts processing data table 211 are the processing data of respective parts as shown in FIG. 37. The processing data mentioned above represent the relationship between the before-part prior to processing and the after-part after processing such as a surface treatment. Thus, FIG. 37 indicates that the processing of before-part P gives after-part Q and that the processing of this part Q as a before-part gives after-part T or U.

Figure 39:
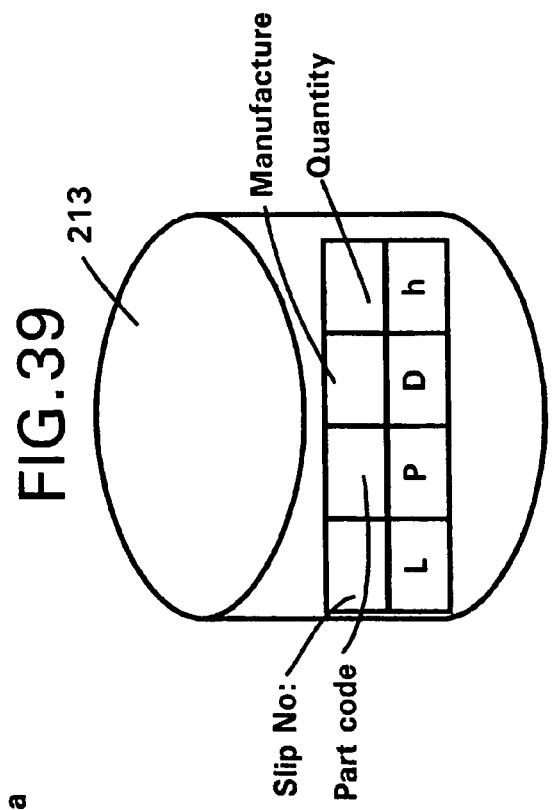
Figure 38:
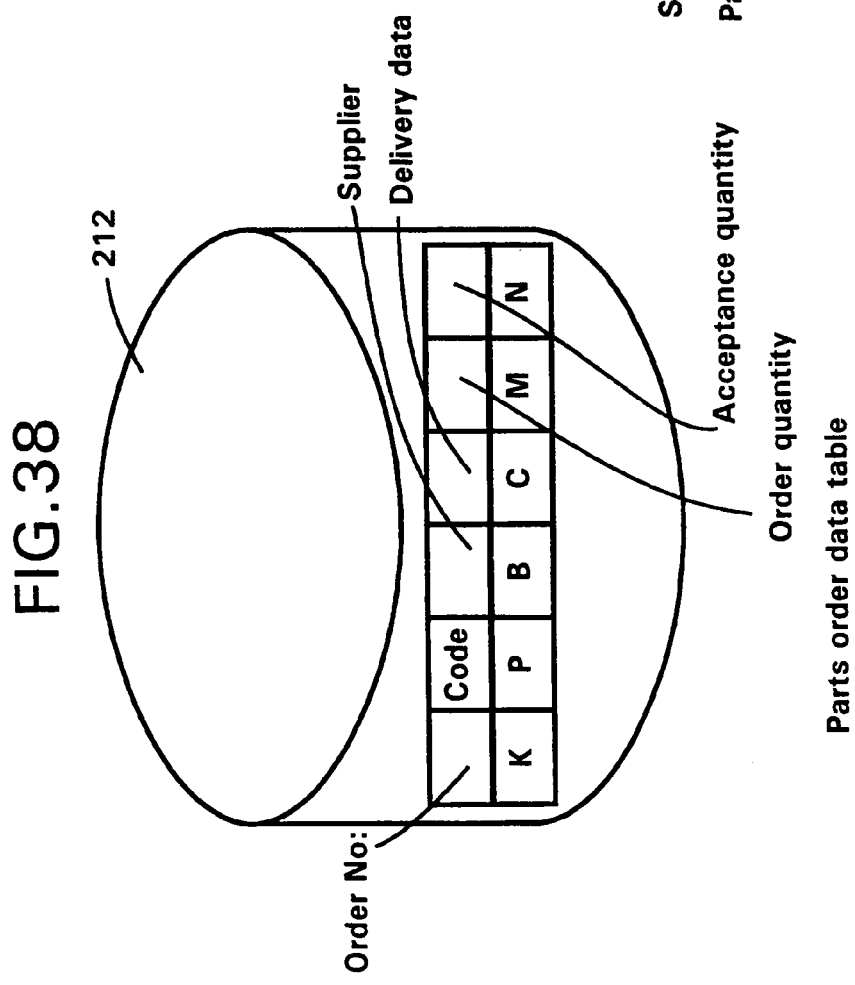

Stored in the parts order data table 212 are the order numbers and suppliers, delivery terms, order quantities and acceptance quantities of parts as shown in FIG. 38, while the parts release slip numbers, relevant manufacturers and release quantities of parts are stored in the parts release data table 213 as shown in FIG. 39.

Thus,

Step ①: Retrieving the current V inventory data P' for part code P from the parts inventory data table 208

Step ②: Determining the total release quantity $\Sigma h$ of part code P from the parts release data table 213

Step ③: Retrieving the mother part code of part code P from the parts constitution data table 210

Step ④: Searching through the parts order data table 212 to find the quantity $P_1$ (acceptance quantity) of part code P delivered under the mother part code assigned by conversion of the part code P to the mother part code Step ⑤: Retrieving the after-part code of part code P from the parts processing data table 211

Step ⑥: Searching through the parts order data table 212 to find the quantity $P_2$ (acceptance quantity) of part code P delivered under the after-part code assigned by conversion of the part code P to the after-part code.

Step ⑦: Calculating $P'+\Sigma h-P_1-P_2$ and setting the result as a new V inventory P' of part code P in the parts inventory data table 208

Figure 42:
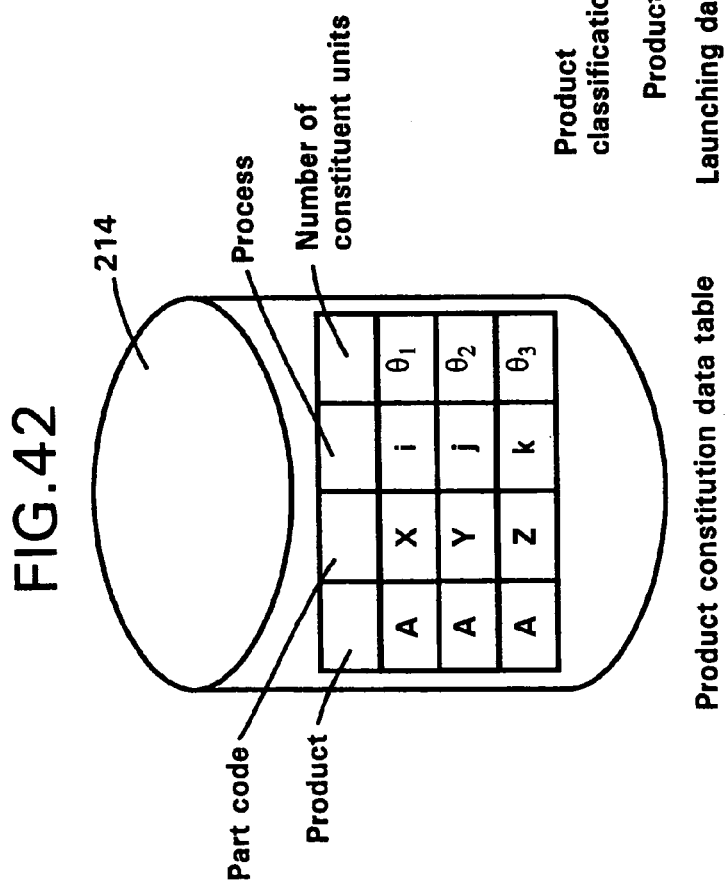

Thus, at the time-point of delivery of parts of part code P as mother parts or after-parts, the corresponding quantity is not treated as the inventory of parts of part code P but dealt with as the inventory of mother parts or after-parts so that only the data of parts which have been released as parts of part code P but not yet to be delivered as mother parts or after-parts is dealt with as the V inventory data of part code P. Thus, assuming that 100 units of part code P have been released for processing and 50 units of after-part code Q of part code P have already been received by an assembly line downstreams of the processing stage, the inventory quantity of part code P in the processing stage is registered as 50 units. In this manner, the quantity of parts currently remaining in the form of part code P as an inventory can be clearly grasped. And as the 100 units of part P released for processing are sequentially subjected to processing and assembling, they change form smoothly in the data along the line of flow, for example 50 units of part P and 50 units of after-part Q at the moment, so that an accurate and constant tab can be maintained on what forms (conditions) of inventory are existing in what quantities in respective stages of production. Connected to the parts inventory calculating routine II204 are parts inventory data table 208, parts constitution data table 210, parts processing data table 211 and in-process inventory data table 209, as well as a product constitution data table 214, and the S inventory (cumulative inventory) of the parts is calculated in the steps shown in FIG. 41. Stored in the product constitution data table 214 are the part codes, process codes and constituent numbers of parts necessary for respective products as shown in FIG. 42.

Thus,

Step ①: Retrieving the R inventory P and V inventory P' of part code P from the parts inventory data table 208

Step ②: Searching through the parts inventory data table 208 and the parts constitution data table 210 or the parts processing data table 211 to count all the quantities of part code P and setting the total count as $P_1$ Step ③: Searching through the in-process inventory data table 209, the product constitution data table 214 and the parts constitution data table 210 or the parts processing data table 211 to count all the quantities of part code P and setting the total as $P_2$ Step ④: Calculating $P^*=P+P'+P_1+P_2$ and setting the result as the S inventory P in the parts inventory data table 208.

Thus, the parts bearing the part code P and those bearing various derivative forms of the original part code P are all counted retrogradely to arrive at the cumulative inventory (S inventory) of part code P.

Then, in the parts inventory calculating routine I203, the released quantity registered in the parts release data table 213 is counted as V inventory, and in the parts release data table initializing routine 205, all the data in the parts release data table 213 are erased.

In the parts order data table initializing routine 206, the difference between order quantity and acceptance quantity in the parts order data table 212 is set as the new order quantity, while the acceptance quantity is set as zero. The data registration processing up to the current time is thus complete.

Then, in the data table register routines 207 and 207a through 207e, the registration and modification of the product attribute data table 215, product constitution data table 214, parts constitution data table 210, parts processing data table 211 and parts attribute data table 216 are carried out.

Figure 43:
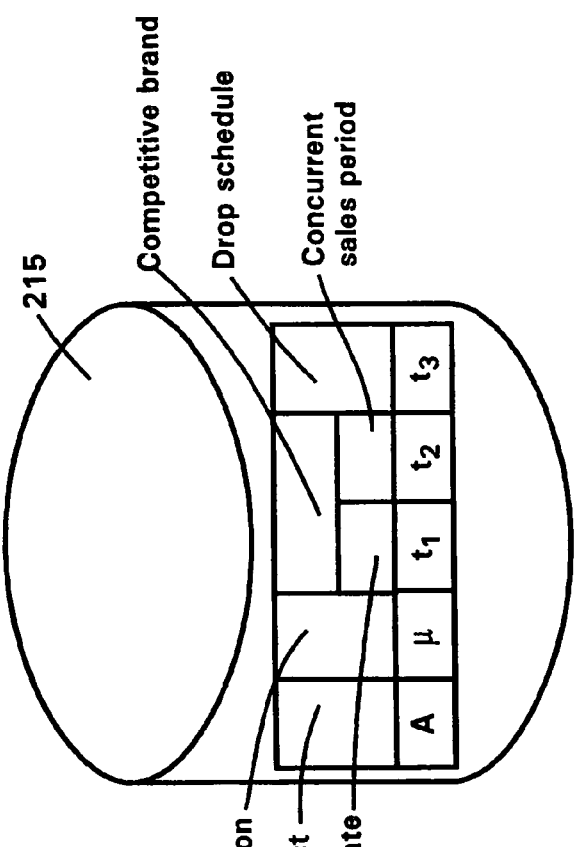

Stored in the product attribute data table 215 are the product classification, launching dates of competitive brands, periods of concurrent sale with the competitive brands and the scheduled drop (discontinuation) data of each product as shown in FIG. 43. Thus, the product name A is entered and the aforesaid attribute data are respectively registered or modified. The product classification is the distinction of whether the sales of a product is to continue for more than a predetermined time period after launching.

In the product constitution data table 214 shown in FIG. 42, too, the product name A is entered and the registration or modification of the part codes constituting this product A, relevant process codes and the numbers of constituent parts are effected.

In the product constitution data table 210 and parts processing data table 211 shown in FIGS. 36 and 37, respectively, the mother part code X or before-part code P/Q is entered and the registration or modification of the daughter part code constituting the mother part code X and the number of constituting daughter parts or the after-part code of the before-part code P/Q are carried out.

Figure 44:
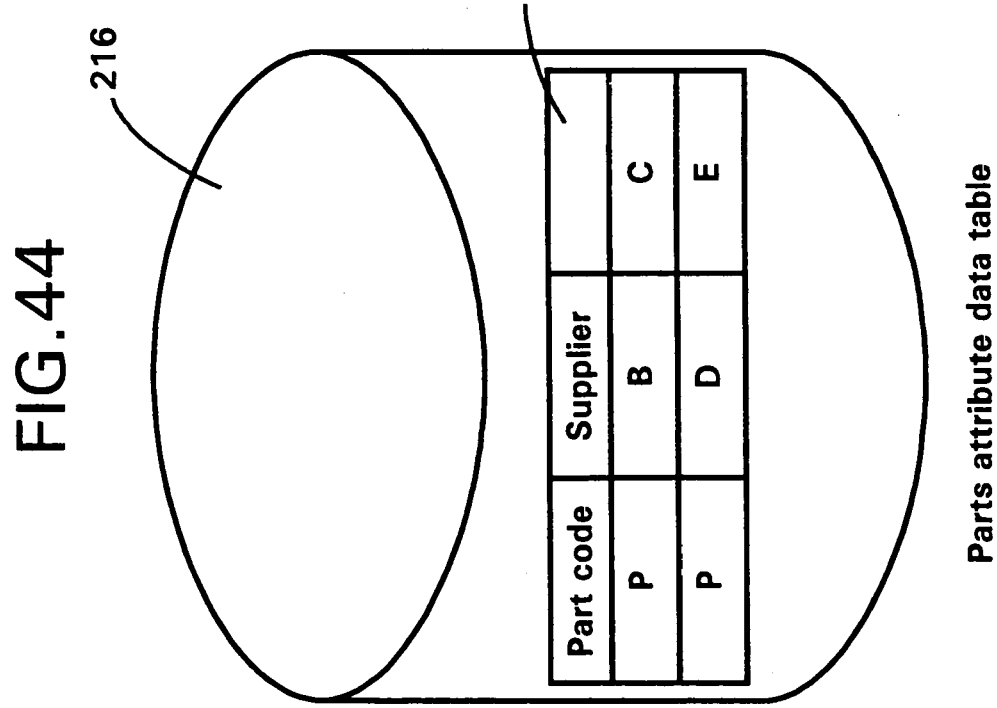

Furthermore, in the parts attribute data table 216 shown in FIG. 44, the part code P is entered and the name of the supplier-manufacturer and the name of the parts manufacturer are registered or altered.

In this manner, the registration processing of all the basic data is completed in the data register means XA. Then, parts demand quantity setting in the parts demand setting means XB is carried out.

This parts demand setting means XB comprises an assured sales quantity setting routine 217 and a parts demand calculating routine 218.

Figure 45:
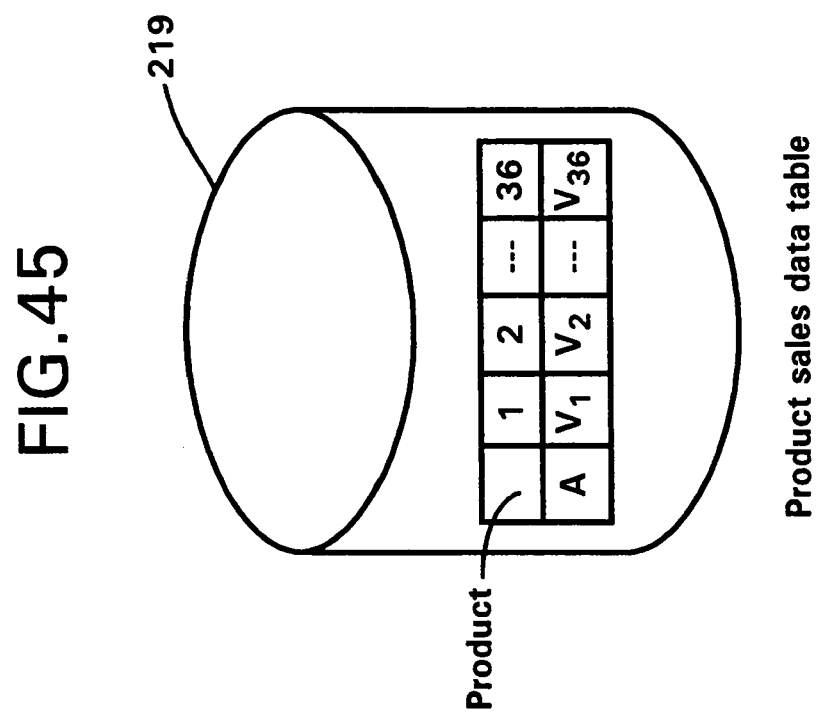

Connected to this assured sales quantity setting routine 217 are a product sales data table 219 shown in FIG. 45, the product attribute data table 215 and an assured sales quantity data table 220 shown in FIG. 46.

Figure 47:
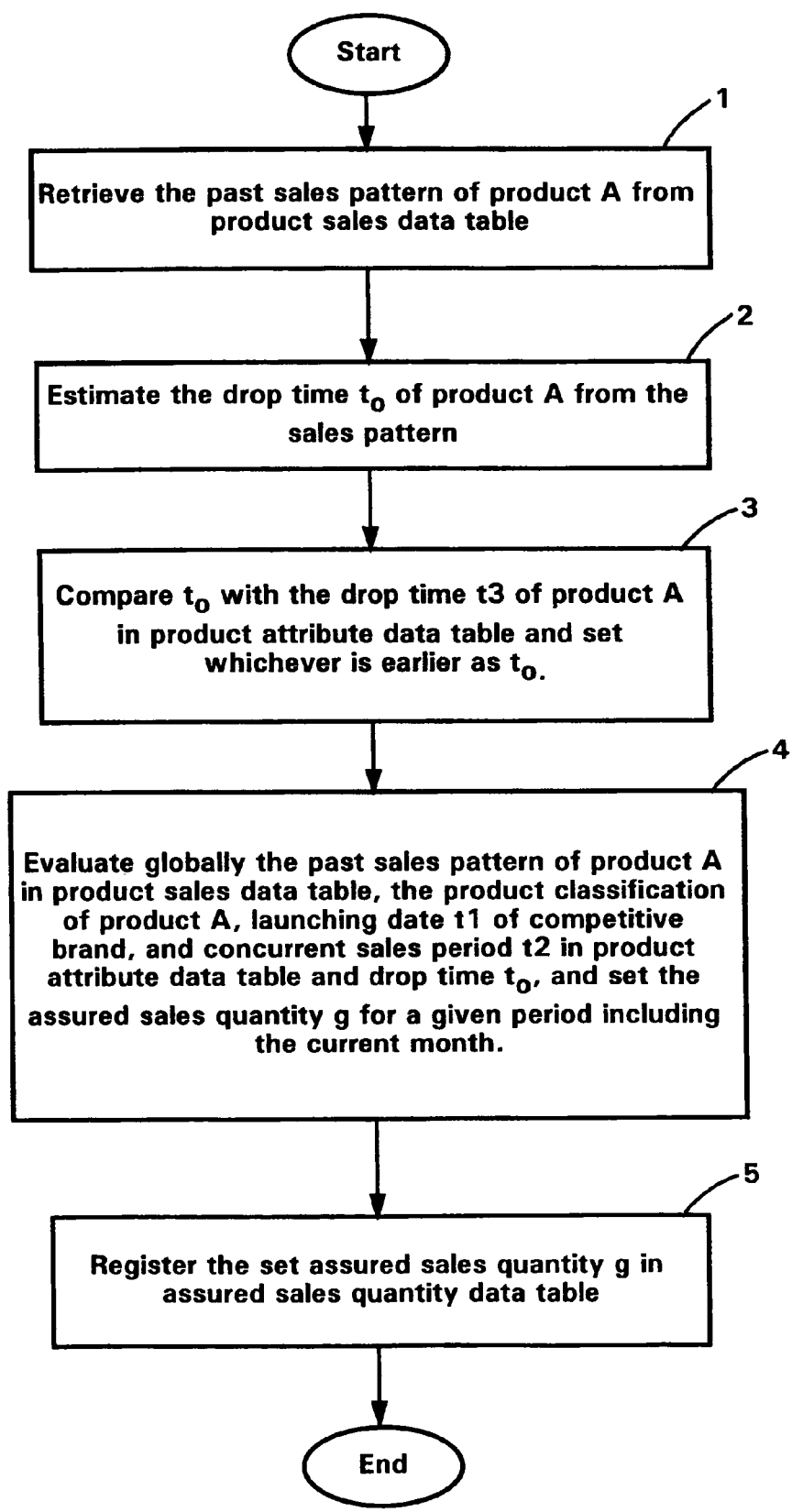
FIG. 47 is a flowchart showing processing for setting assured sales quantity.

Stored in the product sales data table 219 are the sales data for each month (36 months in FIG. 45) for each product and the assured sales quantity of the particular product is set using the above data in the steps shown in the flow chart of FIG. 47.

Thus,

Step ①: Finding the past course of sales data of product A from the product sales data table 219

Step ②: Estimating the sales drop time $t_0$ of product A from the above course of sales data Step ③: Comparing the time $t_0$ with the scheduled drop time $t_3$ of product A stored in the product attribute data table 215 to take whichever is earlier as $t_0$.

Step ④: Evaluating globally the past course of sales data of product A in the product sales data table 219 and the product classification u of product A, the launching time $t_1$ of a competitive product, the period of concurrent sale $t_2$ in the product attribute table 215, and the drop time $t_0$ and setting the assured sales quantity, e.g. the number of units g which can certainly be sold, for a predetermined time period including the current month Step ⑤: Registering the assured sales quantity g so set as the assured sales quantity data of product A in the assured sales quantity data table 220.

Thus, from the product attributes and the past sales performance of the product, the minimum assured sales quantity of the product is estimated and set and, then, the parts demand quantity is calculated in a parts demand size calculating routine 218.

Connected to this parts demand size calculating routine 218 are the assured sales quantity data table 220, product constitution data table 214, parts constitution data table 210, and parts processing data table 211, as well as a parts demand data table 221 shown in FIG. 48. Therefore, the assured sales quantity data table 220 is first searched through to count the total quantities of parts bearing part code P in the assured sales quantities of all products and the above product constitution data table 214, parts constitution data table 210 and parts processing data table 211 are sequentially searched through to obtain the desired parts demand data.

FIG. 49 shows the above data tables substituted by factual values. With reference to the figure, the method of calculating the parts demand quantity is specifically explained below.

Step ①: The assured sales quantity data table 220 shown in FIG. 49(a) is searched to find that the assured sales quantity of product A is 10 units.

Step ②: The product constitution data table 214 shown in FIG. 49(b) indicates that product A consists of 2 units of part code $q_1$, 3 units of $q_2$ and 1 unit of $q_3$. It is, therefore, calculated that the production of 10 units of product A requires 20, 30 and 10 units of $q_1$, $q_2$ and $q_3$ parts, respectively.

Step ③-1: The parts constitution data table 210 shown in FIG. 49(c) indicates that part code $q_1$ consists of 1 unit of daughter part code $q_7$ and one unit of $q_8$ and that part code $q_2$ consists of 2 units of daughter part code $q_8$ and 1 unit of $q_{10}$. It is, therefore, calculated that the production of 20 units of part code $q_1$ requires 20 units of part code q and 20 units of $q_8$ and that the production of 30 units of part code $q_2$ requires 60 units of part code $q_8$ and 30 units of $q_{10}$.

Step ③-2: It is also found that part code $q_{10}$ consists of 1 unit of daughter part code $q_{12}$ and 3 units of $q_{13}$. Therefore, it is calculated that the production of 30 units of part code $q_{10}$ requires 30 units of part code $q_{12}$ and 90 units of $q_{13}$.

Step ④-1: The parts processing data table 211 shown in FIG. 49(d) indicates that part code $q_7$ is processed from before-part $q_{11}$ and, therefore, that the production of 20 units of part code $q_7$ requires 20 units of part code $q_{11}$.

Figures 50, 51:
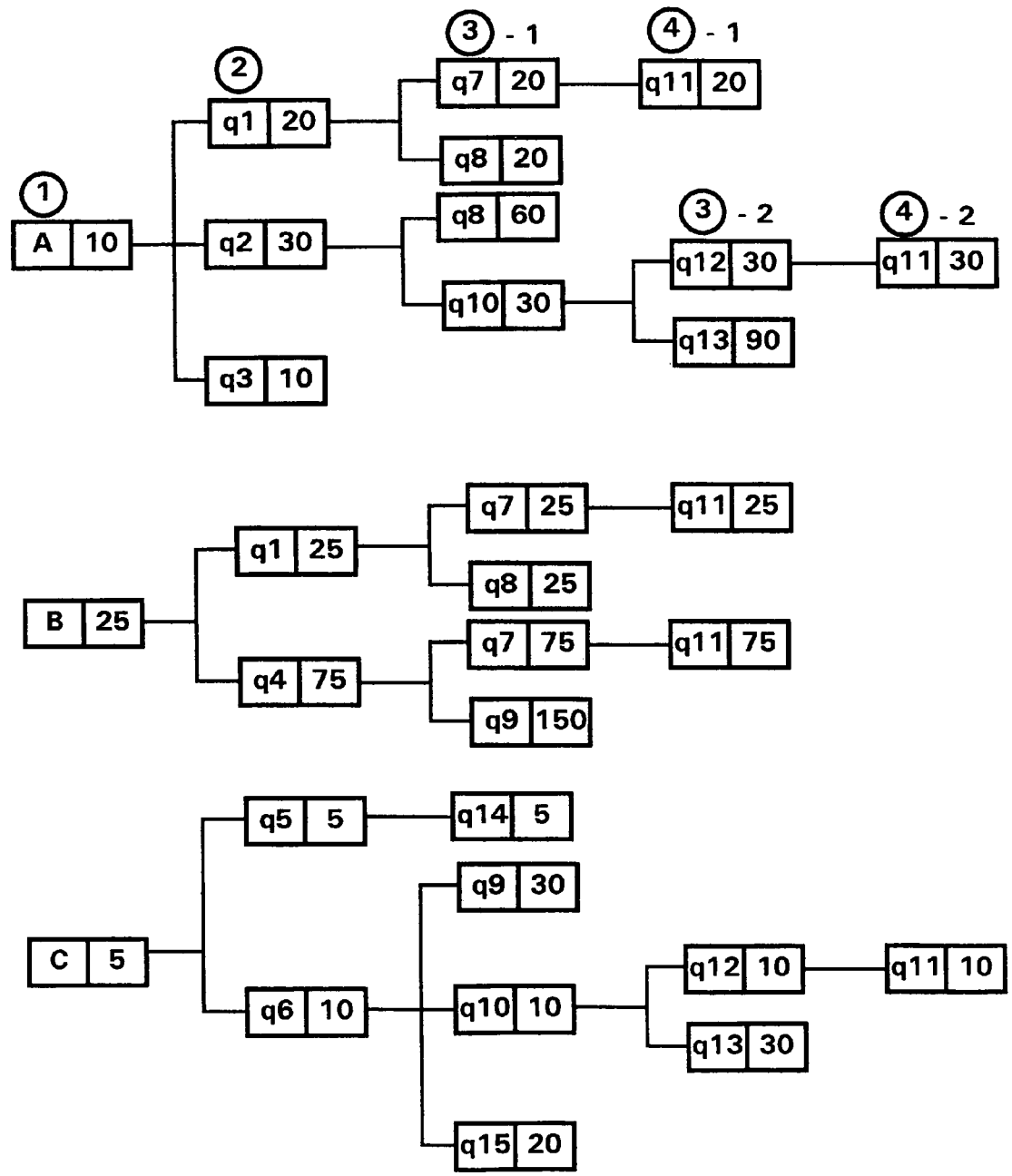
FIGS. 50 and 51 are views explaining the processing of values applied in FIG. 49.

Step ④-2: It is also seen that part code $q_{12}$ is processed from before-part $q_{11}$ and, therefore, that the production of 30 units of part code $q_{12}$ requires 30 units of part code $q_{11}$ FIG. 50 shows the results obtained by searching through the assured sales quantity data table 220, product constitution data table 214, parts constitution data table 210 and parts processing data table 211 in the steps ① through ④ in the above manner. The sum of the required numbers of units of each part code necessary for meeting the assured sales quantities of products A, B and C is the demand quantity shown in FIG. 51.

The processing for parts control in the parts control means XC is now described.

The parts control means XC comprises a parts order routine 222, a parts acceptance routine 223, a parts release routine 224 and a product planning routine 225.

Figure 52:
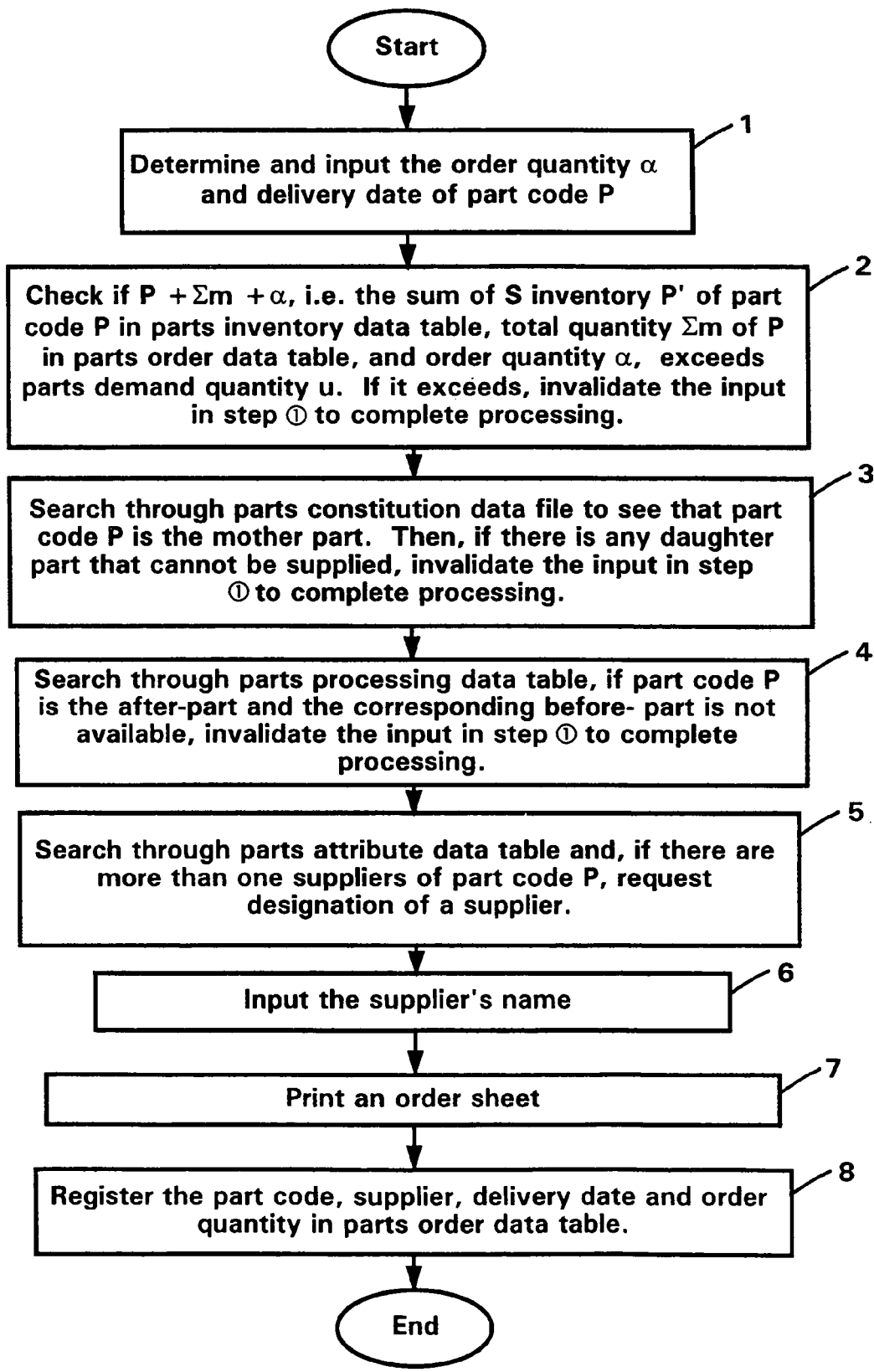
FIG. 52 is a flow chart showing steps in a parts ordering routine.

Connected to the parts order routine 222 are the parts inventory data table 208, parts order data table 212, parts demand data table 211, parts constitution data table 210, parts processing data table 211 and parts attribute data table 216, and the control of parts order is performed in the steps shown in the flow chart of FIG. 52.

Thus,

Step ①: Determining and inputting the order size a of part code P

Step ②: Confirming that $P^*+\Sigma m+\alpha$, i.e. the sum of the S inventory $P^*$ of part code P stored in the parts inventory data table 208, the total order quantity $\Sigma m$ of part code P stored in the parts order data table 212 and the order quantity a newly entered in step ①, does not exceed the parts demand quantity u of part code P in the product demand data table 221. If it exceeds, i.e. $P^*+\Sigma m+\alpha>u$, the input in step ① is invalidated and the processing is completed. Thus, in this case, there was an excessive order for part code P.

Step ③: Searching through the parts constitution data table 210 and, if it is found that part code P represents the mother part, confirming that all the daughter parts for them can be supplied. In the event of even one daughter part is not available for supply, the input in step ① is invalidated and the processing is completed. The above confirmation is performed as follows. The R inventory and V inventory of the corresponding daughter part are investigated in the parts inventory data table 208 and, then, the delivery term data and order data in the parts order data table 212 are investigated. Then, the delivery term data and order data for all the mother parts employing the corresponding daughter part are investigated in the parts order data table 212 the liquidation schedule of the corresponding daughter part is calculated.

Step ④: Searching through the parts processing data table 211. When the part code P represents after-parts, it is confirmed that the corresponding before-parts can be supplied. If the supply is infeasible, the input in step ① is invalidated to terminate the processing. The above confirmation is carried out by investigating the R inventory and V inventory in the parts inventory data table 208, the delivery term and order size data in the parts order data table 212 and the delivery term and order quantity data of all the after-parts employing the corresponding before-part in the parts order data table 212.

Step ⑤: Searching through the parts attribute data table 216 and, where there are more than one supplier-manufacturers of part code P, requesting designation of a supplier-manufacturer Step ⑥: Inputting that supplier-manufacturer Step ⑦: Printing an order sheet Step ⑧: Registering the part code, supplier-manufacturer, delivery term and order quantity in the parts order data table 212 to complete the processing.

Thus, in the parts order routine 222, an order is placed only after confirming that the set order quantity does not cause an excess order or an overstock and that daughter parts or before-parts can be supplied when they exist.

Figure 53:
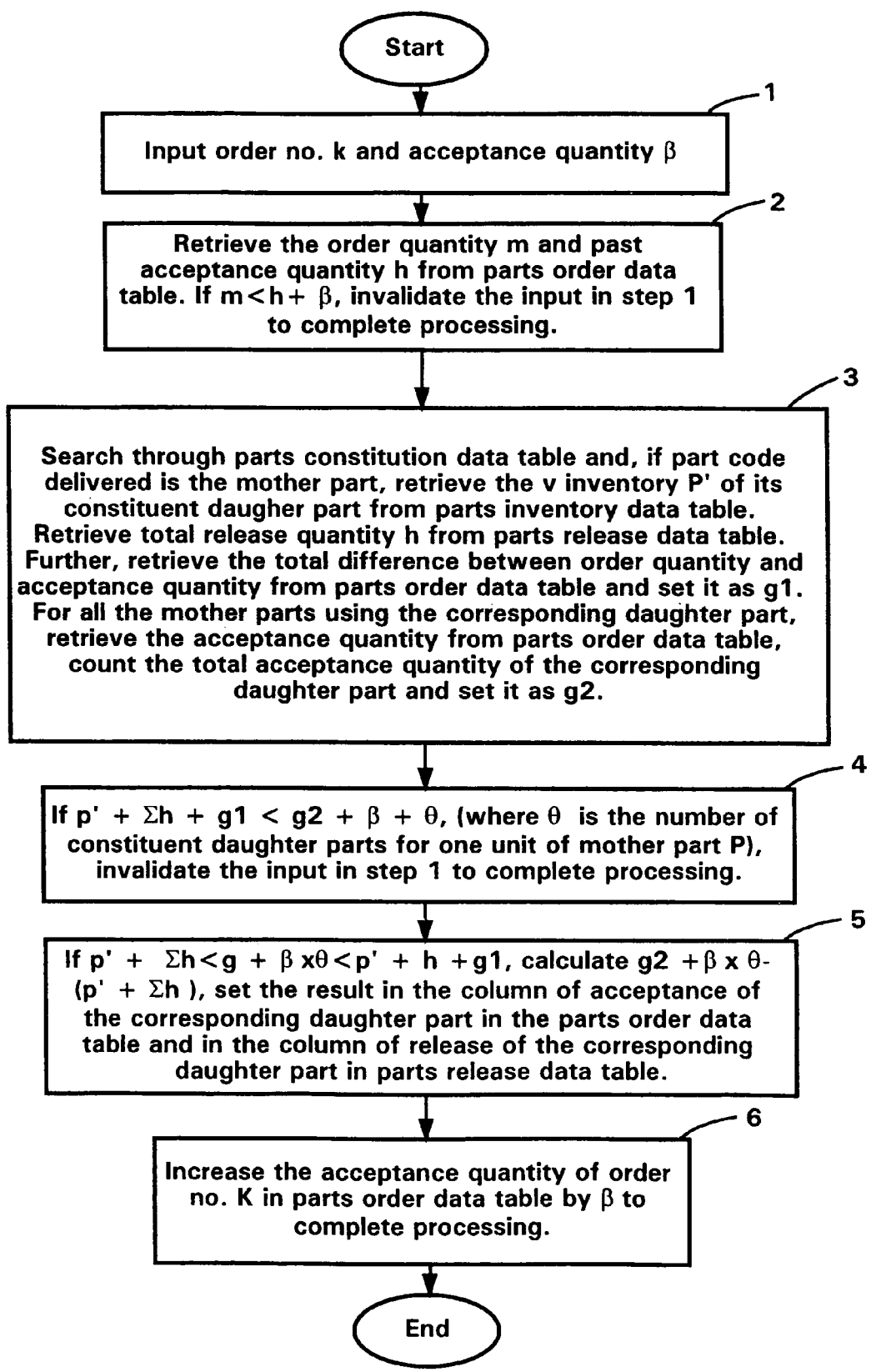
FIG. 53 is a flow chart showing steps in a parts acceptance routine.

Furthermore, the parts acceptance routine 223 is connected to the parts order data table 212, parts inventory data table 208, parts release data table 213, parts constitution data table 210 and parts processing data table 211 and the parts acceptance processing is performed in the steps shown in the flow chart of FIG. 53.

Thus,

Step ①: Inputting order no. K and acceptance quantity $\beta$,

Step ②: Retrieving order quantity m and past acceptance quantity n of order no. K from the parts order data table 212. If $m<n+\beta$, it is judged that there was an error and the input in step ① is invalidated to terminate the processing.

Step ③: Searching through the parts constitution data table 210. If the part code P stored is the mother part, the V inventory P' of the constituent daughter part is retrieved from the parts inventory data table 208 and the total release data $\Sigma h$ is retrieved from the parts release data table 213. Then, the total difference between order quantity and acceptance quantity, that is to say the number of parts already ordered but not delivered as yet, is retrieved and set as $g_1$.

Furthermore, the acceptance quantity of all the mother parts employing the corresponding daughter part is retrieved from the parts order data table 212 and the total acceptance quantity of the corresponding daughter part is calculated and set as $g_2$. Thus, if the mother parts have been accepted, it is deemed that the daughter parts have of course been accepted.

Step ④: If $P'+\Sigma h+g_1<g_2+\beta\times\theta$ (where $\theta$ means the number of the corresponding daughter parts contained in one unit of the mother part), invalidating the input in step ① as an error and terminating the processing.

Step ⑤: If $P'+\Sigma h<g_2+\beta\times\theta<P'+\Sigma h+g_1$, calculating $g_2+\beta\times\theta-(P'+\Sigma h)$ and having the result reflected in the acceptance data of the corresponding daughter part in the parts order data table 212 and similarly in the release data of the corresponding daughter part in the parts release data table 213. In other words, it is treated so that the corresponding daughter part is accepted once and, then, released.

Step ⑥: Increasing the acceptance data of order no. K in the parts order data table 212 by $\beta$ to complete the processing.

Figure 54:
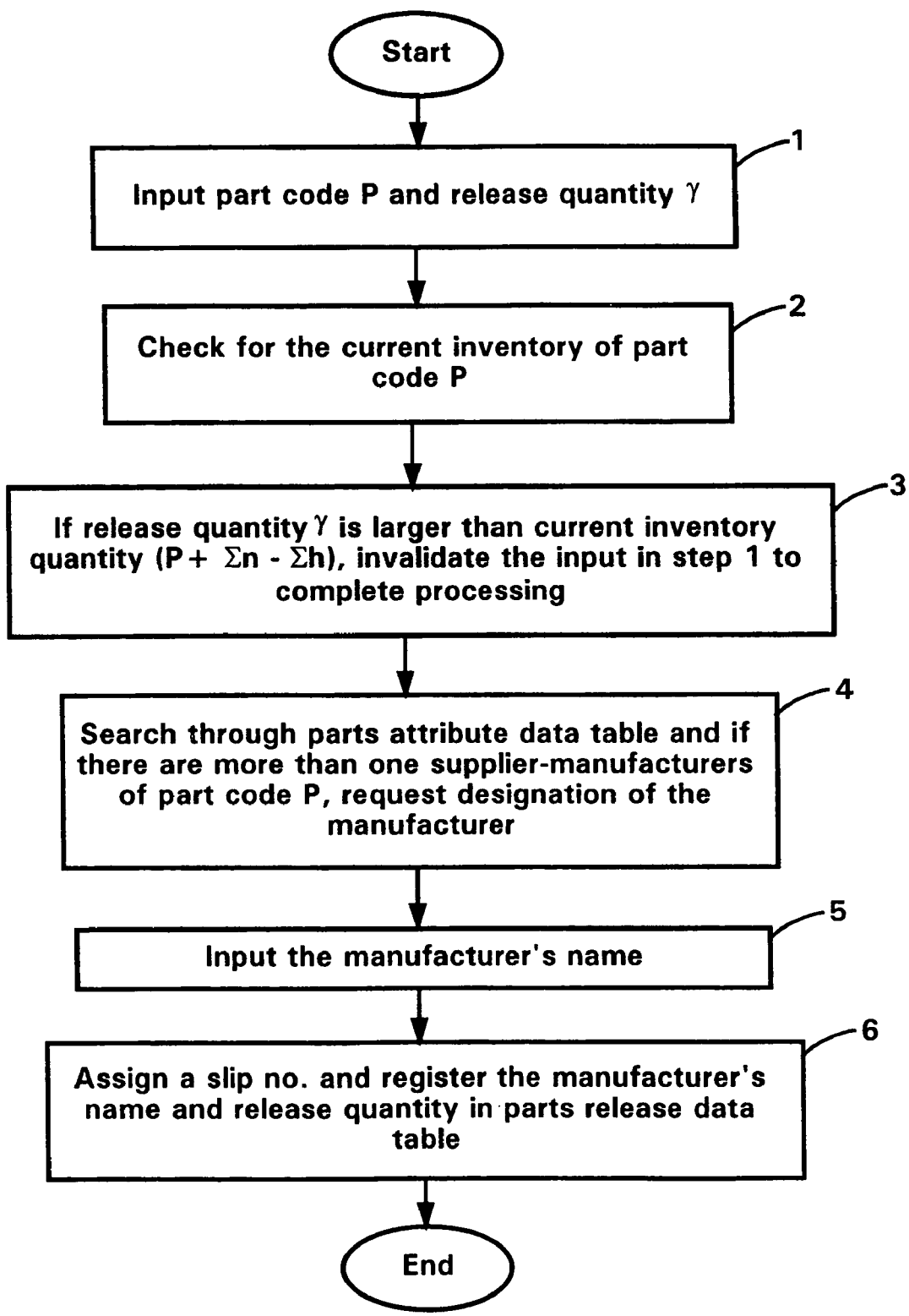
FIG. 54 is a flow chart showing steps in a parts releasing routine.

Connected to the parts release routine 224 are the parts order data table 212, parts inventory data table 208, parts release data table 213, parts constitution data table 210 and parts attribute data table 216, and parts release processing is performed in the steps shown in the flow chart of FIG. 54.

Thus,

Step ①: Entering part code P and its release quantity $\gamma$

Step ②: Finding the current inventory of part code P in the following steps (i) through (iii)

(i) Retrieving the R inventory of part code P from (i) the parts inventory data table 208

(ii) Retrieving the total acceptance quantity $\Sigma n$ of part code P from the parts order data table 212

(iii) Retrieving the total release quantity $\Sigma h$ of part code P from the parts release data table 213

Step ③: If the release quantity y is larger than the current inventory $(P+\Sigma n-\Sigma h)$, the input in step ① is invalidated as an error to terminate the processing.

Step ④: Searching through the parts attribute data table 216 and, if there are more than one supplier-manufacturers of part code P, requesting designation of the relevant manufacturer Step ⑤: Entering the manufacturer's name Step ⑥: Assigning a slip number and registering the part code, manufacturer's name, and release quantity in the parts release data table 213 to terminate the processing.

Figure 55:
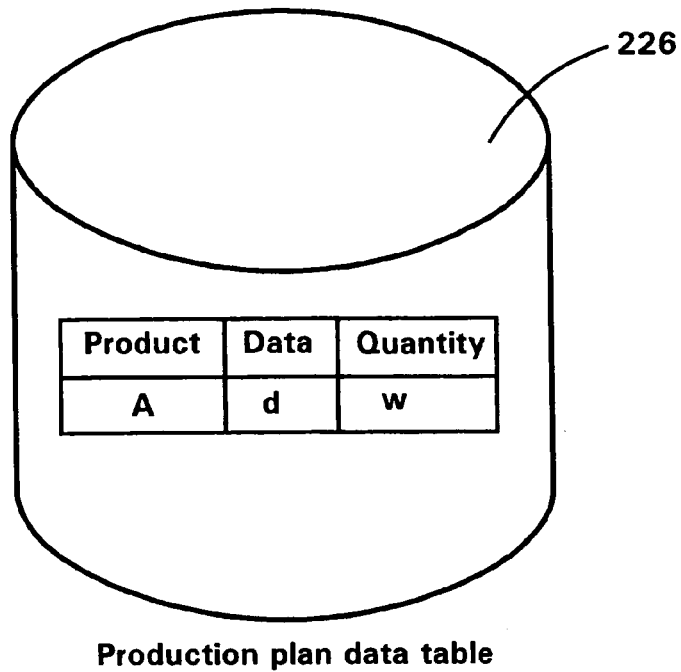
FIG. 55 is a view showing a production plan data table.
Figure 56:
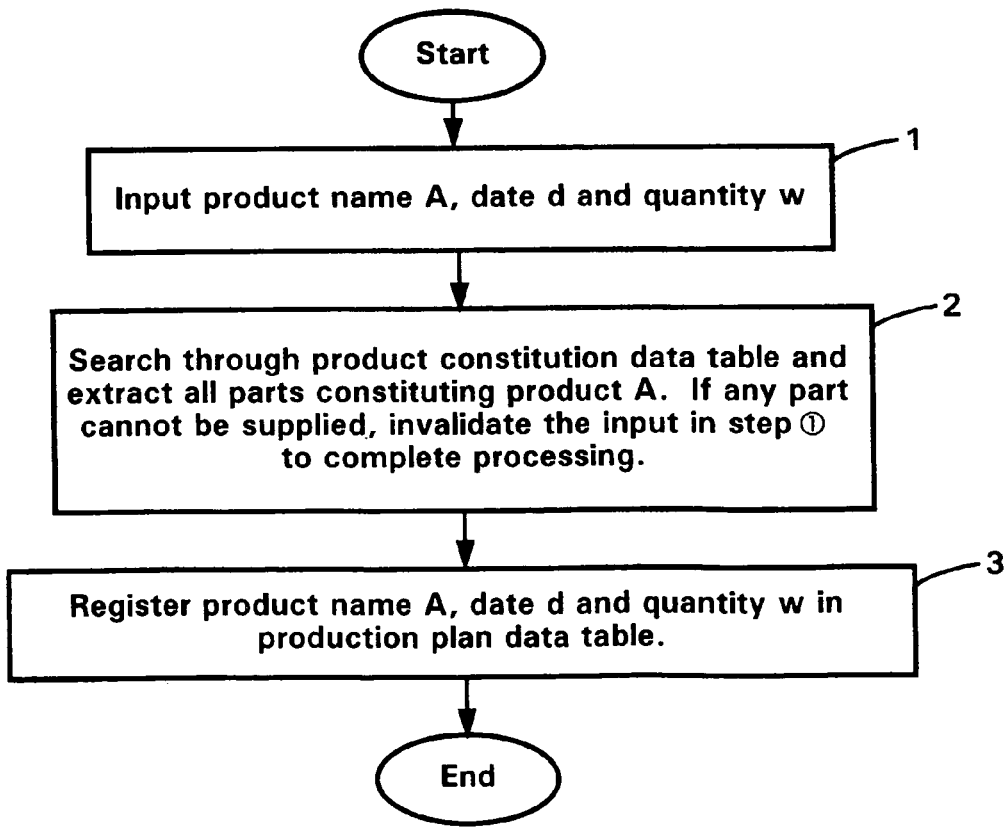
FIG. 56 is a flow chart showing steps in a production planning routine.

Connected to the production plan routine 225 are the product constitution data table 214, parts inventory data table 208 and parts order data table 212 as well as a production plan data table 226 shown in FIG. 55, and the registration of the production plan is performed in the steps shown in the flow chart of FIG. 56.

Stored in the production plan data table 226 are the production schedule and production quantity data for respective product items.

Thus,

Step ①: Entering the production schedule d and production quantity w for product A in the production plan data table 226

Step ②: Searching through the product constitution data table 214 to extract all the constituent parts of product A and checking to see whether these parts can be supplied. If any of the parts is unavailable, the input in step ① is invalidated to terminate the processing. The above checking is done as follows. The R inventory of the particular part is checked in the parts inventory data table 208 and the delivery term and order quantity data in the parts order data table 212 are also checked. Then, with regard to other product items which employ the corresponding constituent part, the production schedule and quantity are checked in the production plan data table 226 and the liquidation schedule for the corresponding part is calculated. Thus, it is checked here whether this constituent part will be available in a sufficient quantity for the production of product A.

Step ③: Registering product name A, production schedule d and production quantity w in the production plan data table 226 to complete the processing.

The invention claimed is:

1. A production system comprising:
   a plurality of point of sales terminals each including an electronic interface which obtains sales information concerning sales of a plurality of goods;
   a main control unit including an input device for receiving the sales information from the point of sales terminals, a main production controller including a production size determining unit for determining a production quantity to be produced in the future for the plurality of goods based on the sales information received from the plurality of point of sales terminals, and an output device for outputting data indicative of the production quantity determined by the production size determining unit; and
   a manufacturing unit for manufacturing plurality of goods based on the sales information which is collected at the plurality of point of sales terminals and transmitted from the plurality of point of sales terminals to the main production controller, wherein after the production size determining unit determines the production quantity, the main production controller transmits the output data indicative of the production quantity determined by the production size determining unit to a production unit and the production unit manufactures the production quantity of the plurality of goods in response to receiving the output data indicative of the production quantity from the main production controller.

2. The production system according to claim 1, further comprising a network for interconnecting the plurality of point of sales terminals and the main control unit.

3. The production system according to claim 2, wherein the network comprises a public communications network.

4. The production system according to claim 1, further comprising a network for interconnecting the main control unit and the production unit.

5. The production system according to claim 4, wherein the network comprises a public communications network.

6. The production system according to claim 1, wherein the point of sales terminals are located at at least one location where the plurality of goods are sold.

7. The production system according to claim 1, wherein the main control unit comprises a host computer and the production size determining unit is a computer program that is executed on the host computer.

8. The production system according to claim 1, wherein the production unit comprises a computer and a plurality of drive units controlled by the computer for manufacturing the production quantity of the goods.

9. The production system of claim 1, further comprising a raw materials ordering unit receiving the production quantity from the production size determining unit and ordering the raw materials required to produce the production quantity of the goods.

10. The production system according to claim 1, further comprising a directing unit for receiving the production quantity from the production size determining unit and transmitting the production quantity to a raw materials ordering unit and to the production unit.

11. The production system according to claim 1, wherein the sales information collected by the point of sales terminals includes a name of the goods sold and a quantity of the goods sold.

12. The production system according to claim 1, wherein the sales information is directly transmitted from the point of sales terminals to the main control unit.

13. The production system according to claim 1, wherein the point of sales terminals transmit the sales information to the main control unit at a periodic time interval.

14. The production system according to claim 13, wherein the periodic time interval is a daily interval.

15. A production system comprising:
   a point of sales subsystem including:
   a plurality of point of sales terminals each including a central processor and an input device for receiving and storing information concerning sales of a plurality of products; and
   a flexible manufacturing subsystem including:
   a main controller receiving the information from the point of sales subsystem and determining a production quantity of the products to be produced in the future based on the sales information received from the point of sales subsystem; and
   a manufacturing controller receiving the production quantity from the main controller and controlling a plurality of production drive units for controlling manufacture of the production quantity of the plurality of products determined by the main controller.

16. The production system according to claim 15, wherein the manufacturing controller includes a computer for electronically controlling the plurality of production drive units to set desired speeds and power levels for a plurality of manufacturing machines used to manufacture the production quantity of products determined by the main controller.

17. The production system according to claim 15, wherein the point of sales subsystem includes a network connecting the point of sales terminals to the flexible manufacturing subsystem.

18. The production system according to claim 17, wherein the network is a public communications network.

19. The production system according to claim 15, wherein the flexible manufacturing subsystem further includes a raw materials ordering unit receiving the production quantity from the main controller and ordering the raw materials required to produce the production quantity of the products.

20. The production system according to claim 15, wherein the main controller includes an input device receiving the information from the point of sales terminals, a central processor for executing a program to determine the production quantity of the products to be produced in the future and an output device for outputting the production quantity to the manufacturing controller.

21. A method of manufacturing products, the method comprising the steps of:
 collecting sales information about products sold at a plurality of point of sales terminals;
 transmitting the sales information to a production size determining unit;
 executing a computer program at the production size determining unit to determine a production quantity of the products to be produced in the future based on the sales information collected from the point of sales terminals and to generate output data indicative of the production quantity determined at the production size determining unit;
 transmitting the output data indicative of the production quantity determined at the production size determining unit to at a flexible manufacturing controller which is operatively connected to the production size determining unit; and
 manufacturing the production quantity of the products based on the sales information data collected at the plurality of point of sales terminals and in accordance with the output data indicative of the production quantity from the production size determining unit and controlling the manufacturing of the production quantity of the products via the flexible manufacturer controller and based on and in response to receiving the transmission of the production quantity determined by the production size determining unit.

22. The method according to claim 21, further comprising the step of ordering raw materials based on the sales information from the point of sales terminals and the production quantity determined by the production size determining unit.

23. The method according to claim 22, wherein the sales information transmitted in the step of transmitting the sales information to a production size determining unit is transmitted via a public information network.

24. The method according to claim 21, wherein the sales information transmitted in the step of transmitting the output data indicative of the production quantity determined at the production size determining unit to a flexible manufacturing controller is transmitted via a public information network.

25. The method according to claim 21, wherein the step of manufacturing the production quantity of the products includes the step of operating the flexible manufacturing controller to control a plurality of production drive control units for controlling manufacture of the production quantity of the plurality of products determined by the production size determining unit.

26. A method for supplying manufactured goods, comprising the steps of:
 receiving data identifying actual number of units sold of a good by a sample number of retail outlets;
 estimating a total number of units of said good sold for all retail outlets by scaling-up said received data;
 predicting future demand for said good based on said estimated total number of units of said good sold;
 determining a production quantity of said good based on said predicted future demand;
 determining required quantities of raw materials required for manufacturing the production quantity of said good;
 transmitting data concerning the required quantities of raw materials required for manufacturing the production quantity of said good to a raw materials controller and using the raw materials controller to provide the raw materials required for manufacturing the production quantity of said good to a manufacturing plant; and
 transmitting the production quantity of said good to a flexible manufacturing controller and using the flexible manufacturing controller to control manufacturing of the production quantity of said good at the manufacturing plant.

27. The method of claim 26, wherein said step of receiving sales information further comprises receiving data from a plurality of point-of-sales terminal units through a communication network.

28. The method of claim 26, wherein said step of estimating a total number of units further comprises:
 calculating a ratio of total number of units purchased by all said retail outlets over a preceding period of time and total number of units purchased by said sample number of retail outlets;
 estimating a deviation factor; and
 multiplying said actual number of units sold, said ratio, and said deviation factor together.

29. The method of claim 28, wherein said step of estimating a deviation factor further comprises considering at least one of a product classification, a price classification, a consumer age classification, and a merchandising classification.

30. The method of claim 26, wherein said step of predicting future demand further comprises:
 receiving periodic updates of said estimated total number of units;
 selecting a demand forecast data table according to an elapsed amount of time since initial launch of said good;
 identifying a sales pattern from said demand forecast data table corresponding to said periodic updates of said estimated total number of units; and
 calculating said future demand based on said identified sales pattern.

31. The method of claim 30, wherein said step of selecting a demand forecast data table further comprises selecting between a first demand forecast data table comprising data corresponding to a first predetermined period of time following said initial launch and a second demand forecast data table comprising data corresponding to a second predetermined period of time following said initial launch.

32. The method of claim 30, wherein said step of identifying a sales pattern further comprises matching an actual sales pattern derived from said periodic updates of said estimated total number of units to one of plural historic sales patterns stored in said demand forecast data table.

33. The method of claim 26, wherein said step of determining a production quantity further comprises:

retrieving an inventory quantity for said good and past additional productions request quantity for said good from an inventory data table;

calculating a required size of additional production of said good by subtracting said inventory quantity and said past additional production request quantity from said future demand; and updating said past additional production request quantity to reflect said calculated required size of additional production.

34. The method of claim 33, wherein said step of determining required quantities of raw materials further comprises determining required quantities of constituent raw materials for producing a single unit of said good, and multiplying the required quantities of constituent raw materials by the required size of additional production.

35. The method of claim 34, wherein said step of determining required quantities of raw materials further comprises determining a current raw materials inventory volume.

36. The method of claim 35, wherein said step of determining required quantities of raw materials further comprises determining a magnitude of excess or shortage for each said constituent raw material for a subsequent period of time based on said current raw materials inventory volume.

37. The method of claim 26, wherein said step of determining required quantities of raw materials further comprises determining raw materials order quantities based on at least order backlog quantities comprising quantities of raw materials for which an order has been sent to a raw materials supplier and the raw materials supplier has acknowledged receipt of the order.

38. The method of claim 37, further comprising modifying order backlog raw materials quantities based on order acknowledgement information received from a raw materials supplier confirming receipt of ordered quantities of raw materials.

39. The method of claim 37, further comprising modifying the required quantities of raw materials based on acceptance information received from a raw materials supplier confirming receipt of ordered quantities of raw materials and modifying said production quantity based on quantities of finished goods.

40. The method of claim 26, wherein said step of determining required quantities of raw materials further comprises determining raw materials order quantities based on at least in-process order quantities comprising quantities of raw materials for which an order has been sent to a raw materials supplier and the raw materials supplier has not acknowledged receipt of the order nor has confirmed ability to deliver the raw materials requested.

41. The method of claim 26, wherein said step of determining required quantities of raw materials further comprises determining raw materials order quantities based on at least one of information regarding type and quantity of raw materials, information regarding assembling and processing steps for manufacturing said good, and information regarding the launching dates of competitive products.

42. The method of claim 41, wherein said step of determining required quantities of raw materials includes the step of placing orders for raw materials in a sequence determined by said assembling and processing steps for manufacturing said good.

43. The method of claim 26, further comprising the step of manufacturing the production quantity of said good.

44. The method of claim 43, wherein said manufacturing step further comprises:

selecting output values for respective drive units from a drive unit output data table; and transmitting said selected output values to said respective drive units.

45. An apparatus for controlling production of manufactured goods comprising a processor and a memory containing a stored program, the stored program causing said processor to perform the steps of:

receiving data identifying actual number of units sold of a good by a sample number of retail outlets;

estimating a total number of units of said good sold for all retail outlets by scaling-up said received data;

predicting future demand for said good based on said estimated total number of units of said good sold;

determining a production quantity of said good based on said predicted future demand;

determining required quantities of raw materials required for manufacturing the production quantity of said good;

transmitting data concerning the required quantities of raw materials required for manufacturing the production quantity of said good to a raw materials controller and using the raw materials controller to provide the raw materials required for manufacturing the production quantity of said good to a manufacturing plant; and transmitting the production quantity of said good to a flexible manufacturing controller and using the flexible manufacturing controller to control manufacturing of the production quantity of said good at the manufacturing plant.

46. The apparatus of claim 45, wherein said apparatus is coupled to a plurality of point-of-sales terminal units through a communication network, and said step of receiving sales information further comprises receiving data from said plurality of point-of-sales terminal units.

47. The apparatus of claim 45, wherein said step of estimating a total number of units further comprises:

calculating a ratio of total number of units purchased by all said retail outlets over a preceding period of time and total number of units purchased by said sample number of retail outlets;

estimating a deviation factor; and multiplying said actual number of units sold, said ratio, and said deviation factor together.

48. The apparatus of claim 45, wherein said memory further comprises a product characteristic data table containing at least one of product classification data, price classification data, consumer age classification data, and merchandising classification data.

49. The apparatus of claim 45, wherein said memory further comprises a demand forecast data table containing plural sales course patterns including at least first plural patterns corresponding to a first predetermined period of time following product launch and second plural patterns corresponding to a second predetermined period of time following said first predetermined period of time.

50. The apparatus of claim 49, wherein said step of predicting future demand further comprises:

receiving periodic updates of said estimated total number of units;

identifying a sales pattern from said demand forecast data table corresponding to said periodic updates of said estimated total number of units and according to an elapsed amount of time since said product launch of said good; and calculating said future demand based on said identified sales pattern.

51. The apparatus of claim 50, wherein said step of identifying a sales pattern further comprises matching an actual sales pattern derived from said periodic updates of said estimated total number of units to one of said first and second plural patterns stored in said demand forecast data table.

52. The apparatus of claim 45, wherein said memory further comprises an inventory data table containing at least inventory quantity data and past additional production request quantity data.

53. The apparatus of claim 52, wherein said step of determining a production quantity further comprises:
retrieving an inventory quantity for said good and past additional production request quantity for said good from said inventory data table;
calculating a required size of additional production of said good by subtracting said inventory quantity and said past additional production request quantity from said future demand; and
updating said past additional production request quantity to reflect said calculated required size of additional production.

54. The apparatus of claim 53, wherein said step of determining required quantities of raw materials further comprises determining required quantities of constituent raw materials for producing a single unit of said good, and multiplying the required quantities of constituent raw materials by the required size of additional production.

55. The apparatus of claim 54, wherein said step of determining required quantities of raw materials further comprises determining a current raw materials inventory volume.

56. The apparatus of claim 55, wherein said step of determining required quantities of raw materials further comprises determining a magnitude of excess or shortage for each said constituent raw material for a subsequent period of time based on said current raw materials inventory volume.

57. The apparatus of claim 45, wherein said step of determining required quantities of raw materials further comprises determining raw materials order quantities based on at least order backlog quantities comprising quantities of raw materials for which an order has been sent to a raw materials supplier and the raw materials supplier has acknowledged receipt of the order.

58. The apparatus of claim 45, further comprising modifying order backlog raw materials quantities based on order acknowledgement information received from a raw materials supplier confirming receipt of ordered quantities of raw materials.

59. The apparatus of claim 45, further comprising modifying the required quantities of raw materials based on acceptance information received from a raw materials supplier confirming receipt of ordered quantities of raw materials and modifying said production quantity based on quantities of finished goods.

60. The apparatus of claim 45, wherein said step of determining required quantities of raw materials further comprises determining raw materials order quantities based on at least in-process order quantities comprising quantities of raw materials for which an order has been sent to a raw materials supplier and the raw materials supplier has not acknowledged receipt of the order nor has confirmed ability to deliver the raw materials requested.

61. The apparatus of claim 45, wherein said memory further comprises a raw material data table storing at least one of raw materials quantity data, raw materials inventory data, and raw materials acceptance schedule data.

62. The apparatus of claim 45, wherein said step of determining required quantities of raw materials further comprises determining raw materials order quantities based on at least one of information regarding type and quantity of raw materials, information regarding assembling and processing steps for manufacturing said good, and information regarding the launching dates of competitive products.

63. The apparatus of claim 45, wherein said step of determining required quantities of raw materials includes the step of placing orders for raw materials in a sequence determined by said assembling and processing steps for manufacturing said good.

64. The apparatus of claim 45, further comprising the step of manufacturing the production quantity of said good.

65. The apparatus of claim 64, wherein said memory further comprises a drive unit output data table storing output values for respective drive units of a production line.

66. The apparatus of claim 65, wherein said manufacturing step further comprises:
selecting output values for respective drive units from unit output data table; and
transmitting said selected output values to said respective drive units.

* * * * *